United States Patent
Krapf et al.

(10) Patent No.: US 6,901,588 B1
(45) Date of Patent: May 31, 2005

(54) SHARING COMPONENTS BETWEEN PROGRAMMING LANGUAGES BY USE OF POLYMORPHIC PROXY

(75) Inventors: Alexander R. Krapf, Carlisle, MA (US); Neil Galarneau, Wayland, MA (US)

(73) Assignee: Codemesh, Inc., Carlisle, MA (US)

( * ) Notice: Subject to any disclaimer, the term of this patent is extended or adjusted under 35 U.S.C. 154(b) by 0 days.

(21) Appl. No.: 09/551,246

(22) Filed: Apr. 17, 2000

(51) Int. Cl.[7] .................................................. G06F 9/44
(52) U.S. Cl. ...................... 717/164; 717/136
(58) Field of Search .................. 717/164, 136, 717/120; 719/328, 310

(56) References Cited

U.S. PATENT DOCUMENTS

| | | | | |
|---|---|---|---|---|
| 6,094,688 A | * | 7/2000 | Mellen-Garnett et al. ... | 719/328 |
| 6,148,438 A | * | 11/2000 | Schmit ........................ | 717/137 |
| 6,269,373 B1 | * | 7/2001 | Apte et al. .................... | 707/10 |
| 6,272,537 B1 | * | 8/2001 | Kekic et al. ................. | 709/223 |
| 6,324,576 B1 | * | 11/2001 | Newcombe et al. ........ | 709/223 |
| 6,353,923 B1 | * | 3/2002 | Bogle et al. ................. | 717/128 |
| 6,438,614 B2 | * | 8/2002 | Arnold et al. ............... | 709/251 |
| 6,502,213 B1 | * | 12/2002 | Bowman-Amuah .......... | 714/49 |

OTHER PUBLICATIONS

MFC with Visual C++ 5, Mike Blaszczak, Chapter 17, published Apr. 19, 1997.*

World–Wide Web Proxies, Ari Luotonen et al, Apr. 1994, pp. 1–8.*

Dictionary of Object Technology, D.G. Firesmith et al, published 1995, pp. 112, 271–302, 361.*

Rob Gordon, *Essential JNI*, 185–211, 249–289, (1998).

Donald G. Firesmith et al., *Dictionary of Object Technology*, 361, (Sep. 22, 1995).

James J. Odell, *Getting Results with the Object–Oriented Enterprise Model*, 326–337, (Jan. 29, 1996).

Topley, Kim, CORE Java Foundation Classes, Jun. 1, 1998, pp. 1031–1107.

* cited by examiner

*Primary Examiner*—Todd Ingberg
(74) *Attorney, Agent, or Firm*—Fish & Richardson P.C.

(57) ABSTRACT

A method and system for representing and implementing a concept between two functional domains (e.g., programming languages) by using a proxy component in a first domain to wrap a component of a second domain, where the proxy component has a semantic usability in the first domain closely corresponding to the semantic usability of the underlying component from the second domain. Further, provided is a method and system for automatically generating such a proxy component. Such proxy components may be used to gradually transform a digital entity (e.g., a software application) from a first digital domain to a second digital domain. Further, such proxy components may be generated using models that transform a component of a first domain to a component (e.g., a proxy component) of a second domain.

119 Claims, 29 Drawing Sheets

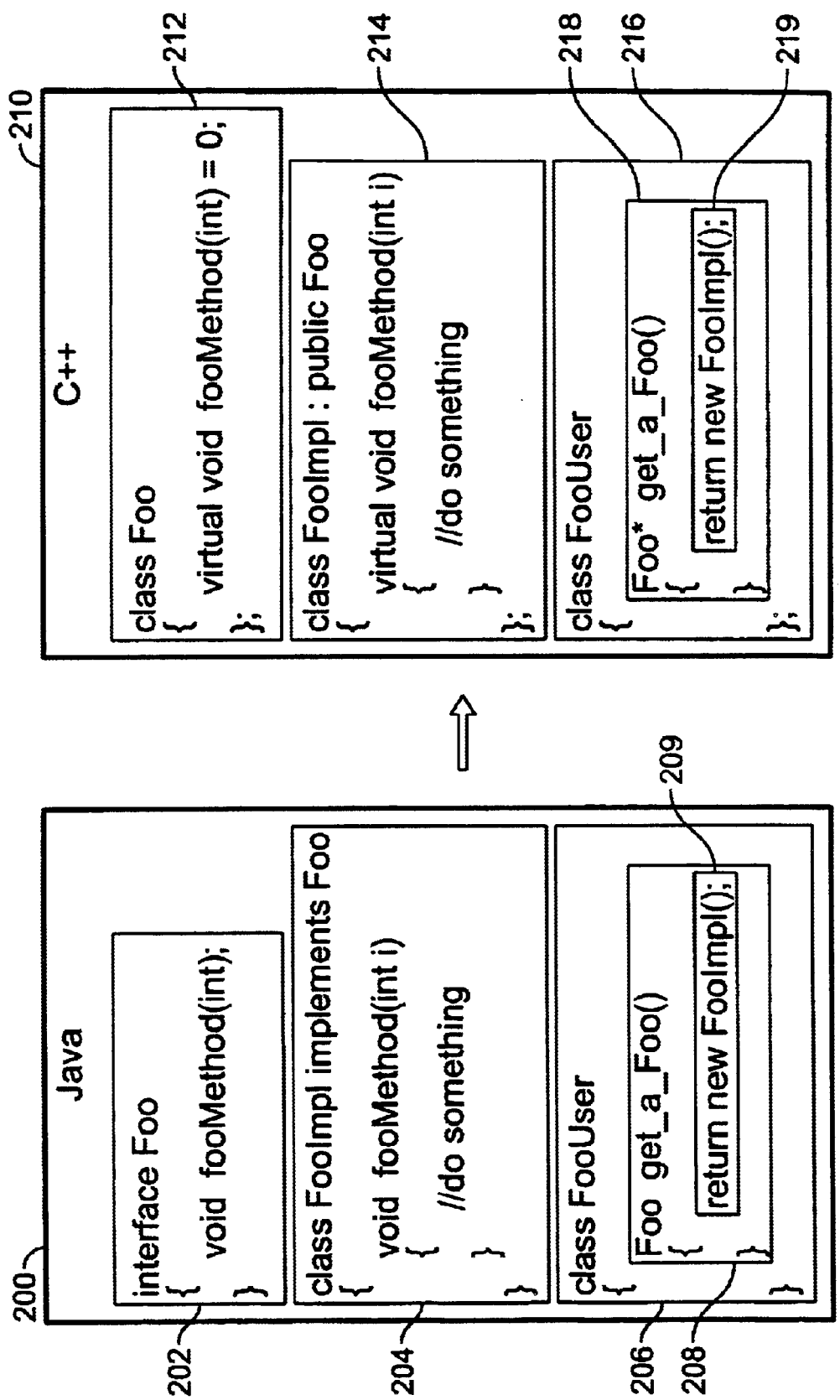

```
                                                                    ┌─220
                          C++
                                          ┌─230
  ┌─────────────────────────────────────────────────────┐
  │ class Foo : protected virtual  jcpp_ref             │
  │ {                          ┌─223                    │
  │   ┌──────────────────────────────────────────┐      │
  │   │ Foo( jobject_obj ) : jcpp_ref( _obj )    │      │
  │   └──────────────────────────────────────────┘      │
  │   {                                                 │
  │      //some JNI code                                │
  │   }                                          ┌─222  │
  │                                   ┌─224             │
  │   ┌──────────────────────────────────────┐          │
  │   │ virtual void   fooMethod(int)        │          │
  │   │ {                                    │          │
  │   │    //call the JNI method using virtual│         │
  │   │    //invocation                      │          │
  │   │ }                                    │          │
  │   └──────────────────────────────────────┘          │
  │ };                                                  │
  └─────────────────────────────────────────────────────┘
                                                 ┌─226
  ┌─────────────────────────────────────────────────────┐
  │ class FooUser                                       │
  │ ,                                        ┌─228      │
  │   ┌──────────────────────────────────────────┐      │
  │   │ Foo  get_a_Foo()                         │      │
  │   │ {                                 ┌─229  │      │
  │   │   ┌──────────────────────────────────────┐│     │
  │   │   │ jobject  aFoo = ...;//call Java method using virtual JNI │
  │   │   │ invocation                           ││     │
  │   │   │   return Foo(aFoo);                  ││     │
  │   │   └──────────────────────────────────────┘│     │
  │   │ }                                        │      │
  │   └──────────────────────────────────────────┘      │
  └─────────────────────────────────────────────────────┘
```

FIG. 5

30
proxy_name (jobject_obj, int_type);

36                           38              40
proxy_name (const proxy_ref* [ref], const char* [fieldName]);

42                                  44                46
proxy_name (const proxy_class* [clazz], const char* [fieldName]);

48                              50        52
proxy_name (const proxy_array* [array], jsize [index]);

FIG. 6

```
class Foo : public java::lang::Object
{
public:
    typedef  jcpp_object_array<Foo>              array1D;
    Foo( const Tnull B );
    Foo( object, int );
    Foo( const jcpp_ref*, const char*);
    Foo( const jcpp_class*, const char*);
    Foo( const jcpp_array*, jsize);
    Foo( const Foo & );
    ~Foo();
    Foo&    operator = ( const Foo &);
    bool    operator == ( const Foo &) const;
    bool    operator != ( const Foo &) const;
    static const jcpp_class*      get_static_class();
    const jcpp_class*             get_class() const;
    static Foo    dyna_cast( const jcpp_ref & _src );
};
```

FIG. 7

```
class jcpp_int : public jcpp_base
{
public:
    typedef jcpp_int_array          array1D;
    typedef (Tobject_array<array1D>)   array2D;

jcpp_int( const jcpp_ref * _ref, const char * _fieldName );
    jcpp_int( const jcpp_class * _ref, const char * _fieldName );
    jcpp_int( const jcpp_int_array * _array, jsize _index );

jcpp_int( const jcpp_int & _rns );
    jcpp_int( );

operator new ( size_t _size );
    operator delete( void * _ptr );

operator           jint ( ) const;

jcpp_int &    operator = ( jint );
    jcpp_int &    operator += ( jint );
    jcpp_int &    operator -= ( jint );
    jcpp_int &    operator *= ( jint );
    jcpp_int &    operator /= ( jint );
    jcpp_int &    operator %= ( jint );
    jcpp_int &    operator ++ ( );
    jcpp_int &    operator -- ( );
    jint          operator ++ ( int );
    jint          operator -- ( int );

const jcpp_class *    get_class() cont;
};
```

Declarations
```
class Foo
{
  static const jint X;
};
class Bar
{
  static jint X;
  jchar ch;
};
```
- 252 class Foo
- 253 static const jint X;
- 254 class Bar
- 255 static jint X;
- 257 jchar ch;

Usage
- 256: int i = Foo::X;
- 258: int j = Bar::X;
- 260: Bar::X = 30;
- 262: jchar k = Bar().ch;
- 264: Bar bar;
- 266: Bar.ch = 'd';

Java

Declarations
```
interface Foo
{
  public static final (int X=25);
}
class Bar
{
  static int X=25;
  char ch = 'a';
}
```
- 232 interface Foo
- 233 public static final (int X=25);
- 234 class Bar
- 235 static int X=25;
- 237 char ch = 'a';

Usage
- 236: int i = Foo.X;
- 238: int j = Bar.X;
- 240: Bar.X = 30;
- 242: char k = new Bar().ch;
- 244: Bar bar = new Bar();
- 246: bar.ch = 'd';

(230)

270

C++

Declarations

272 — class Foo
{
273 — static const jcpp_int X;
};

274 — class Bar
275 — {
277 — static jcpp_int X;
jcpp_char ch;
};

Usage

256 — int i = Foo::X;
258 — int j = Bar::X;
260 — Bar::X += 30;
262 — jchar k = Bar().ch;
264 — Bar bar;
266 — Bar.ch = 'd';

```
public class Counter implements java.io.Serializable
{
    public static final int   UP = 1;
    public static final int   DOWN = 2;

private int   max;
    private int   direction;
```

304a, 308a, 306a, 310a

312a
```
    //creates a new UP-counter with the given maximum
    public Counter( int _max )
    {
        this( _max, UP );
    }
```

314a
```
    //creates a new counter with given maximum and direction
    public Counter( int _max, int _direction )
    {
        max = _max;
        direction = _direction;
    }
```

316a
```
    //counts in the direction specified and outputs the numbers
    public void   count()
    {
        if( direction == UP )
            for( int I=0; I<max; I++ )
                System.out.println( " " + I );
        else if ( direction == DOWN )
            for ( int I=max-1; I>=0; I-- )
                System.out.println( " " + I );
    }
```

318a
```
    //returns true if this instance is an UP counter
    public boolean   isUpCounter()
    {
        return ( direction == UP );
    }
```

320a
```
    //returns the maximum of the counter
    public final int   getMax()
    {
        return max;
    }
```

322a
```
    //creates a counter with the same maximum as this counter, but reverse direction
    public Counter   getReverseCounter()
    {
        return new Counter( max, direction == UP ? DOWN : UP );
    }
}
```

SHARING COMPONENTS BETWEEN PROGRAMMING LANGUAGES BY USE OF POLYMORPHIC PROXY

BACKGROUND

A common problem in software engineering is sharing or making available a software component written in one language to software written in another language. A common solution to sharing a software component with another language is to "wrap" the component with an adapter layer or proxy layer of code. This proxy layer allows software written in another language to interface with the wrapped component. Depending on the software involved, different wrapping technologies may be used. For example, to make a Java™ component available to non-Java software such as a C program, the Java Native Interface (JNI) may be used to develop a proxy layer for the component.

Sharing a component of a first language with other languages is more complex than merely sharing or providing access to data such as, for example, by sharing a database. Typically, programming languages have semantics to be accounted for when developing a proxy layer for a component. This difficulty of developing a proxy layer for a component increases with increased complexity of the semantics of the component.

The Common Object Request Broker Architecture (CORBA) is a technology often used to wrap a component. CORBA, however, is a technology geared more for creation of distributed software systems than for wrapping software components. Accordingly, CORBA includes coding restraints necessary for its other uses that are unnecessary for developing a proxy layer for a component. Further CORBA imposes its own semantics. Therefore, CORBA adds even more complexity to developing a proxy layer for a component.

Another common problem in software engineering is transferring (i.e., porting) a program, or part of a program, written in a first programming language (e.g., C++) to a second programming language (e.g., Java). An ideal solution to this problem would be an automatic translation tool that could automatically translate source code from a first language into source code of a second language that is maintainable by humans. The applicants, however, are not aware of such a translation tool. A typical solution to porting a program is to create manually (i.e., write the code for) the program in the second programming language. Such manual porting, however, involves a risk that the program will not work properly, or at least not have the same behavior as the legacy program. This risk, as well as the difficulty in scheduling and managing the porting process, increases with increased size and complexity of the application. For example, for a program with over a million lines of code, the risk, management, and scheduling of a manual conversion may make manual conversion an unrealistic option.

SUMMARY

The semantics of a programming language affect the usability of a component in the domain of the programming language. If a component of a first language has a usability in accordance with the semantics of the first language (i.e., semantic usability), it is difficult to wrap this component such that the wrapper or proxy component has a corresponding usability in a second language. Specifically, it is difficult to develop such a proxy component that has such a corresponding usability in the second language in accordance with the different semantics of the second language.

If the semantic usability of a proxy component does not closely correspond to the semantic usability of an underlying component of another domain, the proxy component may have restricted usability as a specific solution to a specific problem under limited circumstances. Such a restricted proxy component is not generally useful in the programming language for which it is written.

Accordingly, provided is a method and apparatus for representing and implementing a concept between two functional domains (e.g., programming languages) by using a proxy component in a first domain to wrap a component of a second domain, where the proxy component has a semantic usability in the first domain closely corresponding to the semantic usability of the underlying component from the second domain. Further, provided is a method and apparatus for automatically generating such a proxy component. Such proxy components may be used to gradually transform a digital entity (e.g., a software application) from a first domain to a second domain. Further, such proxy components may be generated using robust models that transform a component of a first domain to a component (e.g., a proxy component) of a second domain.

BRIEF DESCRIPTION OF THE DRAWINGS

In the drawings

FIG. 3 is a Java code fragment illustrating an example of Java components;

FIG. 4 is a C++ code fragment illustrating an example of C++ proxy components wrapping the Java components of FIG. 3, but not having semantic usabilities closely corresponding to the semantic usabilities of the Java component of FIG. 3;

FIG. 5 is a C++ code fragment illustrating an example of a C++ proxy components wrapping the Java components of FIG. 3, and having semantic usabilities closely corresponding to the semantic usabilities of the Java component of FIG. 3;

FIG. 6 is a C++ code fragment illustrating an example of C++ context constructors;

FIG. 7 is a C++ code fragment illustrating an example of a C++ proxy class;

FIG. 8 is a C++ code fragment illustrating an example of a C++ primitive proxy class;

FIG. 9 a Java code fragment illustrating an example of a Java components and Java assignment statements in several contexts, where the context usability of the Java components each have a context usability permitting usage in each of several contexts;

FIG. 10 is a C++ code fragment illustrating an example of a C++ proxy components wrapping the Java components of FIG. 8, and C++ assignment statements in several contexts and corresponding to the Java assignment statements of FIG. 8, where the C++ proxy components do not have a context usability permitting usage in each of the several contexts;

FIG. 11 a C++ code fragment illustrating example C++ proxy components wrapping the Java components of FIG. 8, and C++ assignment statements in several contexts and corresponding to the Java assignment statements of FIG. 8, where the C++ proxy components have a context usability permitting usage in each of the several contexts;

FIG. 24 is a Java code fragment illustrating an example of Java class;

TERMINOLOGY

Figure 1:
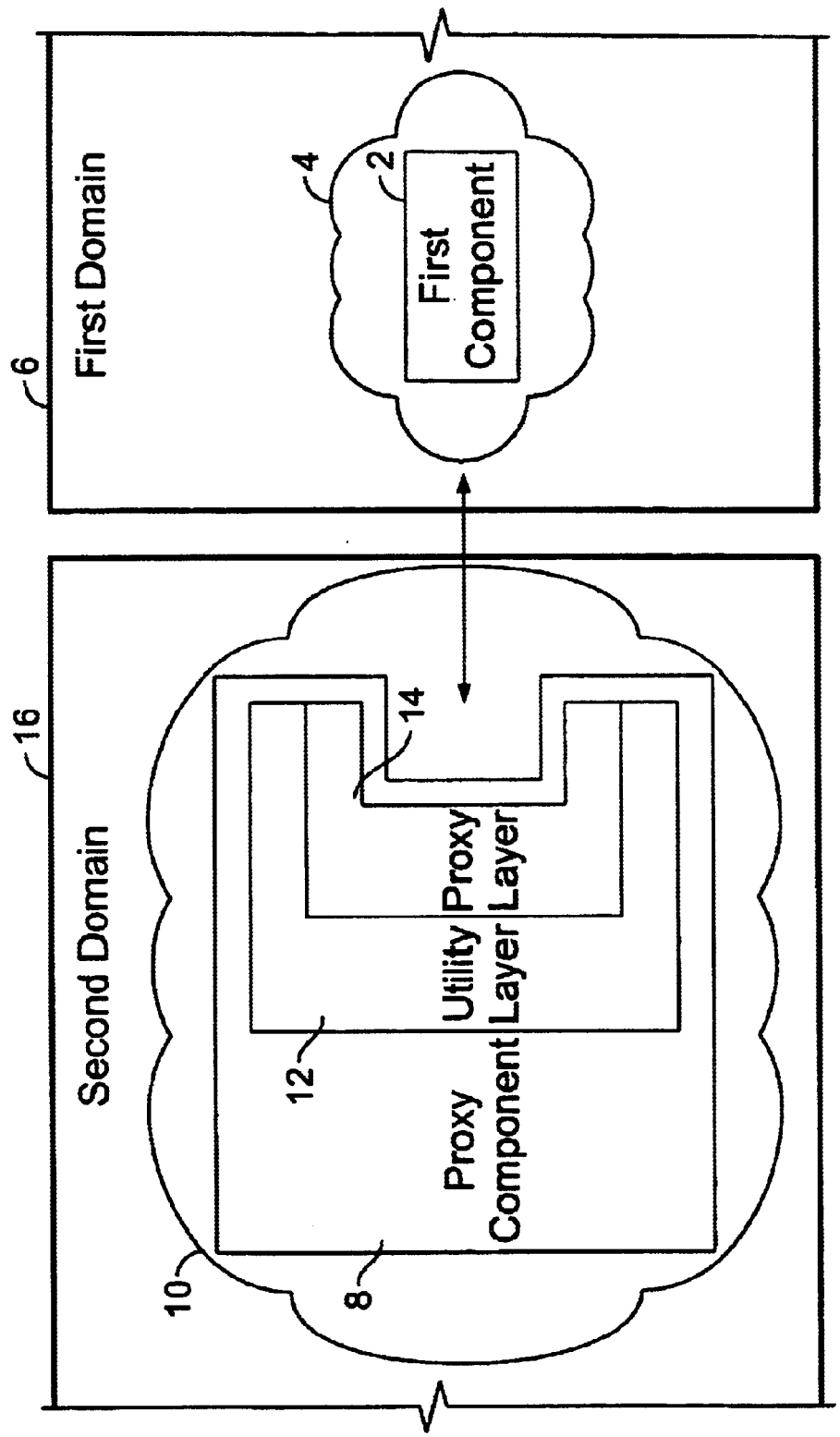
FIG. 1 is a block diagram illustrating an example proxy component.

Software engineering employs a complex lexicon of terminology, wherein a single term may have several meanings, depending on the context and the individual using the term. Accordingly, to clarify uses of terminology in the present application, the following terms are defined as follows.

A "digital domain" as used herein is a digitally-based technology capable of digitally representing a concept. A concept may be anything from a simple concept such as, for example, a number, ranging to a complex concept such as, for example, a control system for a spacecraft or even a person. A concept has state (e.g., on, off) and may have behavior (i.e., the ability to change state—e.g., turn on, turn off). A dynamic concept is a concept having state and behavior such as, for example, a person, whereas a static concept is a concept having only state such as, for example, a number.

A "functional domain" as used herein is a digital domain that provides a framework for digitally representing a dynamic concept. Thus, functional domains have the ability to describe the state of a thing and the behavior of the thing, whereas other digital domains (i.e., non-functional domains) have the ability to describe only the state of a things.

Functional domains include, but are not limited to, programming languages and object architectures such as, for example, CORBA and the Component Object Model (COM). Non-functional domains include, but are not limited to: document formats such as, for example, the Hyper-Text Markup Language (HTML) and the extensible Markup Language (XML); and data format standards such as, for example, MPEG for video images, and NTSC (National Television Standards Committee) for video signals.

Both functional and non-functional domains provide the ability to define data structures to organize information representing state. Functional domains, however, also provide operators and the ability to define higher-level functional abstractions (e.g., functions, procedures, methods) to represent behavior of the information. Functional abstractions may define and modify the state of the information.

A "digital entity" as used herein is a digital representation of a dynamic concept defined by a combination of interrelated components (or components of components, etc.). Typically, the dynamic concept represented by the digital entity is more complex than the concepts represented by the individual components of the digital entity. These individual components may be static or dynamic. If a functional domain is a programming language, a digital entity may be, for example, a program.

A functional domain may provide both a set of lexical productions and a method for representing concepts (both static and dynamic). The lexical productions use a specific alphabet of symbols as building blocks (i.e., terminal symbols) to form lexical tokens. Lexical tokens may be combined to assemble syntactical productions. A syntactical production may be considered a higher level abstraction than a lexical token. A syntactical production such as, for example, an expression (e.g. "A+B"), may be combined with one or more other syntactical productions to form another syntactical production such as, for example, a function.

For example, if the functional domain is the Java programming language, then the alphabet is the Unicode character set. Java's set of lexical productions uses the Unicode character set to create the lexical elements, including white spaces, comments, and lexical tokens. The lexical tokens of Java include identifiers (e.g., "A"), keywords (e.g., "public"), literals (e.g., "tes"), 1.2, 'a', –5), separators (e.g., ";"), and operators (e.g., "+"). These lexical tokens may be combined to form a syntactical production such as, for example, a type, a method, a field, a class, a compilation unit, etc.

A "component" as used herein is any element defined in a digital domain at a level of abstraction higher than lexical elements or any element derived from such elements. Thus, a component may be, for example, an expression, a variable, a line of code, a component, a procedure, a method, a function, an object, a program, etc.

A "source component" as used herein is a component in source-code form, i.e., written in source code. The use of the term "source" in this context ("source component") is unrelated to the use of the term "source" in the context of a transformation from a "source" domain to a "target domain" discussed in more detail below.

A "compiled component" as used herein is a compiled source component, i.e., a L component in machine-code form or in any form that is more suitable for machine interpretation than a source file. For example, a Java class file is more suitable for machine interpretation than a Java source file.

"Syntax" as used herein is the set of syntactical productions from which a source component of a functional domain can be composed. Syntax serves as a guide for a compiler, or equivalent program, that parses a source component and translates the source component into a compiled component.

A "high-level component" as used herein is a component that uses other components to represent a discrete concept In programming languages, high-level components may include high-level data components, high-level functional components, and objects (objects are defined below). Examples of high-level data components may include, but are not limited to, records and arrays, but would not include lower-level data components such as, for example, characters and integers. High-level functional components may include, but are not limited to, functions, procedures, and methods, but would not include lower-level functional components such as, for example, operators, which do not include other components, and fragments of code that do not represent a discrete concept such as, for example, a line of code of a multi-line procedure.

A "sub-component" as used herein is a component contained within a high-level component. For example, in the Pascal programming language, an expression may be a sub-component of a procedure. Further, in an object-oriented programming language (OOPL), discussed below in more detail, a method (which is a high-level component itself) may be a sub-component of a class.

A "high-level sub-component" as used herein is a high-level component contained within a high-level component. For example, in an OOPL, discussed below in more detail, a method may be considered a high-level sub-component of a class.

The term "proxy component" as used herein is a component defined in a first functional domain such that execution of the proxy component at runtime in the first functional domain results in execution of one or more components in the second functional domain. A proxy component may also be referred to herein as a wrapper. For example, if the first domain is the C++ programming language, and the second domain is the Java programming language, a C++ proxy class is a C++ class that delegates execution of methods and access of fields to a corresponding Java class.

The ability of a component to represent properly a concept in a functional domain depends on a number of factors. One factor is adherence to the syntax of the functional domain. Proper syntax is a minimum criteria that must be satisfied in order for successful compilation of a component.

The term "semantics" as used herein refers to other factors (besides syntax) that affect the ability of a component to represent properly a concept in a functional domain. Semantics may be considered as the meaning of a component in the context of a functional domain, as opposed to the structure of the component, i.e., the syntax.

Semantics as used herein may include run-time behavior such as, for example allocation and deallocation of memory, garbage collection, thread management, loading components into memory, and linking components (which also may occur at compile-time). Semantics of a digital domain may also include the usability of a component. For example, typical semantics of a programming language may require that the type of a variable be defined-before the variable is assigned a value. Another related usage rule for programming languages is that a variable may only be assigned a value of its defined type. Consequently, an attempt to assign a value to a variable of undefined type or to assign a value of a type different from that defined for a variable may result in a compile-time or run-time error. Depending on the particular functional domain, the semantics may be more complex. For example, depending on the semantics of a programming language, the usability of a component may be defined by at least the component's: accessibility, mutability, inheritability, instantiability, ability to be polymorphic, context-usability, or any combination thereof.

As used herein, "semantic usability" refers to the usability of a component in accordance with the semantics of the component's functional domain.

As used herein, "accessibility" refers to the ability of a component to be accessed by other components of a digital domain. For example, in the programming language C++, declaring a field as private limits the accessibility of the field to the declaring class.

As used herein, "mutability" refers to the ability of the components to be changed or to cause change. For example, in some programming languages, a component may be declared as "constant," and therefore not changeable (i.e., not mutable).

As used herein, "inheritability" refers to the ability of a component to have any of its properties inherited by other components. For example, in the Java programming language, a class declared with the keyword final cannot have any subclasses. In another example, in the C++ programming language, the virtual keyword being or not being used in method declarations has a big impact on the suitability of a class as a superclass.

As used herein in the context of an OOPL, "instantiate" means to create an instance (of an object). For example, if a method may be declared to return an object, then the implementation of the method may instantiate an object to return as the result.

As used herein, "instantiability" refers to the ability to create an instance of a component. For example, in the Java programming language, a Java interface cannot be instantiated, i.e., it is not instantiable.

As used herein, "polymorphicability" refers to the ability of a component to be polymorphic, i.e. the ability to exhibit the property of polymorphism. Polymorphism is typically, although not necessarily exclusively, a feature of an object-oriented programming language that permits an instance of a type (e.g., a class) to be referred to as an instance of a related type (e.g., superclass). Typically, although not necessarily, the relationship is an inheritance relationship. For example, an instance of a Java class may be referred to as an instance of a superclass extended by the Java class.

As used herein, "context-usability" refers to the ability of a component to be used in one or more contexts. For example, depending on the programming language, a component may be used in the context of: an instance field, a class field, an array element, a stand-alone object, a method argument and a return value. The semantics of a programming language control the use of a component in each of these contexts.

Other terms that are used frequently herein include: implement, invoke, abstract, concrete, and object. To "implement" as used herein means to provide code that performs a task associated with (or that is to be associated with) a declaration. In other words, to implement means to provide code that honors the contract made through (or that is to be made through) a declaration.

As used herein, "invoke" means to call or execute. For example, a proxy component may invoke a JNI function to access a Java component.

As used herein, an "abstract" component is a component defined such that it cannot be instantiated and a "concrete" component is a component defined to be instantiated.

Although the term "object" has several meanings in the field of software engineering, as used herein, an "object" is a component defining state and behavior, and is not limited to the strict definition of an object of an OOPL. An object is capable of representing a dynamic concept by itself. For example, in a procedural programming language, an object may be a component of a program that includes variables to define state and a functional abstraction such as, for example, a function, procedure or method, to define behavior and change the state of the variables.

In an OOPL, objects may have members such as, for example, methods that define a behavior of the object and fields that define the state of the containing object. A field may be of type object or type primitive. A primitive type is a fundamental data type provided by a language. Primitive types are specific for each programming language, but typically include characters, booleans and numbers such as, for example, integer.

For example, an object representing a column of a spreadsheet may contain: a method for calculating the sum of the values of all the cells in the column, a field of primitive type for representing the column number, and field of object type representing a cell of the column.

DETAILED DESCRIPTION

The following detailed description should be read in conjunction with the attached drawing in which similar reference numbers indicate similar structures. All references cited herein are hereby expressly incorporated by reference.

A proxy component has a semantic usability in a first domain that closely corresponds to the semantic usability of a shared component in a second domain when the proxy component is generally useful in the first domain, rather than restricted in use as a specific solution to a specific problem. To create a proxy component that has a semantic usability in a first domain that closely corresponds to the semantic usability of a shared component of a second domain, rules and heuristics based on knowledge of the semantics of the first and second domains may be applied to determine default component mappings between the two domains.

Close correspondence of semantic usability may be achieved from the application of these rules and heuristics. A default mapping is a mapping that may be applied generally for a particular type of component, but that may be overridden (i.e., customized) for a specific component if desired.

Different rules and heuristics may be applied depending on the domains involved and the components being mapped. The close correspondence of semantic usability between two components of different domains often is limited by the dissimilarities between the semantics of the two domains, as opposed to being limited by lack of knowledge from which the rules and heuristics are developed. For example, Pascal provides neither classes nor modifiers that enforce inheritability semantics. Consequently, the inheritability of a Pascal proxy component may not correspond too closely to the inheritability of a Java class.

FIG. 1 is a block diagram illustrating an example embodiment of sharing a component with other functional domains. First component 2 of first functional domain 6 has a first semantic usability 4 in the functional domain 6.

Proxy component 8 of second functional domain 16 has a semantic usability 10 in the second functional domain closely corresponding with semantic usability 4. Proxy component 8 includes a proxy layer 14 that wraps first component 2 such that first component 2 may be accessed by the second domain 16. Proxy component 8 may also include a utility layer 12 to facilitate access and use of the proxy component 8 by other components of the second functional domain 16. The semantic usability 10 may be implemented by utility layer 12, or proxy layer 14, or any combination of the two.

As described above, depending on the functional domain of the first component 2, the semantic usability of a first component 2 may be defined by at least the first component's: accessibility, mutability, inheritability, instantiability, polymorphicability, context usability, or any combination thereof. Accordingly, in various embodiments of a proxy component having a semantic usability closely corresponding to the semantic usability of the component that it wraps, the proxy component's accessibility, mutability, inheritability, instantiability, polymorphicability, context usability, or any combination thereof may be determined from the accessibility, mutability, inheritability, instantiability, polymorphicability, context usability, or any combination thereof of the wrapped component.

Figure 2:
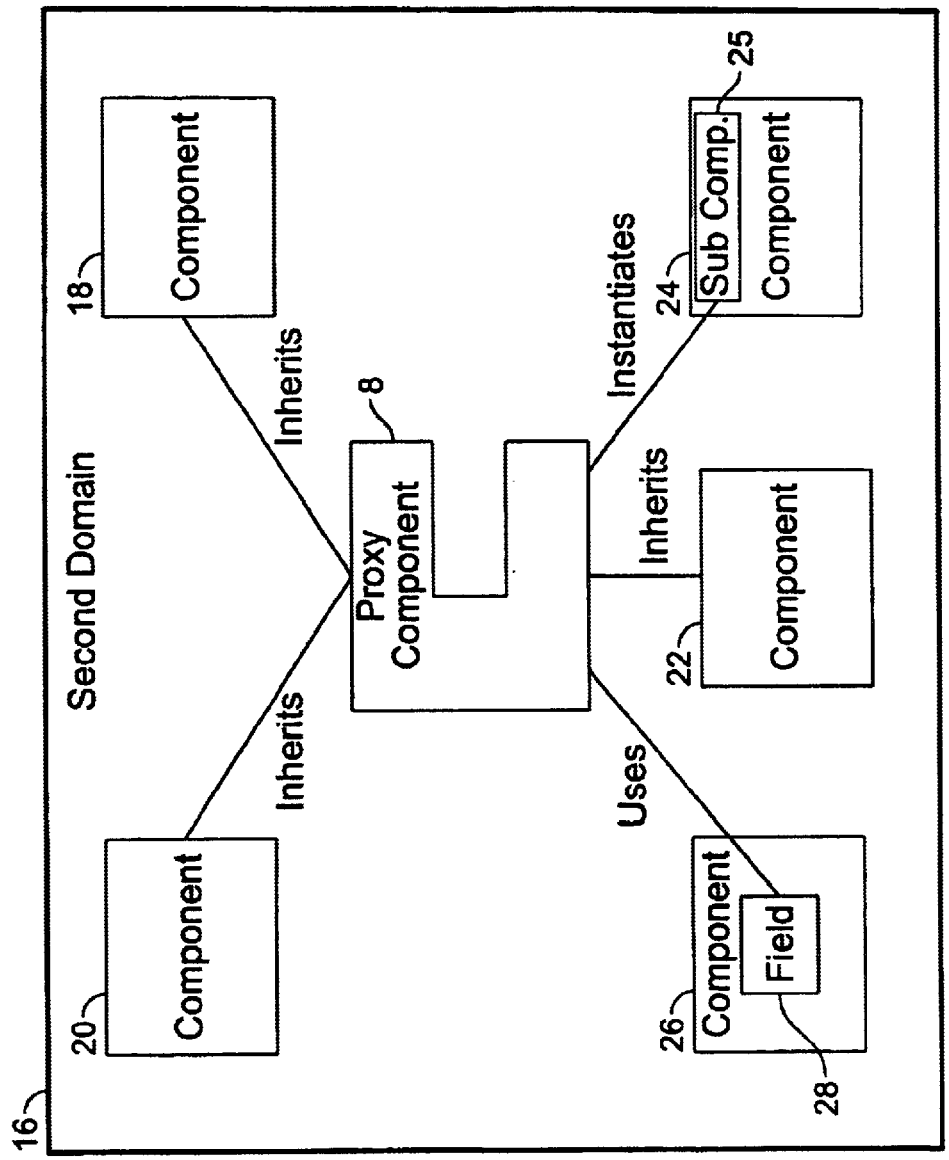
FIG. 2 is a block diagram illustrating an example proxy component and related components of a functional domain.

FIG. 2 is a block diagram illustrating example possible uses of proxy component 8 in functional domain 16 that may be impacted by the semantic usability of proxy component 8. For example, depending on the functional domain, proxy component 8 may inherit from components 18 and 20. For example, if the proxy component 8 were a C++ proxy component, the C++ proxy component 8 may inherit from C++ superclasses 18 and 20.

The proxy component 8 also may be inherited by another component 22 of functional domain 16. For example, if functional domain 16 is the C++ programming language, then C++ proxy component 8 may be a C++ proxy class serving as a super class for a C++ class 22.

Proxy component 8 may also be instantiated by a subcomponent 25 of component 24. For example, a C++ proxy class 8 may be instantiated by a C++ method 25 of a C++ class 24. The C++ proxy class 8 may be defined such that it may not be instantiated such as, for example, if C++ proxy class 8 includes pure virtual methods. Pure virtual methods are described below in more detail.

Proxy component 8 may be used as a field 28 of another component 26 of the second domain 16. For example, a C++ proxy class 8 may be used as an instance field 28 of a C++ class instance 26. Such use may depend on whether C++ proxy class 8 is accessible to C++ class instance 26 and whether C++ proxy class 8 may be used in this context (i.e., as an instance field).

Each of components 18–28 may be a proxy component itself, which adds another level of complexity to providing proxy component 8 that has a semantic usability in the second functional domain 16 closely corresponding to the semantic usability of first component 2 in the first domain.

If a component is shared between two domains, a C++ proxy component representing a first concept has a semantic usability closely corresponding to the semantic usability of a Java component representing the first concept. In one implementation, the Java Native Interface (JNI), a Java Application Programming Interface (API), may be used to code the proxy layer of the C++ proxy component. In another implementation, other interfaces such as, for example, Microsoft's Raw Native Interface (RNI) or Netscape's Java Runtime Interface (JRI), may be used to code the proxy layer of the C++ proxy component. In either implementation, the interface being used is supported by the targeted Java Virtual Machine (JVM).

Several example embodiments of components, semantics, usability, rules, heuristics and default mappings are described below in connection with Java, C++, and JNI. These embodiments are merely illustrative and not limiting, and may be applied to other functional domains.

Further, although each embodiment is discussed separately below, various aspects of each embodiment may overlap. Thus, the following separate descriptions are not meant to be exclusive to a particular embodiment, but each description may have application to other embodiments described below.

JNI

JNI is a Java API that may be used to develop a proxy layer between Java and C. A C program may call and be called by many other languages. Accordingly, a JNI proxy layer may be used as part of a proxy layer between Java and components of one of these many other languages. Thus, a developer who knows Java, JNI and C can use JNI to call Java components from C and vice versa.

If a developer also knows C++, the developer can use JNI to develop a proxy layer to call Java components from C++ or vice versa For a more detailed description of Java, see *The Java Language Specification,* 1996, by James Gosling et al (Gosling). For a more detailed description of C++, see *The C++ Programming Language, Third Edition,* 1997, by Bjarne Stroustrup (Stroustrup). For a more detailed description of JNI, see *The Java Native Interface Programmer's Guide and Specification,* 1999, by Sheng Liang (Liang).

Applicants have discovered, however, that JNI is a complex interface for which it is difficult to write proxy layers that execute properly even for developers that know both C and Java. This difficulty arises because JNI is a low-level API, almost at a level equivalent to assembly language. Consequently, a developer is forced to leave an object-oriented level of abstraction to utilize JNI. Further, JNI is not strongly type-checked, resulting in more bugs that typically are hard to find. For these and possibly other reasons, JNI currently is underutilized as an interface.

Although JNI addresses the requirements for low-level conversions, JNI does not address C++ specifically, beyond providing a C++ binding for JNI functions. Further, a developer must not only have knowledge of both C++ and Java, but know how to adapt C++ language components into C components that can invoke JNI functions that access Java components. Even if a developer has such knowledge, developing (i.e., writing, testing, and modifying) JNI code for a C++-to-Java interface adds more time and cost to the development of a program.

Another drawback of using JNI is that JNI source code is often difficult for a C or C++ developer to understand (except perhaps for the developer who wrote it). Further, a program using JNI often has excess code caused by several components of the application including JNI code (often redundant JNI code) to proxy to Java components. Such excess code is more likely if a developer is inexperienced in coding with JNI.

Three particular aspects of JNI that impact generating C++ proxy components are: JNI thread management; JNI object-reference types; and JNI context-dependency. JNI thread management imposes a requirement that a thread originally created in a C or C++ program must explicitly be attached to a JVM before other JNI calls can be made on this processing thread. Most JNI function invocations take a JNIEnv pointer as an argument. The JNIEnv pointer is specific to a thread, i.e., attaching the thread to the JVM returns a JNIEnv pointer that must not be used from other threads.

JNI has three object reference types, called local, global and weak global. Local references are only valid within the thread that created them, whereas global and weak-global references are valid among all threads that are attached to the JVM.

JNI provides different JNI functions for different JNI-object reference types. To create a new object reference for an existing object, a developer must choose between JNI functions: NewLocalRef; NewGlobalRef; or NewWeakGlobalRef. Accordingly, in JNI, one of the following JNI functions must be used to notify the JVM of the release of an object: DeleteLocalRef; DeleteGlobalRef; or DeleteWeakGlobalRef, depending on the object-reference type. See Liang for a more detailed description of the different types of JNI references.

JNI context-dependency means that JNI function invocation is context-dependent. In other words, JNI provides different functions depending on the context of the object invoking the function. JNI object contexts include: stand-alone object; class (i.e., static) variables; instance variables; and array elements. In contrast, in both C++ and Java, the use of an object is not context-dependent, i.e., to use an object, the developer does not have to pay attention to the context in which the object resides. As used herein, the "JNI contexts" refer to these four contexts.

For example, in C++ and Java, the developer does not have to differentiate between a string used as an array element, a string used as a stand-alone object or a string used as an instance- or class-field. The usage of the string in all cases is identical.

JNI provides context-dependent functions to retrieve (i.e., return) the value of an object reference. To retrieve the value of an instance object field, for example, JNI provides the GetObjectFieldi function. To retrieve the value of a static object field, the GetStaticObjectField function is used. To retrieve an element of an array, the GetObjectArrayElement function is used. JNI does not provide a specific function to retrieve stand-alone objects.

The impact of these aspects of JNI on creating C++ proxy components that have semantic usability closely corresponding to the Java components that they wrap is explained in more detail below.

Java Package→C++ Namespace

A Java package may be mapped by default to a C++ namespace. Accordingly, in an embodiment of sharing a Java component, a C++ namespace representing a first concept provides a proxy layer to a Java package representing the first concept, and has a semantic usability closely corresponding to the semantic usability of a Java package.

The Java component package naturally maps to the C++ component namespace. Both elements are abstraction mechanisms for organizing and modularizing components of a program. Although C++ uses namespaces only for managing the visibility of declarations, Java has accessibility rules associated with the membership of a class in a package. This accessibility aspect of a Java package is not readily adaptable to C++. Although the remaining aspects of a package map to a namespace relatively straightforward, there is a complication in relation with the default package in Java.

The Java default package is the package in which classes reside that have not had a package specified. As such, the Java default package may be considered analogous to the C++ unnamed namespace or C++ namespace without a name. C++ has two namespaces that do not have a name, the global namespace and an explicitly declared namespace without a name. The latter may be referred to herein as the unnamed namespace.

Any declarations made in the global namespace are visible from every other namespace. In contrast, the unnamed namespace typically is used to make declarations local to a compilation unit. Neither the global namespace nor the unnamed namespace represent all aspects of the Java default package. The compilation-unit-local property of the C++ unnamed namespace renders the C++ unnamed namespace unsuitable as the C++ component corresponding to the Java default package. A namespace named "default" (or some such name) may be used to represent the default package, but such a namespace may clash with a namespace named "default".

Accordingly, in an aspect of mapping a Java package to a C++ namespace, Java packages are mapped to C++ namespaces of the same name with the C++ namespace hierarchy mirroring the Java package hierarchy. Optionally, the Java default package may map to the global namespace.

Even though namespaces are a part of the C++ standard, C++ compilers that do not support namespaces or have bugs associated with the use of namespaces may still be in use. To support the use of C++ proxy component on such compilers, in another aspect of mapping a Java package to a C++ proxy component, the package name may be made part of a C++ proxy class name, i.e. a fully qualified name may be generated. For example, the String class of the java.lang package may be wrapped by a C++ class named java_lang_String).

Java Interface→Instantiable C++ Proxy Class

A Java interface is a Java reference type whose members are abstract methods and public static final fields representing constant values or constant references. The Java interface is used to establish a "calling contract" that can be implemented by concrete classes. For example, a Java "factory" method declared to return an interface guarantees (i.e., contracts) to other Java components that it will return an instance of a concrete class that implements the Java interface. In other words, the factory method guarantees that it will return an object that meets minimum criteria defined by the interface.

Java interface in this context is a Java data abstraction similar to a Java class. Thus, the use of the term "Java interface" in this context should not be confused with any use of the term "interface" to describe a C++/Java proxy layer.

Another possible use for a Java interface is as an empty interface (i.e., so-called "marker interface") which does not declare any methods. Yet another use for a Java interface is as a container for constant values.

Java semantics do not allow Java interfaces to be instantiated, but allow concrete classes to implement these interfaces. Also, Java semantics allow a concrete class to implement multiple interfaces, which can result in a concrete class implementing the same interface along different paths. For example, a Java class that implements an interface may also extend a class that implements the same interface.

FIG. 3 is a Java code fragment illustrating an example embodiment of Java components, including a Java interface Foo 202, a concrete Java class FooImpl 204, and a Java class FooUser 206. The interface 202 includes a method fooMethod that by virtue of being declared in a Java interface is an abstract method. The concrete class 204 is defined to implement the interface 202. The class 206 includes a factory method get_a_Foo 208 that is declared to return an instance of a concrete class that implements Java interface 202. The body 209 of factory method 208 satisfies this calling contract by creating and returning an instance of concrete class 204. In another example, Java component 200 may include several concrete classes that implement Java interface 202. In this case, the factory method body 209 may include logic that defines which concrete class will be instantiated depending upon an object state at the time at which the factory method 208 is invoked.

In C++, a class having no instance data and only pure virtual methods correlates loosely to a Java interface. As used herein, a "C++ interface" is a C++ class including no instance data and only pure virtual methods.

A concrete C++ class may define an interface to be one of the concrete class' superclasses. In such a situation, each pure virtual method of the C++ interface has an entry in the concrete class's virtual function table and can be invoked polymorphically. Thus, the concrete C++ class provides an implementation for each pure virtual method of a C++ interface. C++ semantics, however, prohibit the instantiation of a C++ interface. If a concrete C++ class implements a C++ interface, to refer to the concrete C++ class as the C++ interface, the C++ class must be referred to through a pointer or a reference to the C++ interface. A pointer is an indirection mechanism used in C and C++ that does not require the pointed-to instance to be of the exact type of the declared pointer. Thus a pointer can be used to refer to a C++ instance as a C++ interface instance even though C++ interfaces cannot be instantiated.

Consequently, if a C++ interface needs to be used, for example as a field or as a method argument or as a method return value, C++ semantics enforce the use of pointers or references.

It may be desired to wrap a Java interface with a C++ proxy interface so that 1) C++ components may access and use the Java interface itself (discussed immediately below), and 2) to implement the abstract methods of the Java interface with concrete C++ methods(discussed below in connection with cross-domain callback patterns and FIGS. 14–17).

Although a Java interface appears to transform relatively simply to a C++ proxy interface, it does not.

FIG. 4 is a C++ code fragment illustrating an example embodiment of C++ proxy components 210 wrapping Java components 200 of FIG. 3, but not having semantic usabilities closely corresponding to the semantic usabilities of the Java component of FIG. 3. C++ proxy components 210 result from applying an incorrect mapping to Java components 200. C++ components 210 includes a C++ interface Foo 212, a concrete class FooImpl 214, and a class FooUser 218. The concrete C++ class 214 implements the C++ interface 212 by declaring the C++ interface 212 as its superclass. Class 216 contains a method get_a_Foo 218 that guarantees to return a pointer to an instance of a concrete class that implements interface 212. The body 219 of factory method 218 satisfies the guarantee by creating and returning an instance of concrete class 214. If the C++ components 210 of FIG. 4 were non-proxy components, they would have semantic usability closely corresponding to the Java components 200 of FIG. 3. In contrast, if C++ components 210 are proxy components, they do not implement properly the dynamic concept represented by the Java components 200 for the following reasons.

If the C++ components 210 are proxy components, the C++ proxy method 218 can only guarantee that it returns a C++ proxy object which implements C++ interface 212. Because C++ interface 212 cannot be instantiated, an instance of a concrete C++ class needs to be returned as the result. Java method 208 only contracts to return an instance implementing Java interface 202, so in general the concrete type of the instance that is being returned is unknown.

Although source code inspection of Java method 208 would yield the concrete type, it is impossible to rely on the presence of source code under all circumstances. This problem becomes more apparent if frequently-implemented Java interfaces like Serializable or Clonable are considered.

For example, a Java method declared to return a Serializable instance would be impossible to map to a C++ proxy method in this fashion. Such a C++ proxy method could not possibly be implemented to anticipate all classes that implement the Serializable proxy interface and return an instance of the appropriate concrete proxy class. Another consequence of this design is that the addition of a new Java class implementing Serializable would necessitate the modification of aforementioned C++proxy method to account for a new concrete Java class.

A solution to this problem is to have the C++ proxy method 218 declared to return an instance of the actual C++ proxy interface 212 itself. This declaration allows all callers of the proxy method 218 to use the method result in accordance with the contract established by interface 212. To be able to return an instance of the C++ proxy interface 212, it must be instantiable.

Therefore, a Java interface may be mapped by default to a to an instantiable C++ proxy class. Accordingly, an instantiable C++ proxy class representing a first concept may wrap a Java interface representing the first concept, and may have a semantic usability closely corresponding to the semantic usability of the Java interface.

For the C++ proxy interface 212 to be instantiable, the methods contained in the C++ proxy interface 212 must not be declared pure virtual. Generating instantiable C++ proxy interfaces and the methods that they contain has an impact on the declaration of C++ proxy methods, as will be discussed in more detail below.

Thus, by making instantiable a C++ proxy interface that wraps a Java interface, C++ proxy components can properly access and execute the Java interface through the C++ proxy interface, and properly access and execute Java components that use the Java interface, such that the concepts represented by the Java interface and Java components are implemented properly.

FIG. 5 is a C++ code fragment illustrating an example embodiment of C++ proxy components 220, including C++ proxy interface 222 and C++ proxy class 226 that may wrap Java interface Foo 202, a concrete Java class FooImpl 204, and a Java class FooUser 206, respectively. In this example, proxy class jcpp_ref 230 represents a proxy support base class. Proxy support classes are described in more detail below. Proxy constructor 223 initializes instances of C++ proxy class 222. Proxy constructors also are discussed below in more detail. C++ proxy interface method 224 uses the virtual JNI invocation technique (also discussed below in more detail) to call a correct Java implementation of this C++ proxy method.

C++ proxy method 228 may return a pointer to an instance of a concrete C++ proxy class that implements the C++ proxy interface 222, or may return a pointer for other reasons. Alternatively, the C++ proxy method may return an instance of the C++ proxy interface 222 itself, as indicated in the method declaration and the body 229 of the method 228.

By obviating the need for use of pointers, the C++ proxy classes also become more usable for the following reasons. Often, results returned by methods are not required for further processing and, consequently, developers choose to ignore the return value of a method. If a pointer to a newly allocated object is returned, however, that object is typically allocated on the program's heap. Consequently, to prevent resource leaks from occurring, the instance referred to by the result pointer is freed explicitly by the caller. Thus, the caller maintains the result pointer until explicitly freeing it. This maintenance clashes with the developer's desire to simply ignore the result, which is something that is possible in Java with Java method 208. Therefore, by obviating the need for using a pointer, callers of the C++ proxy classes may ignore the result, and need not maintain and explicitly free a result pointer.

C++ proxy interface 222 may have data that maintains the JNI object reference (not shown in FIG. 4). Because the C++ proxy interface 222 may possess instance data, concrete C++ classes or proxy classes inherit virtually from this C++ proxy interface to prevent multiple inclusion of instance data in the C++ class derived from the interface. Virtual inheritance prevents any derived C++ classes (including derived proxy classes) from maintaining multiple memory locations for the same C++ proxy interface 222 and all the problems associated with this situation. Virtual inheritance is discussed in more detail in Stroustrup.

Java Class→C++ Proxy Class

A Java class may be mapped by default to a to a C++ proxy class. Accordingly, in an embodiment of sharing a Java component, a C++ proxy class representing a first concept provides a proxy layer to a Java class representing the first concept, and has a semantic usability closely corresponding to the semantic usability of the Java class. Optionally, the accessibility of each member of the C++ proxy class is determined from one or more properties such as, for example, accesibility, of a corresponding member of the Java class.

Private members of the Java class are by definition only accessible to the declaring Java class itself so there is no need to make them accessible to callers in another domain. Accordingly, in an aspect of mapping a Java class to a C++ proxy class, private members of the Java class need not be mapped at all, but may be omitted from the C++ proxy class or struct.

For illustration purposes, in the description below, it will be assumed that C++ proxy classes, as opposed to C++ structs (or C++F unions), wrap Java classes, although the same general considerations are applicable if a C++ proxy struct wraps a Java class. Although a union may be able to represent a C++ proxy type, its usage may introduce complications such that's its use may be of no additional value.

Because the Java classes have declaration modifiers, a default mapping that captures the transformation of a Java class to a C++ proxy class is complex. For example, a Java class can be declared abstract. A Java class must be declared abstract if: at least one of its declared methods is abstract; if it does not implement a method that is declared in a Java interface that the Java class implements; or the Java class does not implement a method that was declared abstract in the class's superclass. Further, even if the Java rules do not dictate that a Java class must be declared abstract, a Java class may be declared abstract to prevent it from being instantiated.

An abstract Java class may have constructors intended for use by subclasses. In an aspect of creating a C++ proxy class with semantic usability closely corresponding to an abstract Java class, such constructors may be transformed to be protected if they were public in the underlying Java class. The context-sensitive constructors described below allow instantiation of a C++ abstract proxy class for pre-existing Java instances of classes extending the abstract Java class.

An abstract Java class is similar to a Java interface. Thus, for the same reasons as discussed above in connection to Java interfaces, a Java class with abstract methods may be mapped by default to a to an instantiable C++ proxy class. Accordingly, in an embodiment of sharing a Java component, an instantiable C++ proxy class representing a first concept provides a proxy layer to a Java class having abstract methods and representing the first component, and has a semantic usability closely corresponding to the semantic usability of the Java class.

To properly transform method members of an abstract Java class to a C++ class, further considerations are discussed in more detail below in connection to methods.

Java permits Java classes to be defined final (as Java also permits for methods, which will be discussed in more detail below). The Java semantics dictate that a Java class defined to be final is not allowed to be a superclass for other classes. In other words, the Java class is not inheritable. C++ does not have a corresponding concept to this final definition that restricts inheritability of C++ classes. This absence of the final concept in C++ does not have adverse effects on the transformation per se. For example, a C++ proxy class may include a comment reflecting the intended inheritability of the C++ proxy class. Although this comment can not be enforced by the C++ compiler, it may inform a C++ developer of the intended non-inheritability.

The Java keyword final is also used to modify a method declaration, and should be taken into account by a C++ proxy class. The implications of the Java keyword final in creating C++ proxy classes are discussed in more detail below in connection to proxy methods.

In one implementation of a C++ proxy class wrapping a Java class, the C++ proxy class may be used in each context that the Java class may be used in the Java domain. Further, when JNI provides the proxy layer of the C++ proxy class, the C++ proxy class may be usable in each JNI context. Thus, in an aspect of a C++ proxy class having a semantic usability closely corresponding to the semantic usability of the Java class, the C++ proxy class may be used in one or more of the following contexts:

1) as an instance field in a C++ class;
2) as a class (static) field in a C++ class;
3) as an array element; and
4) as a stand alone object (not a field of a class, not a field of a class instance and not an element of an array).

As discussed above, JNI functions are context-dependent. To access Java fields from a C++ proxy field (discussed below), it may be desirable to have a C++ proxy class that is usable in all JNI contexts, to invoke the appropriate JNI function depending on the context of the Java instance. If a C/C++ program only needs to access one field from the Java functional domain, the context-dependency of JNI is not too difficult to incorporate into the C/C++ code. If, on the other hand, a C/C++ program requires access to multiple Java components, or requires use of multiple Java components, or requires use of a higher-level Java component, then incorporating into the C/C++ code the proper JNI code to accommodate the JNI context-dependencies becomes a more difficult task.

A C++ proxy class may be used to represent all JNI contexts by providing different constructors, one for each context to be represented. Such constructors may be referred to herein as context constructors. Each context constructor differs in the arguments that it requires, in correspondence to the context that it represents. Each constructor is appropriate for only one context and should only be used in that one context. The use of context constructors is only one example technique of providing information about the context to a proxy instance. For example, other techniques may rely on the explicit specification of the context through a separate method declared by the proxy class.

FIG. 6 illustrates an embodiment of four example context constructors: stand-alone object constructor 30, instance field constructor 36, static field constructor 42, and array element constructor 48. In FIG. 6, proxy_name is the proxy class to which the constructors belong, jobject is the JNI object reference type, proxy_ref is the base class for all proxy objects, proxy_class is the base class for all proxy classes. Proxy-ref is derived from proxy-base, the base class for all proxies, including proxy objects and proxies for primitives. Proxy_class is derived from proxy_ref. The proxy_array class is derived from the proxy_ref class and represents generic array objects.

The stand-alone object constructor 30 may be used to construct a C++ proxy instance for an already existing Java object represented by its JNI jobject value. This C++ proxy instance may maintain its jobject value, for example, by storing its value in an internal field. The stand-alone object constructor 30 may be considered a direct proxy constructor because it leads to the creation of a C++ proxy instance that directly contains the jobject reference.

The instance field constructor 36 may be used to construct a proxy instance for an instance field of another proxy. In this example, the first argument, ref 38, is a pointer to the proxy instance representing the owner of the field, and the second argument, _fieldName 40, is the field identifier. The field identifier 40 needs to be able to uniquely identify the represented field in the scope of the owner. Thus, the field identifier 40 may be the field name, the JNI jfieldID, both the field name and the JNI jfieldID, or a pointer or a reference to an object maintaining this information. The instance field constructor 36 may be considered an indirect proxy constructor because it refers to another proxy component that represents the instance to which the field represented by the field identifier belongs.

The static field constructor 42 may be used to construct a proxy instance for a static field. The static field constructor 42 takes a first argument, _clazz 44, that represents the proxy_class instance representing the owner of the field and takes a second argument, _fieldName 46, that identifies the field. In this example, the first argument _clazz 44 is a pointer to the proxy_class instance representing the owner of the field. The field identifier_fieldName 46 could be just the field name or the JNI jfield ID or both or a pointer or a reference to an object maintaining this information. The static field constructor 42 may be considered an indirect proxy constructor because it refers to another proxy instance that represents the class to which the represented field belongs.

In an aspect of C++ proxy class having a class field constructor, the C++ proxy class also has a virtual get class 0 method and a static get_static class ( ) method, either of which can be used to ask a proxy instance for its class at run time.

The array element constructor 48 may be used to construct a proxy instance for an element of an array. The first argument, _array 50, represents the array owning the element and the second argument, _index 52, represents the index of the element in the array. In this example, the first argument _array 50 is a pointer to the proxy representing the array. The array element constructor 48 may be considered an indirect proxy constructor because it refers to another proxy that represents the array to which the represented element belongs. An array proxy class may possess an overloaded subscript operator that may return a proxy instance that has been constructed using the array element constructor (described below in more detail in connection to Array Support).

Proxy Support Elements

A C++ context constructor is a type of C++ proxy support element. In an embodiment of wrapping a Java class or a Java interface with a C++ proxy class, or wrapping a Java primitive with a C++ proxy class (discussed in detail below in connection to FIG. 8), the C++ proxy class may include one or more C++ proxy support elements.

FIG. 7 illustrates an example embodiment of declarations of proxy support elements for a C++ proxy class 108, including: typedef 110; conversion constructor 112; context constructors 114; copy constructor 116; destructor 118; assignment operator 120; comparison operators 122; static framework support method 126; instance framework support method 128; and dynamic casting method 130. A concrete C++ proxy support element may be declared in the declaration in the declaration context of a C++ proxy component, typically in a class header (.h) file, and the implementation of the C++ proxy support element may appear in an implementation file (.cpp) of a C++ proxy class.

Each of the proxy support elements of FIG. 7 will now be described.

Support for Null

In Java, null is a distinctly typed object reference representing that the object reference does not refer to an object instance. Java defines several semantic rules involving null, for example, null can be used in any context in which an object reference is allowed. Thus, null may, for example, be used as an operand in object identity comparisons or as a method argument, if the method argument is of a non-primitive type.

A C++ proxy component may have to support a concept like null in order to provide a semantic usability closely corresponding to the semantic usability of an underlying Java component. In C++, there is no such distinctly typed null object. In C++, the most closely corresponding concept is NULL. NULL is simply a #define for "0" or "(void*)0." NULL often causes confusion if C++ interprets it as an integer rather than as a pointer. Further, a NULL value can only be used in relation with pointer types and not with objects or object references. Thus, the use of NULL forces the programmer to use pointer types. Although this forced usage may simply be undesirable in the case of method arguments, it is harmful in the case of object identity comparisons. In the case of C++ proxy instances, object identity comparisons need to inspect the object identity of the underlying Java instances. If pointers and NULL are used, overloaded comparison operators cannot be used easily. Consequently, in the following use-case:

```
FOO *    fool = new Foo( );
if ( fool == NULL )
     ;// take some action
``` the C++ pointers are compared for identity, rather than comparing the underlying Java object references. While this comparison may yield the correct result in some cases, it generally does not yield the correct result.

In an aspect of generating a C++ proxy component that has a semantic usability closely corresponding to its underlying Java component, the C++ proxy component may contain proxy support elements that allow usage of null in a manner that corresponds with usage of null in Java.

To wrap a Java null argument and provide such a semantic usability in C++, a C++ proxy class may include a Tnull conversion constructor that utilizes a helper class, named, for example, Tnull, and a file-scoped Tnull helper class instance named null.

Such a Tnull helper class may have an empty default constructor and a number of overloaded comparison operators. These comparison operators provide semantic usability for cases where null is used as the first operand in the comparison. Inclusion of the header file in which Tnull is defined may cause such a null instance to be available to all code in the compilation unit.

Accordingly, a Tnull conversion constructor, i.e., a constructor for a proxy instance that takes a Tnull instance as an argument, may be provided such as, for example, Tnull conversion constructor 112 of FIG. 7. As long as Tnull conversion constructor 112 is not declared explicit, C++ automatically invokes the Tnull conversion constructor to convert a Tnull instance into a temporary proxy object if the semantic context requires a C++ proxy instance and a Tnull instance is available. Specifically, if the file-scoped null instance is used in such a context, such a conversion constructor is invoked.

Tnull conversion constructor 112 creates a stand-alone proxy instance (described above in connection to FIG. 6) initialized to not refer to any Java instance.

Comparison Operators

In Java, the use of the operators == or !=on two object references compares the two object references for object identity, not for object equality. In an effort to provide closely corresponding semantics for C++ proxy classes, it may be desirable to provide a comparison operator that compares the underlying Java instances for object identity. Because more than one JNI object reference may actually refer to a single object, a simple value-based comparison is not sufficient, rather, a JNI function has to be executed. Further, if a comparison is to be made, it may be desired for completeness sake to have both a comparison for equality and a comparison for inequality, such as, for example:

```
bool    Foo::operator ==  (const Foo & _rhs ) const;
bool    Foo::operator !=  (const Foo & _rsh ) const;
```

Accordingly, in an embodiment of wrapping a Java class or interface with a C++ proxy class, the C++ proxy class may include inequality and equality operator declarations 122 of FIG. 7 and the above inequality and equality operator implementations. These declarations and operators may be implemented in terms of a C++ standard support proxy method. A C++ proxy class that includes equality and inequality operators implemented in terms of a C++ standard support proxy method, and the Tnull conversion constructor described above, may handle all comparisons for object identity.

Copy Semantics & Destructor Semantics (Lifecycle Management)

In an embodiment of wrapping a Java class, a Java interface or a Java primitive component with a C ++ proxy class, a C++ proxy class may include a copy constructor and an assignment operator to help map the copy semantics of a Java component to a C++ proxy component. The copy constructor and assignment operator provide two actions for mapping copy semantics of a Java component, depending on the reference context of the Java component. In a context of being a field reference or a context of being an array element reference, a C++ proxy component has a value set into it if an assignment or a copy operation occurs. In a stand-alone reference context, a C++ proxy component has a source reference duplicated and maintained by the C++ proxy component.

In Java, an assignment involving an object causes another reference to this object to be held in the JVM. It does not cause a copy of the object's state to be made. In contrast, in C++, if a copy constructor or assignment operator is not provided explicitly, the copy constructor and assignment operator generated by the C++ compiler will copy the object's state. In the case of C++ proxy objects, this default behavior would create a duplicate of a Java object reference held in the JVM without informing the JVM of this fact. In general, creating such a duplicate without informing the JVM would cause erratic execution due to resulting problems in the management of the underlying Java object lifecycle. Similarly, the destructor of a C++ proxy class needs to release the reference to the underlying Java object. Correct lifecycle management for underlying Java objects requires both correct copy semantics and destructor semantics.

In an aspect of context-awareness, different actions may need to be taken depending on the assignment-target's context and the technology providing domain connectivity (for example JNI). For example, if the target of an assignment is an array element and the connecting technology is JNI, the assignment operator will have to call the JNI method SetObjectArrayElement( ).

Accordingly, a C++ proxy component, to provide copy semantics in the C++ domain closely corresponding to the copy semantics of the wrapped Java component, may include proxy support element declarations 116 and 120.

To provide lifecycle management for wrapped Java components, a C++ proxy component may provide proxy support element declaration 118 in conjunction with declarations 116 and 120.

Casting

In Java, all objects are used through references. Java is strongly typed and has a cast expression that will throw an exception if an attempted cast is not legal (in accordance with Java semantics). In C++, the most closely-related feature is the dynamic_cast operator that operates on pointers or references. In the case of pointers, it returns NULL if the attempted cast is not a compatible cast. In the case of references, it throws a bad_cast exception if the attempted cast is not a compatible cast. Java casting cannot be directly mapped to the C++ dynamic cast operator because the C++ dynamic cast operator limits use to only pointers and references and because the type of the C++ proxy instance does not necessarily correspond directly to the type of the underlying Java instance.

Accordingly, in an embodiment of wrapping Java classes, interfaces or primitives with C++ classes, each C++ proxy class may include a static class method dyna_cast 130 of FIG. 7. Method 130 of FIG. 6 may provide a semantic usability to a C++ proxy component closely corresponding to the semantic usability of a cast expression involving the wrapped Java component.

A dyna_cast method may act as a "factory" for proxy instances of the cast target-type and may take a generic jcpp_ref reference as input (jcpp_ref being a baseclass for all C++ proxy classes corresponding to Java classes or interfaces). A dyna_cast method may have the following implementation signature:

static Foo Foo::dyna_cast(const jcpp_ref & src);

The dyna_cast method may internally use a C++ proxy support method to determine whether the C++ proxy instance represented by _src is compatible with the target type. Further, the dyna_cast method may give a copy of the reference maintained by _src to the newly created target type instance if the two types are compatible. A configuration parameter may govern the behavior of the dyna_cast method if an incompatible cast is attempted. Such behavior may include throwing an exception, which is a behavior shared by Java and current-standard C++, or returning a reference that refers to null, which is a behavior common to old-standard C++.

Array Support

In Java, arrays are objects. Every array instance knows the maximum number of elements it can hold. This number is accessible to a Java programmer through a read-only field named length (the actual implementation of this feature in the JVM may be different). Multi-dimensional arrays are arrays of objects of an array-type.

In contrast, in C++, an array (single- or multi-dimensional is a contiguous memory area that is of a size that is sufficient to hold the declared number of instances. C++ arrays, like the C arrays that they are based on, do not maintain their declared dimension or order. Consequently, array-bound overwrites are a frequent source of error in C++ programs.

A Java array type may be mapped by default to a C++ proxy class. Optionally, such a C++ proxy class may have a semantic usability closely corresponding to the Java array type that it wraps. Such a C++ proxy class may declare a read-only length field that can be used in any semantic context in which an integer can be used and which corresponds with the number of elements in the underlying array.

In another aspect of a C++ proxy class having closely corresponding semantic usability to a Java array type that it wraps, the C++ proxy class may declare a const (not allowed to modify the state of the array) and a non-const (allowed to modify the state of the array) subscript operator with appropriate return-types. For example, in a C++ proxy array for a primitive type, the return type for the const version of the subscript operator may be the primitive type, whereas the return type for the non-const version of the subscript operator may be another proxy type that can be used on the left hand side of assignment statements. The returned C++ proxy instance may have been constructed using the array context constructor mentioned above.

In an embodiment of mapping a Java array type to a C++ proxy class, a template class may be provided to declare the previously mentioned length field and subscript operators. It may be desirable to provide a template class because, although the mechanism for accessing all object array types is identical, the return types for the subscript operators depend on the array element type. Such a template class may expect its template argument to be a class that provides a static method to allow the template class to discover the jcpp_class of its elements. To provide such a static method, in an embodiment of wrapping a Java class, interface, or primitive with a C++ proxy class, the C++ proxy class may include a static framework support method 126. Other known techniques may be used to provide such a static method.

Although a template class simplifies implementation, it also makes the use of the resulting C++ proxy array types a cumbersome, as illustrated by the following example of two array instance declarations:

| | |
|---|---|
| jcep_object_y<jcpp_object_array<Foo> > | a2(5); |
| jcep_object_array<Foo> | a1_1 = a2[0]; |

Typedefs for concrete C++ array proxy types may make the use of these types less cumbersome while improving readability of the using code.

Therefore, in an aspect of wrapping Java arrays, a C++ proxy class may have a typedef that provides uniform access to the C++ array proxy class such as, for example, typedef 10 of FIG. 7.

A typedef such as typedef 110 enables the use of typedef synonyms in calling code, for example:

| Foo::array2D | a2(5); and       |
|--------------|------------------|
| Foo::array1D | a1__1 = a2[0].   |

This example is equivalent to the other example described above, but it is much more readable.

Optionally, if it is known that a wrapped Java class is never used as an element class of an array, then the Java proxy class that wraps the Java array need not include the array context constructor the get__static__class( ) method and the typedef d described above.

Framework Support Methods

Although each of the previously described proxy support elements may be necessary to enable a certain, specific use-case in C++, there are certain services that every C++ proxy class may provide. One service that may need to be provided for most if not all use-cases is the ability to map an instance of a C++ proxy class to an object that represents the underlying Java class (e.g. ajcpp__class instance). Framework support methods are just one possible embodiment of making generally useful information available to a potentially large number of C++ proxy classes; other mechanisms are a possible.

Accordingly, in an aspect of wrapping Java components with C++ proxy classes, a C++ proxy class may include an instance framework support method, which is a virtual method that enables a C++ proxy instance to be queried for its underlying jcpp__class, where a jcpp__class represents the JNI type of the proxy instance and can be regarded as a proxy instance for a Java class. Such an instance framework support method may have the following signature:

const jcpp__class * Foo::get__class( ) const;

The benefits of including context constructors in C++ proxy classes is described below with respect to C++ proxy fields in connection to FIGS. 7–10.

Java Field→C++ Proxy Field

A Java field may be mapped by default to a to a C++ proxy field. Accordingly, in an embodiment of sharing a Java component, a C++ proxy field representing a first concept provides a proxy layer to a Java field representing the first concept, and has a semantic usability closely corresponding to the semantic usability of the Java field.

Both Java classes and Java interfaces may include fields. In Java, the Java syntax limits a field declared by a Java interface to being a public, static and final (i.e., constant) field. In contrast, the Java syntax permits a field declared by a Java class to be either a class field or an instance field and to have any accessibility and mutability defined by Java.

Although the declaration syntax for Java fields is similar to the declaration syntax for C++ fields, Java permits a field to be initialized in a declaration, whereas C++ does not allow a field to be initialized in a declaration. In contrast, C++ initializes an instance field in a constructor of a containing instance of the field, and initializes a class-field in the class-field's definition.

If a C++ proxy class has a C++ proxy field, to truly serve as a proxy layer to the underlying Java field, the proxy field should not be initialized to the value of the underlying Java field. Preferably, a C++ proxy field should be initialized with information that uniquely identifies the proxy field's underlying Java field so that, when the C++ proxy field is used, the correct proxy-layer action can be taken to access the underlying Java field.

In Java, each declaration (for a field or a method) has its own accessibility modifier (e.g. public, private). In contrast, in C++, accessibility is a separate declarative component that applies to all the declarations that fall within the scope of the declarative component. Further, Java has accessibility modifiers that are different from C++ accessibility modifiers.

In C++, the absence of an accessibility modifier indicates that the default accessibility of the containing element should be used (specifically, public for a struct and private for a class). In Java, on the other hand, the absence of an accessibility modifier indicates default accessibility, a type of accessibility that is not known in C++. The protected accessibility in Java has a different meaning from the protected accessibility in C++. As a consequence, accessibility modifiers of C++ proxy components may be adjusted to be less restrictive to allow semantic usability in C++ that closely corresponds to the semantic usability of the underlying Java component.

Accordingly, both default and protected Java accessibility modifiers may be mapped by default to a less-restrictive public accessibility in C++ such that the C++ field (or method) may have a usability in the C++ domain that closely corresponds with the intended usability of the underlying Java field (or method).

A Java field may be made immutable by declaring the field final. A Java field not declared final is mutable. The Java final modifier has a slightly different impact on a Java field depending on whether the field is of primitive type or of reference type. If a field of primitive type is declared final, its state cannot change, but if a field of reference type (i.e., an object field) is declared final, only the reference maintained by the field cannot change. Consequently, in Java, a final modifier that modifies an object field does not prevent changes to the referred to object, but merely prevents changes to the reference.

A C++ field may be considered immutable if it is declared const. As used herein, "constness" refers to the property of a C++ component as being declared const or not being declared const.

To map a Java field to a C++ proxy field, the mutability (i.e., constness) of the C++ proxy field may be determined from properties of the Java field and its type, for example, from their mutability. Accordingly, a C++ proxy field may have a mutability determined from the mutability of the Java field that it wraps. For example, a primitive Java field declared final may be mapped to a C++ proxy field declared const, and a primitive Java field not declared final may be mapped to a C++ proxy field not declared const. Heuristics may be applied to a Java field and related Java components to determine the mutability (i.e., constness) of a C++ proxy field. A number of rules, together constituting an example of such heuristics, is provided in Table 1.

In the description related to proxy methods below, the mutability of Java and C++ classes are described. One factor that may be used to determine a class' mutability is the ability of a user of the class to change the values of fields declared by the class. Further, in analyzing fields to determine a mutability of the field's declaring class, factors other than the field's mutability may be considered. For example, although a field may be considered mutable if it is not declared final, the field may also be declared private, effectively not allowing a field to modify a state of an instance to which the field belongs. Accordingly, such a field may be regarded as "conceptually not-mutating" (see description of methods below).

Table 1 introduces rules that may be used to determine a mutability attribute for a Java field and, consequently, the constness of a C++ proxy field that wraps the Java field.

TABLE 1

Field Mutability Rules

| | Field Type (Instance or Class) | Field Accessibility | Final | Field Type | Mutability Attribute | Constness Of Proxy Field |
|---|---|---|---|---|---|---|
| 1 | Don't care | Private | Don't care | Don't care | Conceptually Not Mutating | N/A |
| 2 | Static (Class) | Non-private | Yes | Primitive | Conceptually Not Mutating | Const |
| 3 | Static (Class) | Non-private | Yes | Reference | Conceptually Not Mutating | const if reference type is immutable |
| 4 | Static (Class) | Non-private | No | Don't care | Conceptually Not Mutating | Not const |
| 5 | Non-static (Instance) | Non-private | Yes | Primitive | Assumed Non-mutating | const |
| 6 | Non-static (Instance) | Non-private | Yes | Reference | Mutability Attribute of reference type | const if reference type is immutable |
| 7 | Non-static (Instance) | Non-private | No | Don't care | Assumed Mutating | Not const |

Table 1. Field Mutability Rules

Row 1 of Table 1 indicates that a private field cannot be used to modify its owner's state (as described above), and thus may be determined to have a mutability attribute of "conceptually not-mutating". A private field need not be proxied and, consequently, determining the constness of a C++ proxy for such a private field may not be necessary.

Rows 2, 3 and 4 express that a static, non-private Java field does not affect a Java instance's state, and thus may be determined to have a mutability attribute of "conceptually not mutating". The constness of such a Java field's corresponding C++ proxy field, however, may not be directly related to the value of the Java field's mutability attribute. Specifically, Row 2 indicates that a C++ proxy field for a final, static, non-private and primitive Java field may be declared const. Row 3 indicates that the constness of a static final C++ proxy field of a reference type (i.e., an object field) may be dependent on the mutability of the wrapped Java field's reference type, for similar reasons as described below in connection to Row 6. Row 4 indicates that a non-final, static, non-private Java static field may map to a C++ proxy field that is not declared const.

Row 5 indicates that non-static, non-private Java instance field of primitive type and declared final cannot be used to modify its owning instance's state, and, therefore, the Java instance field may be determined to have a mutability attribute of "assumed not-mutating". Such a field may map to a C++ proxy field that is declared const.

Row 6 indicates that a non-static, non-private Java instance field of reference type (i.e., an object field) that is declared final may be determined to have a mutability attribute corresponding to the mutability of its reference type. As described above, the Java final field declaration modifier applies to a reference to an object, not to the object itself. Thus, an object referred to through a Java final field may potentially be changed, thereby also potentially changing the state of the owning Java instance. If the Java field's type is "immutable," however, such state changes are not possible (although it is theoretically possible that a subclass of an immutable class is mutable (i.e., not immutable), it is highly unlikely). Thus, the mutability attribute of a final Java reference type instance field may be set to the mutability of its type. Further, the constness of the C++ proxy field of such a Java field may be directly derived from the Java field's mutability attribute.

Row 7 indicates that all other fields not addressed by Rows 1–6 may be regarded as "assumed mutating", i.e., as having the ability to be used to modify their owning instance's state. Such a field may map to a proxy field that is not declared as const.

As described above, a C++ proxy field may hold a unique field identifier instead of a value of an underlying Java field. Consequently, if the underlying Java field is declared final, the constness of the field may be expressed through a C++ proxy class that does not permit value changes. Also, such a class may query only a value of an underlying Java field a first time the field is accessed and cache the value for later use because the value is guaranteed not to change. Such a proxy class may be used in addition to or as an alternative to declaring a field const.

In an aspect of mapping Java fields to C++ proxy fields, a Java static (i.e., class) field of type class_a maps by default to a C++ proxy static field of type C++ proxy class_a, where the C++ proxy class_a includes proxy support elements that enable the use of class_a as a static field. These proxy support elements may be provided in the form of context constructors that are described above with respect to C++ proxy classes and FIG. 6.

In an another aspect of mapping Java fields to C++ proxy fields, a Java instance field of type class_a maps by default to a C++ proxy instance field of type C++ proxy class_a, where the C++ proxy class_a includes proxy support elements that enable the use of class_a as an instance field.

In another aspect of mapping Java fields to C++ proxy fields, a Java static field of primitive type (e.g., integer) maps by default to a C++ proxy static field of type C++ primitive proxy class_a, where the C++ primitive proxy class_a includes proxy support elements that enable the use of class_a as a static field, as well as other proxy support elements described above in connection to FIGS. 6 and 7. An example C++ primitive proxy class is described below in connection to FIG. 8.

In yet another aspect of mapping Java fields to C++ proxy fields, a Java instance field of primitive type (e.g., integer) maps by default to a C++ proxy instance field of type C++ primitive proxy class_a, where the C++ primitive proxy class_a includes proxy support elements that enable the use of class_a as an instance field.

In each of the aspects described immediately above, each C++ proxy instance may maintain its context (i.e., instance field, or class (static) field) after being constructed by the proper C++ constructor of C++ proxy class_a. Such an instance may maintain (i.e., know) its context internally by storing it in a context field. A C++ proxy instance that knows its context is referred to herein as a "context-aware" instance. A context-aware C++ proxy instance that is maintained by a field is referred to herein as a "context-aware" field.

FIG. 8 illustrates an embodiment of a C++ primitive proxy class jcpp_int 52. FIG. 8 has many of the same proxy support elements as FIG. 7. Primitive proxy class 52 may be the primitive proxy class for the primitive type integer. Primitive proxy class 52 may inherit from a primitive proxy base class jcpp_base 54, which may be the base class for all C++ proxies.

Primitive proxy class 52 may include any combination of the following C++ proxy support elements: typedefs 56 (similar to typedef 110); context constructors 59 (similar to context constructors 36, 42, 48 and 114); copy constructor 65 (similar to copy constructor 116); destructor 66 (similar to destructor 118); special methods 62; conversion operator 64; mathematical operators 66; and frame work support method 68 (similar to framework support method 128).

Typedefs 56 allow the use of type-safe arrays in a standardized way. For example, an array of integers may be referred to through an array helper class jcpp_int_array 57 or through the typedefjcpp_int::array1D 58.

Context constructors 59 may include instance field constructor 60, static field constructor 61, and array element constructor 62, which are examples of context constructors 36, 42 and 48, respectively, of FIG. 6. In a primitive proxy class 52, a stand-alone context constructor similar to primitive proxy constructor 30 is not necessary because a stand-alone primitive type may be represented by a JNI native type. For example, Java primitive type int may be represented by the JNI type jint.

Special methods 62 may permit the C++ proxy class 52 to reside in a DLL for all platforms, and conversion operator 64 may convert an instance to a jint. Conversion operator 64 allows an instance of a jcpp_int to be used on the right-hand side of a syntactical production such as, for example, the expression: jint i=instance_name.x, where instance_name.x is a jcpp_int instance field. In this example, conversion operator 64 enables instance_name.x to be converted to a jint.

Mathematical operators 66 permit instances of primitive proxy class 52 to be used on the left-hand side of certain syntactical productions, thereby increasing the semantic usability of such instances. For example, mathematical operators 66 permit primitive proxy class 52 to be used in the following example: instance_name.x=20, where instance_name.x is a jcpp_int instance field. Another example expression is: instance_namne.x+=4. In either example, the assignment and additive operators ("=" and "+=", respectively) are overloaded so that a compiler would know how to assign a jint to a jcpp_int object. Without overloading the operators, the C++ compiler would not know how to evaluate C++ statements involving the invocation of such an operator on a jcpp_int as the receiving object.

Framework support method 68 may be used by other classes to find out the JNI type of an instance. Framework support method 68 may be declared virtual using C++ keyword virtual in a baseclass (e.g. jcpp_ref) from which the primitive proxy class 52 inherits.

Primitive proxy classes, particularly those that include primitive proxy support elements, for example, primitive proxy class 52, may simplify the code needed to use a Java field in a C++ application. For example, consider the following C++ operation performed on a C++ array proxy:

instance_name.x [0])++;.

In the absence of a C++ primitive proxy class, the developer may have to explicitly perform the following steps, an equivalent of which the proxy classes perform automatically:

1) invoke JNI function GetFieldId to retrieve the identifier of the instance field instance_name.x;

2) invoke JNI function GetObjectField to retrieve the jobject reference for the wrapped Java array;
3) invoke JNI function GetIntArrayRegion to retrieve the integer value of the Java array element;
4) invoke JNI function SetIntArrrayRegion to set the incremented value into the wrapped Java array; and
5) invoke JNI function DeleteLocalRef to clean up the retrieved reference to the wrapped Java array.

This list of JNI function calls does not include JNI calls that should be issued after many of the above calls in order to check for possible error conditions that might cause abnormal program termination if not handled correctly.

The previous example illustrates how a simple C++ task may translate into a complex sequence of JNI API calls. Therefore, providing primitive proxy classes like primitive proxy class 52 that construct context-aware field instances, allows the developer to use the C++ proxy field without ever having to write JNI code. A C++ developer using the field may not even have to be aware of the fact that the underlying implementation is in Java.

FIGS. 9–11 illustrate the benefits of using C++ primitive proxy classes that include context constructors. FIG. 10 is a Java component 230. The Java component 230 includes a Java interface Foo 232, a Java class Bar 234, and various assignment statements 236, 238, 240, 242, 244, and 246. Assignment statements 236–246 may be included in any of a variety of Java components and are presented in list form in FIG. 10 for illustrative purposes only.

Java interface 232 includes a primitive field X 233 defined to be a public static final field and initialized to a value of twenty-five. Java class 234 includes a primitive static (class) field X 235 initialized to a value of twenty-five and a primitive instance field ch 237 initialized to a value 'a'.

FIG. 10 is a C++ code fragment illustrating an example embodiment of C++ proxy components that may result by applying an incorrect mapping to the primitive Java fields 232, 235 and 237. The C++ components 250 include class Foo 252, class Bar 254 and several C++ assignment statements in the form of assignment statements 256, 258, 260, 262, 264, and 266. Assignment statements 256–266 may be included in any of a variety of C++ components and are presented in list form in FIG. 8 for illustrative purposes only.

C++ class 252 includes C++ primitive proxy field X 253, defined to be of JNI primitive type jint. Class 254 includes primitive proxy static field X 255 and primitive proxy instance field ch 257. Primitive proxy field 255 is declared to be of JNI primitive type jint, and primitive proxy field 257 is declared to be of JNI primitive character type jchar.

Each of C++ proxy fields 253, 255, and 257 are of primitive JNI type, not a proxy class type that would enable the use of these proxy fields in each JNI context. Consequently, to enable proper use of each of these proxy fields in any of the assignment statements 256–266, a developer would need to write explicit JNI code for each assignment statement such that an appropriate instance is constructed in accordance with the context of the assignment statement.

For example, assignment statement 256 sets C++ field i equal to the value of primitive proxy interface field 253. The issue is how to initialize primitive proxy field 253 such that assignment statement 256 executes properly. Because JNI primitive types have well-defined semantics and primitive field 253 is defined to be of JNI primitive type jint, assignment statement 256 would cause i to be set equal to the bytes stored at the location of the static jint field X. This result is not desired. What is desired is that field 253 serve as a proxy to Java primitive field 233, and that assignment statement 256 set the value of i equal to the value of Java primitive field 233. For assignment statement 256 to set the value of i properly, a JNI call has to be made to retrieve the value of primitive Java field 233.

Assignment statement 256, however, does not invoke a JNI call. Therefore, the assignment made by assignment statement 256 is incorrect. Consequently, the value of C++ field 253 does not correspond with the value of Java field 233 and would require an external mechanism to initialize or refresh it with the value of Java field 233. Assignment statements 258–266 are generally incorrect for similar reasons.

FIG. 11 is a C++ code fragment illustrating am embodiment of C++ components 270, including a C++ class Foo 272, a C++ class Bar 274, and the same C++ assignment statements 256–266 as FIG. 6. C++ proxy interface class 2 includes C++ proxy interface field X 273. Proxy field 273 may be declared to be of type primitive proxy class, for example, primitive proxy class 52 of FIG. 7.

C++ proxy class 274 may include C++ proxy static field X 275 and C++ proxy instance field 277. Proxy field 275 may be declared to be of type primitive proxy class, for example, primitive proxy class 52. C++ proxy field 277 also may be declared to be of type primitive proxy class. Such a proxy class for proxy field 277 may be a primitive proxy class for the primitive character type, similar to primitive proxy class 52.

For each of the above fields 273, 275 and 277, if each field is declared to be of a type primitive proxy class that includes context constructors, then assignment statements 256–266, which each the use at least one of these fields, should be implemented properly.

For example, if C++ proxy static field 273 is declared to be of type primitive proxy class 52, then the assignment statement 256 should set i equal to the value maintained by Java interface field 233. Assignment statement 256 is correct because it will cause the following sequence of actions. At runtime, proxy static field 273 will cause static field constructor 61 to construct an instance of proxy static field 273. The arguments of constructor 62 provide this instance with information that identifies Java interface field 233. Upon execution of assignment statement 256, the value maintained by this field is retrieved. Depending on the assignment statement, a new value may also be set into (as opposed to retrieved from) the Java field.

Assignment statements 258–266 (of FIG. 11) achieve correct results through the same proxy mechanisms that cause assignment statement 256 to operate as the developer intended.

Java Methods→C++ Proxy Methods

A Java method may be mapped by default to a to a C++ proxy method. Accordingly, in an embodiment of sharing a Java component, a C++ proxy method representing a first concept provides a proxy layer to a Java method representing the first concept, and has a semantic usability closely corresponding to the semantic usability of the Java method.

If mapping a Java method to a C++ proxy method, the semantics of both languages may be considered with respect to: method invocation, method arguments, method return types, and the treatment of exceptions, each of which are discussed in detail below. As used herein, a "Java interface method" is a Java method declared in a Java interface.

In different aspects of a C++ proxy method wrapping a Java method, the following default mappings may be applied:

(1) a Java interface method maps by default to a C++ proxy method declared to be virtual;

(2) a Java abstract method of a Java abstract class maps by default to a C++ method declared to be virtual;

(3) a Java final method or a Java method of a final Java class maps by default to a C++ proxy method not declared to be virtual;

(4) a non-final, non-abstract and non-static Java class method maps by default to a C++ proxy method declared to be virtual; and (5) a Java static method maps by default to a C++ proxy method that is declared c: static.

A Java interface method may map to a C++ method declared to be virtual because a Java interface method is intended to be implemented by one or more Java subclasses. Thus, to provide a C++ proxy method that has a polymorphicability closely corresponding to the inheritability of the wrapped Java interface method, the C++ proxy method may be declared virtual.

A Java abstract method of a Java abstract class may map to a C++ method declared to be virtual for the same reasons described above in connection to Java interface methods.

C++ semantics require that if a C++ method is declared virtual in a C++ superclass, this virtualness is inherited from that superclass by any of its subclasses. Thus, it is not necessary to re-declare as virtual a C++ subclass method if the corresponding method of the superclass is declared virtual.

A Java final method or a Java method of a Java final class may map to a C++ proxy method not declared to be virtual because the Java final declaration for a method indicates that no subclass is allowed to override the declared method. Thus the final method modifier restricts the overridability of the Java method. Although C++ does not provide a similar mechanism to restrict overridability of a C++ method, not declaring a C++ proxy method to be virtual and/or inserting a comment to this effect may make clear the intent to restrict overridability. In other words, a C++ developer will understand that if a C++ method is not declared virtual or includes a comment indicating that the method should not be overridden, then a C++ subclass should not override the C++ method.

A non-final, non-abstract and non-static Java method may map into a C++ proxy method declared to be virtual because Java semantics by default allow a non-static Java method to be overridden by sub-classes. Thus, for a C++ proxy method to have an overridability closely corresponding to an overridability of, a non-final, non-abstract and non-static Java method, the C++ proxy method may be declared virtual.

In contrast, because Java semantics enforce that a Java static method may not be overridden by subclass, a corresponding static C++ proxy method may not be declared virtual, thus indicating to a C++ developer that the C++ proxy method is not to be overridden by a C++ subclass.

JNI Method Invocation

JNI offers a choice between invoking a method virtually or non-virtually. The virtual invocation only requires an object reference as an argument, and as a result of being invoked calls the most-derived version of the method. In contrast, the non-virtual invocation requires an object reference and a class reference, and as a result of being invoked calls the given class' version of the method on the object.

Although it seems obvious to use JNI virtual invocation for C++ virtual proxy methods and JNI non-virtual invocation for C++ non-virtual proxy methods, choosing the proper JNI method invocation is not so straightforward.

In an aspect of a C++ method wrapping a Java method, the C++ proxy method may be defined to use the correct JNI method invocation technique. The description below details how to properly choose the JNI method invocation technique based on the semantic usability of the Java method.

The proper choice of JNI invocation technique is complicated by the fact that C++ semantics allow the invocation of any accessible method, even if the method is "hidden" or overridden, by including an explicit superclass specifier in the method invocation.

A method may be referred to as hidden if a subclass provides a method having the same name, but different arguments for which there exists an implicit conversion to the arguments of the superclass method.

In different aspects of a C++ proxy method, the following default mappings may be applied:

(1) A Java interface method may map to a C++ proxy virtual method defined to call the Java interface method using the JNI virtual invocation technique;

(2) A Java abstract method of a Java abstract class may map to a C++ proxy virtual method defined to call the Java abstract method using the JNI virtual invocation technique;

(3) A Java final method or Java method of a final Java class may map to a C++ proxy non-virtual method defined to call the Java method using either JNI invocation technique;

(4) A non-final, non-abstract and non-static Java method may map to a C++ virtual method defined to call the non-static Java method using the non-virtual JNI invocation technique; and (5) A Java static method may map to a C++ proxy static method defined to call the Java static method using the JNI non-virtual invocation technique.

Default mapping (1) may be applied for the following reasons. If a C++ proxy interface method calls a Java interface method, the concrete Java class implementing the interface is unknown. As a result, C++ virtual semantics cannot be relied on to invoke the correct version of the Java interface method. Default mapping (1) allows the JNI virtual invocation technique to pick the most-derived version of the Java interface method so that the correct version is used.

Default mapping (2) may be applied for similar reasons. Specifically, if a C++ proxy virtual method calls a Java abstract method of an abstract class, the concrete Java class implementing the Java abstract method is unknown. Accordingly, the C++ virtual invocation semantics cannot be relied on to invoke the correct version of the Java abstract method. Default mapping (2) allows the JNI virtual invocation technique to pick the most-derived version of the Java abstract method.

Default mapping (3) may be applied because Java semantics guarantee that a Java method declared to be final will not be overridden and, consequently, could not be different in a subclass. Therefore, either JNI invocation technique may be used.

Default mapping (4) may be applied because C++ virtual methods can rely on the C++ virtual resolution rules to pick the correct JNI non-virtual method to invoke the proper Java non-static method. Specifically, by application of C++ virtual resolution rules, a C++ subclass calls its C++ superclass' virtual method. The superclass' virtual method invokes the proper JNI method, which calls the corresponding Java method, as opposed to the most-derived Java method, which would be incorrect in this case.

Default mapping (5) may be applied to ensure that wrapped Java static methods are not reimplemented by a C++ subclass of the C++ proxy class that includes the C++ non-virtual proxy method. Default mapping (5) prevents this reimplementation by having the C++ non-virtual proxy method defined to invoke the JNI non-virtual invocation technique.

In addition to above-mentioned default mappings, the method of instantiation or an underlying Java instance's type may be taken into account in determining the appropriate JNI invocation technique. If a Java instance was created as a direct consequence of a developer's request (i.e., through invoking a C++ proxy constructor that in turn may invoke a Java constructor), the exact type of the underlying Java instance may be known and the non-virtual invocation mechanism may be used. If, on the other hand, the C++ proxy instance is, for example, the result of a method call, the exact type of the underlying Java instance may not be known., For such an instance, the virtual invocation mechanism may be more appropriate and thus used.

Including JNI method invocation code in every C++ proxy method may result in overly large C++ proxy classes. To reduce the size of a C++ proxy class, standard proxy support classes (e.g., C++ primitive proxy classes) may be provided that include the JNI method invocation code, both virtual and non-virtual. Optionally, a C++ proxy method may be defined to invoke an instance of a C++ standard support proxy class to call a Java method. C++ proxy support class instances may include most of the code used for a successful JNI method invocation, except maybe for the actual method arguments and the JNIEnv pointer, which may be retrieved or generated at runtime (the handling of JNIEnv pointers is discussed in more detail below). These C++ proxy support class instances represent an implementation detail and need not be exposed to users of the C++ proxy class.

Mutability of Methods, Method Arguments, and Return Types

A Java method may be declared to have a return type and to take zero or more arguments. Accordingly, a C++ proxy method may declare a return type and zero or more arguments, each having a semantic usability closely corresponding to a semantic usability of the return type and the zero or more arguments, respectively, of the wrapped Java method. As used herein, "method declaration elements" include a method's arguments and a method's return type.

C++ has richer and consequently more complex semantics regarding types than does Java. Java semantics define two kinds of types: primitive types and reference types (i.e., objects), and requires primitives and object references to always be passed by value.

In contrast, C++ semantics allow a primitive or class instance to be passed by value, by reference, or by pointer. To further complicate C++ semantics, C++ arguments and return types may be modified by the key words const and volatile. Although the volatile modifier may be of relatively small consequence, the const modifier plays a role in a high-quality C++ design. For more details regarding passing values, references, and pointers as method arguments in C++, please refer to Stroustrup.

A Java method argument of primitive type may be mapped relatively simply to a C++ proxy method argument of a corresponding JNI primitive type. Although it is possible to declare such a proxy method argument as const or volatile, or as a reference or pointer type, the use of these C++ mechanisms for method arguments of primitive type typically does not produce any benefits.

In contrast to C++ arguments of primitive type, it may prove beneficial with method arguments that reference objects to use the const modifier, the volatile modifier, pointers and references.

The C++ const modifier may be used to define the mutability or constness of a C++ method, a C++ method argument and a C++ method return type. A C++ method or method declaration element declared "const" may be referred to herein as "immutable". In contrast, a C++ method or method declaration element not declared "const" may be referred to herein as "mutable". Declaring a C++ method as const guarantees that calling this method will not modify the state of the instance it is called on. C++ compilers enforce these method modifier semantics by not permitting instance fields included in a method body to be modified, and by not permitting non-const methods, i.e., methods not declared const, to be called from within this method. It may be considered advantageous for a C++ design to use const-modifiers. Also, the overloading of a method may be based on its constness.

In regard to C++ method arguments, a C++ compiler enforces the C++ semantics that do not permit a method argument declared const to be modified in the body of the method being called.

In regard to C++ method return types, a C++ compiler enforces C++ semantics that, for a C++ method having a return type declared const, allows assignment only to const variables. Only allowing assignment to const variables ensures that code executing subsequently to such assignments does not change the state of the object that the method returns.

In C++, the discussion of constness or mutability is based on language features (i.e., keywords such as const or mutable). Although Java also has a notion of mutability, it is usually used at the class level. A Java class is termed "immutable" if it does not have accessible methods that change the state of an instance after its construction. Examples of such classes include java.lang.String or the subclasses of java.lang.Number. In the following discussion the term "method mutability" shall refer to a characteristic of a Java method, namely, whether the execution of this method may change the state of the instance on which the method is invoked.

A Java method having a mutability may map to a C++ method having a mutability determined from the mutability of the Java method. Further, a Java declaration element having a mutability may map to a C++ method declaration element determined from the mutability of the Java method declaration element. The mutability of both a C++ method and a C++ method declaration element may be determined by application of rules and heuristics described below. Specifically, the heuristics and rules described below may be applied to a Java method or Java method declaration element to determine whether to declare a C++ proxy method as const or a C++ proxy method declaration element as const, respectively.

In determining whether to declare a C++ proxy method as const, mutability heuristics may be applied to the wrapped Java method and its class to determine a mutability (constness) attribute. Table 2 below illustrates several examples of rules that may be applied to determine the mutability attribute of a Java method.

In Table 2, the mutability attribute of the last column is determined by analysis of information provided by one or more of the preceding columns, including Java method's type, the accessibility of the Java method, the name of the Java method, the type of returned result of the Java method, and the arguments of the Java method.

TABLE 2

Method Mutability Rules

| | Method Type | Method Accessibility | Method Name | Method Return Type | Method Arguments | Mutability Attribute |
|---|---|---|---|---|---|---|
| 1 | Don't care | Private | Don't care | Don't care | Don't care | Conceptually Not Mutating |
| 2 | Non-static (Instance) | Non-private | Starts with: 'set', 'change', 'add', or 'remove' | Don't care | At least one argument | Assumed Mutating (Not constant) |
| 3 | Non-static | Non-private | Ends with the name of a field | void | At least one argument having same type as field in name | Assumed Mutating |
| 4 | Non-static | Non-private | Starts with: 'get' | Non-void | None | Assumed Not Mutating |
| 5 | Non-static | Non-private | Starts with: 'is', 'can', 'has', 'must', 'does', or 'equals' | boolean OR java.lang.Boolean | Don't care | Assumed Not Mutating |
| 6 | Non-static | Non-private | Starts with 'to' and ends with the name of the return type | Non-void | None | Assumed Not Mutating |
| 7 | Non-static | Non-private | Is "clone" | Non-void | None | Assumed Not Mutating |
| 8 | Static | Non-private | Don't care | Don't care | Don't care | Conceptually Not Mutating |
| 9. | Constructor | Don't care | Not applicable | Not applicable | Don't care | Conceptually Not Mutating |

Table 2. Method Mutability Rules

The mutability attribute may have one of four possible values: assumed mutating; assumed non-mutating; conceptually non-mutating; or maybe mutating. In the following description, the terms mutability and constness may be used interchangeably and, consequently, the term non-mutating may be used interchangeably with const and the term mutating may be used interchangeably with non-const.

A value of "assumed non-mutating" indicates that, according to the heuristics, this Java method is very unlikely to affect the state of an instance of this class. An "assumed non-mutating" Java method may be mapped to a C++ proxy method that is declared to be const.

A value of "assumed mutating" indicates that, according to the heuristics, this method is very likely to affect the state of an instance of this class. An "assumed mutating" Java method may be mapped to a C++ proxy method that is not declared to be const.

A value of "conceptually non-mutating" indicates that, according to the heuristics, this method is unlikely to affect the state of a pre-existing instance of this class. The const modifier may or may not be used for a C++ proxy method wrapping a "conceptually non-mutating" Java method, depending on whether the type of the method allows a const modifier. C++ constructors and C++ static methods, for example, do not support the use of a const modifier.

If a Java method has any combination of method type, method accessibility, method name, method return type, and method arguments not specifically addressed by Table 2, the Java method may be assigned a mutability attribute of "maybe mutating". A value of "maybe mutating" (i.e., no constness recommendation) indicates that, according to the heuristics, this method is not covered by any of the heuristics applied. Consequently, no recommendation is possible with a high degree of confidence.

The first row of Table 2 indicates that if a Java method has an accessibility of private, then the Java method may be assigned a mutability attribute of "conceptually non-mutating". In Java, private methods cannot be called by methods other than the declaring class' methods, so typically no caller may use this method to change the state of an instance of the declaring class.

The second row of Table 2 indicates that if the type of a Java method is non-static (i.e., if the Java method is an instance method), the Java method is not declared private, and the Java method has a name starting with: "set," "change," "add," or "remove," then the Java method may be assigned a mutability attribute of "assumed mutating." If a Java method is determined to have a mutability attribute of "assumed mutating" then the C++ proxy method that wraps this Java method should not be declared const.

The heuristic of the second row reflects that the names of the Java method imply that they are setting an attribute of an object. Further, the fact that the Java method is not declared private indicates that Java components outside of the scope of the Java class have access to the Java method and, therefore, may mutate an object that the Java method affects. Therefore, there may be a high probability that invocation of the Java method will mutate an object.

The third row indicates that a non-static, non-private method that has a name that ends with the name of a field, returns a void result, and has at least one argument that has a same type as the field in the Java name, may be assigned a mutability attribute of "assumed mutating." Such an assignment may be made because such a method may be assumed to set a value of an attribute of the instance that the method operates on.

The fourth row indicates that a non-static, non-private Java method having a name that starts with "get" and returns a non-void result may be assigned a mutability attribute of "assumed not mutating." Such an assignment may be made because such a method may be assumed to get a value of an attribute of the instance that the method operates on without modifying the attribute.

The fifth row indicates that a non-static, non-private Java method that starts with: "is," "can," "has," "must," "does," or "equals," and returns a boolean result or a java.lang.Boolean, may be assigned a mutability attribute of "assumed not mutating." Such an assignment may be made because such a method may be assumed to get a boolean attribute or test for a boolean condition without modifying a state of an instance(s) that it operates on.

The sixth row indicates that a non-static, non-private Java method that starts with "to" and ends with a name of the type of the returned result may be assigned a mutability attribute of "assumed not mutating." Such an assignment may be made because such a method may be assumed to be a type conversion that will not modify a state of an instance that it operates on.

The seventh row indicates that a non-static, non-private Java method whose name is "clone" (a special method) may be assigned a mutability attribute of "assumed not mutating." "Clone" typically behaves similar to a constructor with respect to mutability. A special method like "clone" is not easily expressed by an abstract or general rule. To address special methods such as "clone," a "dictionary" of heuristics for special methods may be provided. Such a dictionary may be ideally suited for non-general (i.e., special) methods that occur often enough to warrant special handling.

The eighth row indicates that a static, non-private Java method may be assigned a mutability attribute of "conceptually not mutating." A static Java method may be considered conceptually not-mutating because although such a method certainly has the ability to modify any instances of its class that are accessible statically, static methods typically are not defined to modify such instances.

The ninth row indicates that a Java constructor may be assigned a mutability attribute of "conceptually not mutating." A Java constructor may be considered conceptually not mutating because constructors merely initialize the state of an object. Further, similar to as described above regarding static methods, constructors typically do not modify instances that are accessible.

Optionally, a mutability attribute of a Java method may be determined by analyzing Java bytecode of the method. The bytecode may be analyzed to determine whether the method modifies instance fields or calls instance methods that modify instance fields. Such analysis (or any analysis), however, may not anticipate a developer's intent in all cases. For example, a member field may be modified by a method, but the field may only hold internally relevant state, and, consequently, such modification may not be regarded as a true change in an instance's state.

Although not reflected in Table 2, when determining the mutability of a Java method and, consequently, the constness of the wrapping C++ proxy method, the relationship between the Java class being wrapped and its superclass or any of the wrapped class' subclasses may be analyzed. To not violate C++ virtual semantics, a C++class method that overrides its superclass' corresponding method should have a mutability (i.e., constness) signature exactly matching the mutability signature of the overridden C++ superclass method. As used herein, a mutability signature may include a constness of a method, a constness of a method return type, and a constness of all method argument types of a method.

Any of the above mutability mappings may be customized on a method-by-method basis. In other words, a developer may choose to define a mutability attribute for a C++ component different than those described above. If a default mapping of a mutability signature for a C++ proxy method is customized, a mutability signature of all C++ proxy methods that override such C++ proxy method should be customized accordingly to maintain correct overriding semantics. Such customization may be applied to any overriding methods and any C++ subclass method of such C++ proxy method.

Further, the customization may be applied to any superclass' methods overridden by such C++ proxy method, but only if the overridden method is a virtual method, which ensures that C++ virtual semantics are not violated. If, in contrast, the overridden superclass method is non-virtual, the customization may not be propagated, and the overridden superclass method may be effectively hidden by such a C++ proxy method, which differs from the overridden superclass method only in constness.

As described above, a Java method argument also has a mutability. In an embodiment of wrapping a Java method argument with a C++ proxy method argument, the default constness of the C++ proxy method argument may be determined by applying heuristics to the Java method argument.

A C++ proxy method argument may be passed as a const reference or a pointer to a const object if the method does not change a passed object. Optionally, to determine the default constness of the method argument of a C++ proxy method, the Java byte code of the corresponding Java method may be analyzed to determine whether modifications to instance data or arguments of the Java method are made.

Figure 12:
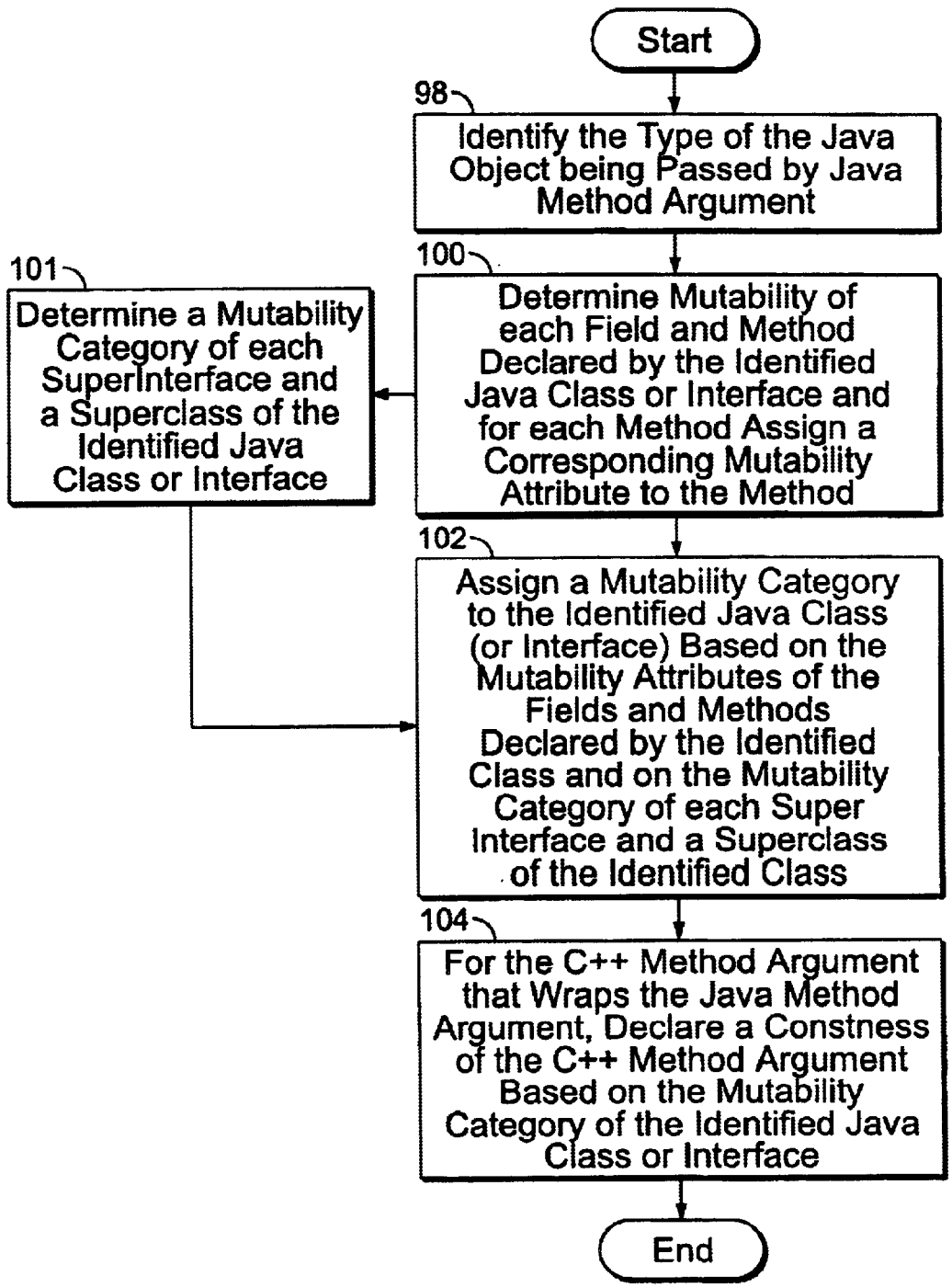
FIG. 12 is a flowchart illustrating an example method of determining a mutability of a Java method argument.

FIG. 12 is a flowchart illustrating an example embodiment of determining a mutability of a Java method argument to be mapped to the constness of a C++ method argument that wraps the Java method argument.

In step 98, a type (i.e., class or interface) of the underlying Java object being passed by the Java method argument may be identified. Next, in step 100, a mutability of each field and method (if any) declared by the identified Java class or interface may be determined, and a corresponding mutability attribute may be assigned to each field and method based on its determined mutability. The mutability attribute of each field may be assigned in accordance with Table 1, and the mutability attribute of each method may be assigned in accordance with Table 2.

Next, in step 101, a mutability category of a superclass and any superinterfaces of the class or interface may be determined.

In step 102, a mutability category may be assigned to the identified Java class or interface based on the collective mutabilities determined in step 100 and 101. For example, if all of an identified class' methods and fields have been assigned a mutability attribute of either "assumed non-mutating" or "conceptually non-mutating," and the class' superclass has been assigned a mutability category of "immutable," the identified Java class may be assigned a mutability category of "immutable." Else, the Java class may be assigned a mutability category of "mutable."

A mutability category assigned to a wrapped Java class or interface may be used to determine a mutability (i.e., constness) of a C++ proxy method argument of this type because if no instances of this type may be modified, then a passed instance also cannot be modified.

Also, a Java class determined not to have any non-final, non-static instance data may be considered immutable by definition and may be assigned a mutability category of "immutable." Such a rule may make it possible to determine that the java.lang.Object class, which does not having any data whatsoever, has a mutability category of "immutable" without any further analysis.

Returning to FIG. 12, next, in step 104, the C++ proxy method argument that wraps the Java method argument may then be assigned a constness corresponding to the mutability category assigned to the underlying Java class (or interface) of the Java method argument. For example, if the underlying class of a wrapped Java method argument is assigned a mutability category of "immutable", the wrapping C++ method argument may be declared const. Conversely, if the underlying class of a wrapped Java method argument is assigned a mutability category of "mutable", the wrapping C++ method argument may not be declared const.

Figure 13:
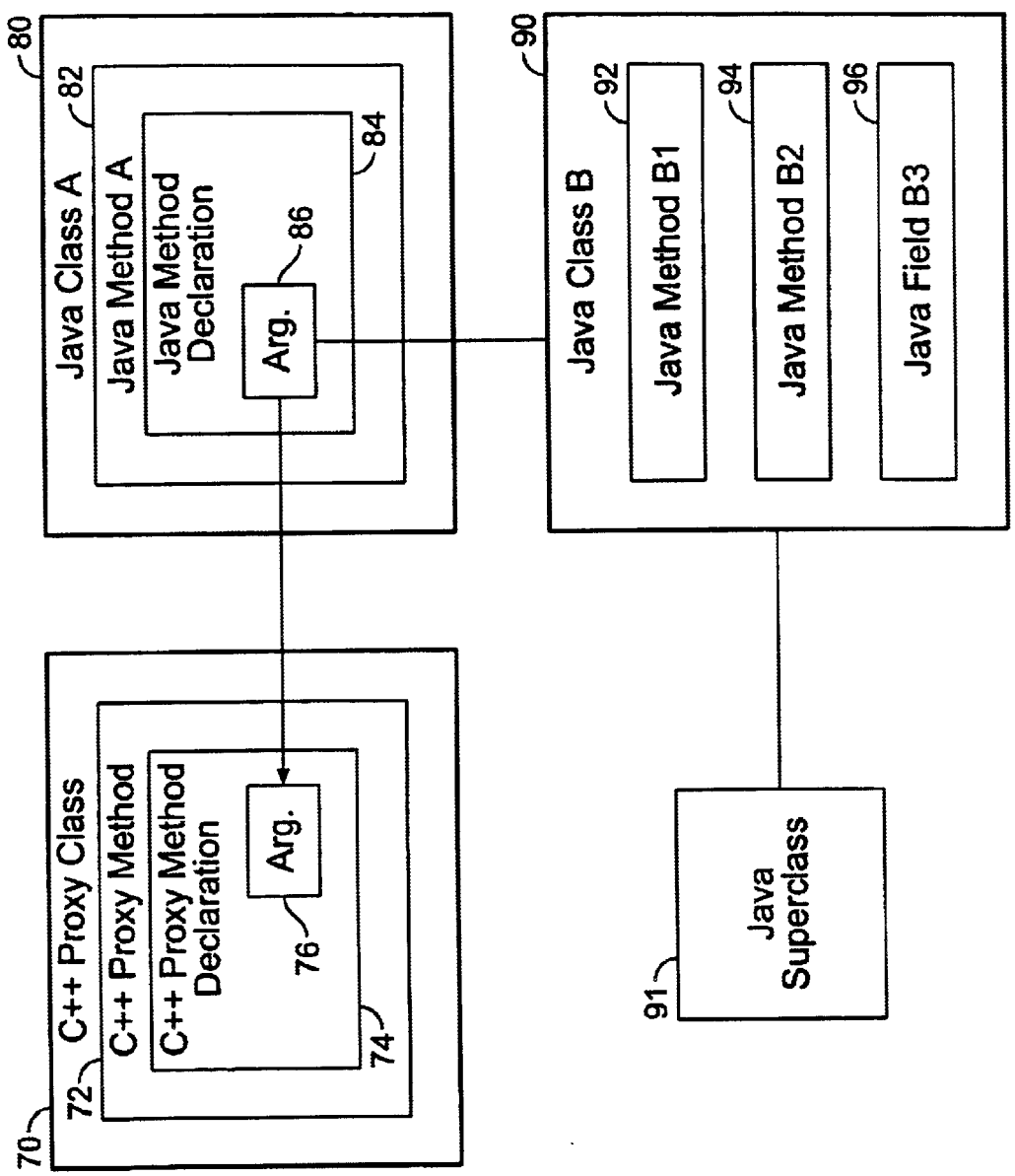
FIG. 13 is a block diagram illustrating an example of a relationship between a C++ proxy method argument, Java method argument, and underlying Java object.

An example of determining the mutability of a Java method argument will now be described in connection with FIG. 13. FIG. 13 is a block diagram including a C++ proxy class 70 and Java classes 80, 90 and 91. C++ proxy class 70 includes a C++ proxy method, which includes a C++ proxy method declaration 74. The C++ proxy method declaration 74 may include one or more method arguments, including method argument 76. C++ proxy class 70 wraps Java class 80.

Java class 80 includes Java method 82, which includes a Java method declaration 84. The Java method declaration 84 may include one or more arguments, including method argument 86. Java class 90 includes three Java methods 92, 94 and 96. The type of Java method argument 86 is Java class 90. Java class 90 extends Java superclass 91.

To determine how to map the mutability of Java method argument 86 to C++ method argument 76, the following heuristics may be applied.

The mutability of Java method argument 86 may be determined from the mutability of the Java class 90 being passed by method argument 86. Further, the mutability of Java class 90 may be determined from the mutability of Java methods 92 and 94, Java field 96 and Java superclass 91. Optionally, a mutability attribute may be determined for each method 92 and 94 in accordance with Table 2, a mutability attribute of field 96 may be determined in accordance with Table 1, and a mutability category may be assigned to Java superclass 91.

Java class 90 may be assigned a mutability category based on: the mutability attributes of its constituent methods 92 and 94 and field 96, and on the mutability category of superclass 91. For example, if all of the constituent elements 92–96 have been assigned a mutability attribute of either "assumed not mutating" or "conceptually not mutating" and Java superclass 91 has been assigned a mutability category of "immutable", then Java class 90 may be assigned a mutability category of "immutable." Further, the Java class 90 may be assigned a mutability category of "mutable" if one or more of the Java methods 92–96 is a non-private Java method assigned a mutability attribute of "mutable."

Method Argument Types (Pass By Value, Pointer or Reference)

As already discussed briefly in the preceding section, in C++, method arguments may be passed by value, through a pointer or through a reference. If the method arguments are C++ proxy method arguments, there is typically no benefit to passing primitive type arguments in any way other than by value. Accordingly, in an aspect of mapping a Java method argument declaration to a C++ method argument declaration, a Java method argument of primitive type is mapped by default to a C++ method argument of a corresponding primitive type. Such a corresponding primitive type may be a JNI primitive type or any type that is capable of representing the value range of the underlying Java primitive type.

It is more difficult, however, to determine whether to map a Java argument to a C++ proxy argument passed by value, reference or pointer if the Java method argument to be mapped is of a non-primitive (i.e. object) type. In Java, every non-primitive argument is a reference that is passed by value. Further, arguments can be passed polymorphically, i.e., it is not required that the instance being passed is of the exact same type as the declared type of the argument. It is sufficient for the instance being passed as an argument to be of a type that extends the declared type of the argument.

In C++, polymorphic argument passing requirements are typically implemented with pass-by-pointer or pass-by-reference arguments. It may be possible to use pass-by-value arguments in some limited circumstances, but such argument use creates problems regarding creation of new subclasses and, therefore, is not recommended. Pointer argument types satisfy the polymorphic argument passing requirement, but they require that instances' addresses be passed. Consequently, the developer either has to use pointers consistently throughout the C++ proxy solution (with the negative consequences for return values that were already discussed) or frequently use the & (address-of) operator.

Accordingly, in an aspect of mapping Java method argument declarations to C++ method argument declarations, Java method arguments of non-primitive types may be mapped by default to C++ arguments that are of type "reference to corresponding C++ proxy class." This type may be modified by a "const" modifier as described above.

Java Proxy Components and Cross Domain Callback Patterns

As described above, Java classes and interfaces may map to C++ proxy classes, and methods of Java classes may map to C++ proxy methods. A C++ proxy class may be inheritable (i.e., be capable of serving as a superclass) by other C++ classes (i.e. subclasses), and one or more of these subclasses may be non-proxy subclasses, i.e. C++ classes that do not have a corresponding Java class. One of these non-proxy subclasses may have a method that overrides a method of the C++ proxy superclass.

In some circumstances, it may be desirable to call a method of a C++ proxy class, or to call an overriding method of a non-proxy subclass of a C++ proxy class, from Java code. Further, it may be desirable that the called C++ method have a semantic usability in the Java domain closely corresponding to the semantic usability of the C++ method in the C++ domain.

For example, in Java, the java.lang.Hashtable class may be used to create a Java hashtable that provides quick access to objects based on their hash-code, if the Java object has been added to a Java hashtable. Java hashtables internally call the hashCode( ) and equals( ) methods of objects that are added to them. Thus, these objects must provide appropriate implementations for these methods. These methods may be inherited from a superclass or they may be a special version provided in the object's class.

A Java class having a hashCode( ) method and an equals( ) method may map to a C++ proxy class having C++ proxy hashcode( ) and equals( ) methods. Further, the java.lang.Hashtable class may map to a C++ proxy hashtable class that provides a C++ proxy hashtable to a Java hashtable.

A developer may create a non-proxy C++ subclass of a C++ proxy class having hashCode( ) and equals( ) methods, and this C++ subclass may provide specialized hashcode( ) and equals( ) methods that override these proxy methods. If the overriding methods are called on the C++ side outside of a hashtable context, then the overriding methods are invoked in accordance with a developer's intent. If, however, a developer, through a C++ proxy hashtable that wraps the Java hashtable, adds an instance of such a C++ non-proxy subclass to a Java hashtable, the Java hashtable is not aware of the overriding methods of the C++ subclass. Consequently, against the intent of the developer, the Java hashtable calls the underlying Java hashcode( ) and equals( ) methods of the Java class being wrapped by the C++ proxy class.

Thus, although in this example the C++ subclass has a high degree of semantic usability in the C++ domain, it does not have the same degree of semantic usability in the underlying Java domain because the developer's intended use of the overriding C++ lo methods is not reflected on the Java side. In other words, the overriding C++ methods are not callable by the Java hashtable, or, expressed more abstractly, a method's polymorphicability is not maintained across domain boundaries.

The above example illustrates a situation where it is desirable to have Java code, (e.g., a Java hashtable) call a C++ component (e.g., the overriding methods of the C++ subclass) that has a semantic usability in the Java domain closely corresponding to the semantic usability of the C++ component in the C++ domain.

Accordingly, in an embodiment of a C++ component wrapping a Java component, where a non-proxy C++ component subclasses the C++ proxy component, a Java proxy component that wraps the C++ non-proxy component may be provided. This Java proxy component may give the non-proxy C++ component a semantic usability in the Java domain closely corresponding to the semantic usability of the non-proxy C++ component in the C++ domain. A Java proxy component defines a concept in the Java domain, but implements the concept in the C++ domain. In this sense, a Java proxy component may be considered an opposite of a C++ proxy component.

Besides Java hashtables, there are many other Java components and patterns for which it may be desirable to have Java proxy components calling C++ components. Such Java components may include Java interface methods, abstract Java methods, and Java method that have overloaded versions. Java patterns for which it may be desirable to have Java proxy components calling C++ components include, for example, the Hashtable usage (described above), the Observer pattern (including Listener), and the Template Method pattern.

A Java proxy component for a C++ method of a C++ proxy class may be provided if the polymorphicability of an underlying Java class is intended to be extended to the C++ side. This extension may allow a C++ method to "override" a Java method in a way that is usable in both domains. Such methods may include, for example, interface methods, abstract methods, or methods that have overloaded versions. Such Java methods may be called by other Java objects in the Java domain as opposed to just being called by a C++ proxy component in the C++ domain. Following are some example situations in which such "cross-domain overriding" may be beneficial:

In Java, a method name is said to be overloaded if there is more than one method of that name with differing numbers of arguments and/or argument types. For example, a method name is overloaded if there is a method of that name with two arguments (i.e., two-argument version) and another method of the same name with four arguments (a four-argument version) two of which correspond with the two-argument version arguments. Internally, the two-argument version may be implemented in terms of the four-argument version by supplying the two missing arguments with default values. This internal defaulting of values for an overloaded Java method occurs relatively frequently in Java because, in contrast to C++, Java does not have default arguments. Thus, a Java developer provides this functionality explicitly by declaring separate versions of the Java method.

If the Java method taking four arguments is not declared final, a subclass of this class may override this method.

Consequently, a C++ developer may wish to override this method by overriding its C++ proxy method in C++. The C++ developer may further wish that the above mentioned Java two-argument version of the method may now delegate to the overriding four-argument C++ version.

A C++ proxy class may wrap a Java Listener interface for the Abstract Window Toolkit (AWT) or Swing subsystems. In Java, an Adapter typically provides a do-nothing default implementation of a Java Listener interface. Thus, Adapters are inherently useless unless used as a base class for a concrete Listener implementation. Using an Adapter as a base class allows the Java developer to selectively override a single method of the Java Listener interface rather than implement all methods that the Java Listener interface declares. Consequently, a C++ developer may wish to override one or more Adapter methods in C++.

Observer is a software design pattern defining a one-to-many dependency between objects so that when one object changes state, all its dependents are notified and updated automatically. Observer pattern is often employed in event-driven programming. In event-driven programs, an object registers interest in receiving notification about certain kinds of events with another object that provides a service. When a qualified event occurs, the service object will send a notification to all registered observers. Typically, the service object calls a particular method on the registered object. This particular method of the registered object is often called the "call back" method. Typically, the call back method is declared in a Java interface and is implemented by concrete Java observers in different ways.

Figure 14:
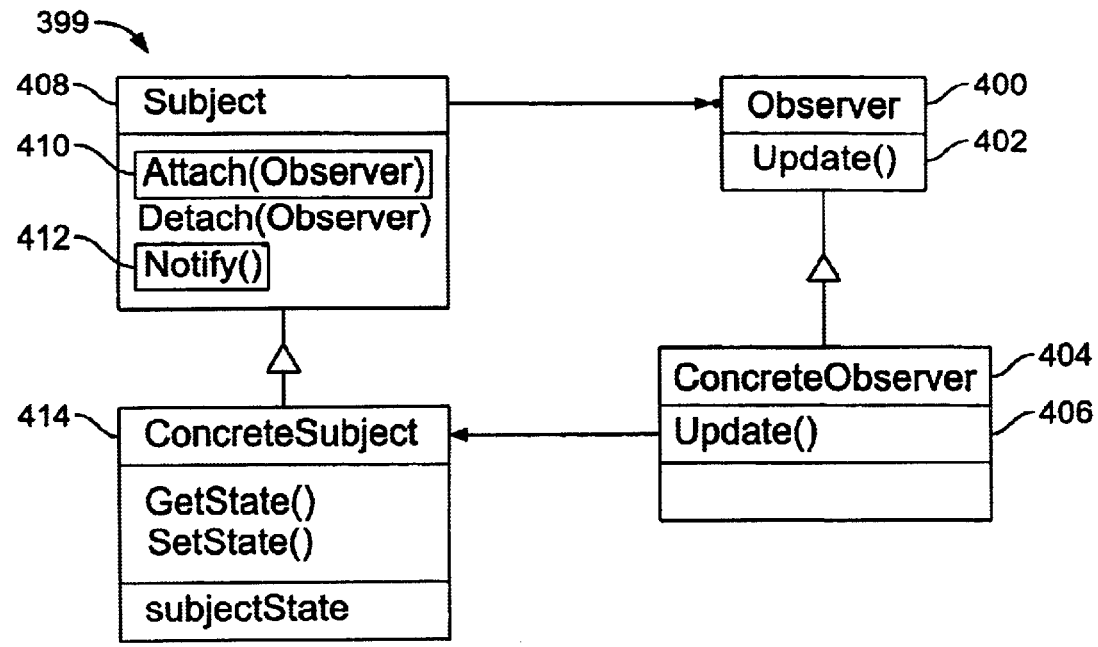
FIG. 14 is a block diagram illustrating an example of an Observer pattern.

FIG. 14 illustrates an example of an Observer pattern 399. Observer pattern 399 includes: Observer interface 400 that includes abstract Observer method Update( ) 402; ConcreteObserver object 404 that includes concrete method Updateo 406; Subject interface 408 that includes abstract method Attach( ) 410 and abstract method Notify( ) 412; and ConcreteSubject object 414 that implements interface Subject 408. In operation, ConcreteObserver object 404 registers itself with ConcreteSubject object 414 by calling the Attach( ) method (not shown) of concrete subject object 414. When a registered event occurs, the Notify method( ) (not shown) of ConcreteSubject object 414 is invoked which causes the Update( ) method 406 of ConcreteObserver object 404 to be called.

A template method pattern is a software design defining part of an algorithm in a class, wherein some of the detailed steps of the algorithm are deferred to subclasses. A template method lets subclasses redefine certain steps of an algorithm without changing the algorithm structure.

Figure 15:
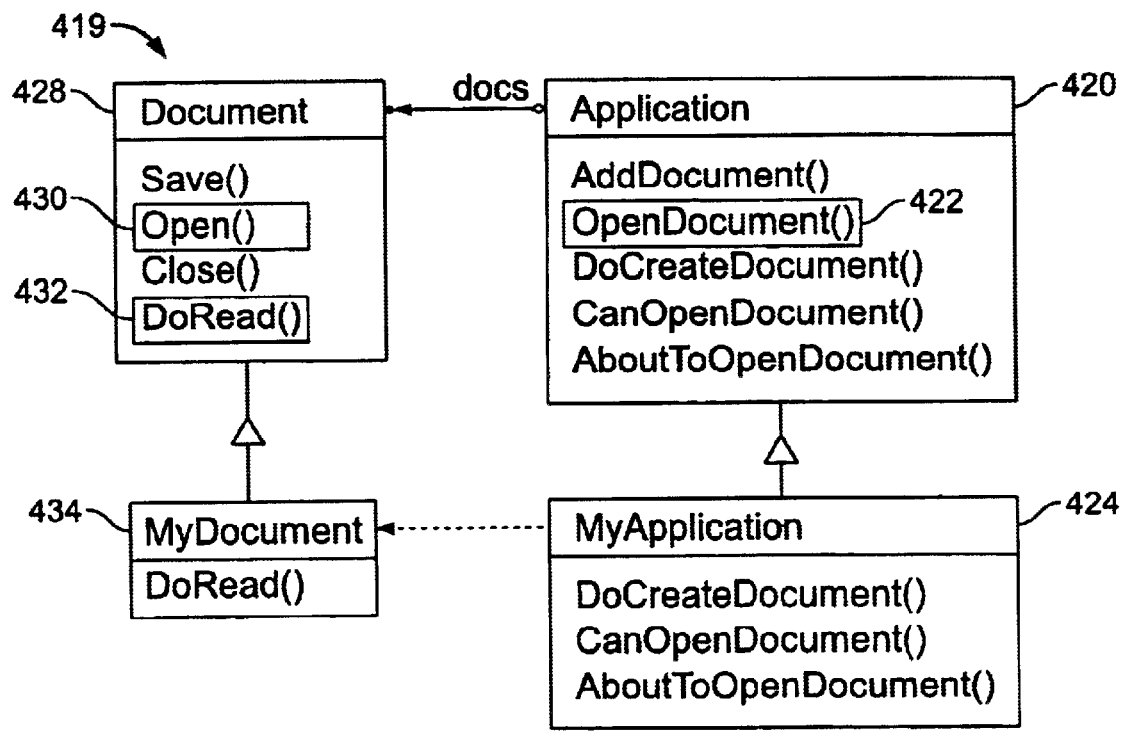
FIG. 15 is a block diagram illustrating an example of a Template Method pattern.

FIG. 15 illustrates an example of a template method pattern 419. An application represented by class Application 420 is designed to deal with different types of documents represented by the abstract Document class 428. One of these documents is represented by concrete class MyDocument 434. When the application is asked to open a document, method OpenDocument( ) 422 delegates the task to the Open( ) method 430 of class 428 that will perform a number of generic operations before delegating to the method DoRead( ) of concrete class 434 that reads a file's data and interprets it. Different types of documents may provide different overrides for DoRead( ) methods 432, but the processing surrounding the invocation of DoRead( ) method 432 is probably generic and can be handled in the generic superclass 428. Method Open( ) 430 is called a template method because it provides the generic template for the "Open Document" functionality while allowing subclasses to customize some aspects.

Each of the overriding Java components described above, and the Hashtable, Listener, Observer pattern and Template Method patterns share at least one characteristic: developer-provided methods are called from code that the developer does not control. This characteristic is by no means limited to the mentioned Java components and design patterns, but occurs rather frequently and adds significant complications to the effort of sharing components between two digital domains. This characteristic is referred to herein as a "callback" pattern. A method being called in a Callback pattern is referred to herein as a "callback method."

Figure 16:
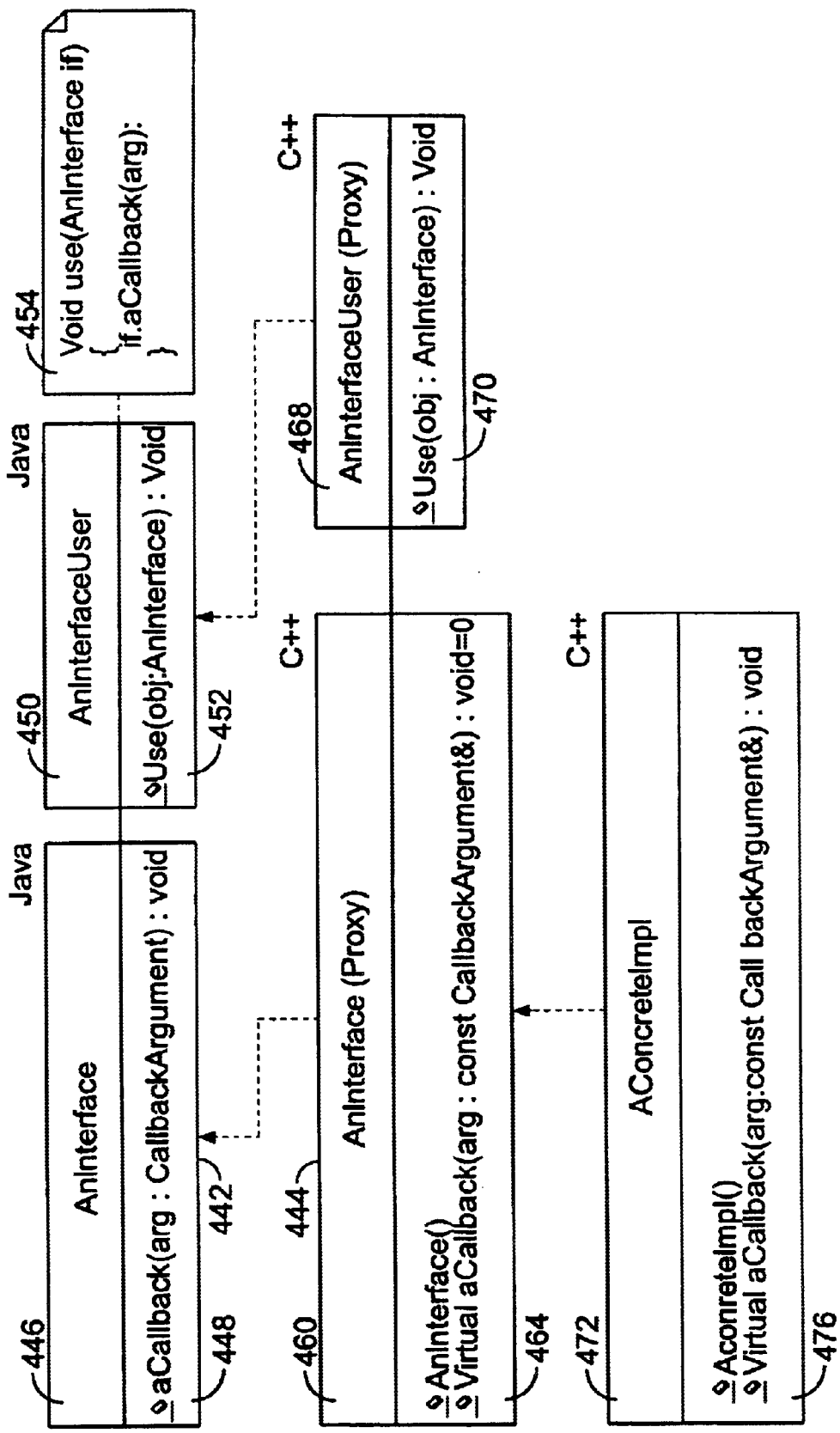
FIG. 16 is a block diagram illustrating an example of an incorrect C++ proxy implementation of a Java callback pattern.

FIG. 16 illustrates an incorrect proxy solution for such a Callback pattern. On the Java side 442, interface AnInterface 446 establishes a calling contract through declaring method aCallback( ) 448. Concrete class AnInterfaceUser 450 declares method use( ) 452, which when executed, invokes method aCallback( ) 448 on the concrete instance being passed to it as an argument as described in 454.

On the C++ side, proxy class 460 corresponds with interface 446 and proxy class 468 corresponds with class 450. These C++ proxy classes have been constructed in a way that ensures a high degree of semantic usability on the C++ side.

One aspect of semantic usability is inheritability, i.e., the ability to use a class as a superclass. A C++ developer may declare a C++ subclass AConcreteImpl 472 to extend C++ proxy class 460 with the intent of providing an implementation 476 of proxy callback method 464. Thus, C++ callback method 476 can be called from C++ code successfully. When an instance of C++ subclass 472 is passed as an argument to C++ proxy method use( ) 470, however, the desired result is not achieved, thereby restricting semantic usability.

The problem is due to several design weaknesses of this proposed proxy solution. First C++ proxy method 470 delegates to its underlying Java method 452. Java method 452 expects a Java instance as an argument. This Java instance is expected to correspond with the instance represented by the argument being passed to C++ proxy method 470. Thus, for an instance of C++ subclass 472 to be semantically-eligible as an argument for C++ proxy method 470, it needs to correspond with a Java instance. C++ subclass 472, however, does not directly correspond with a Java class, rather it inherits a proxy relationship through its superclass C++ proxy class 460, C++ proxy class 460 corresponds with Java interface 446, which is not instantiable. Consequently, instances of C++ subclass 472 do not have the ability to be represented by a Java instance.

Second, even if there were a corresponding Java class for C++ subclass 472 (this might be the case if we are transforming Java classes and not interfaces), the solution would not work because C++ method 476 could not be invoked by the corresponding Java class, which has no knowledge of any C++ proxies.

In an embodiment of a C++ proxy interface wrapping a Java interface where the C++ proxy interface includes one or more C++ methods, provided is a Java proxy class with a callback method that has the capability to delegate execution to an implementation of one of the C++ methods. Optionally, the Java proxy class may be wrapped by a C++ proxy class that upon being delegated execution, delegates execution back to the Java domain. This resulting cross-domain callback pattern may be referred to herein as the trampoline pattern because the callback bounces from a Java class to a corresponding C++ class, back to a Java class.

Figure 17:
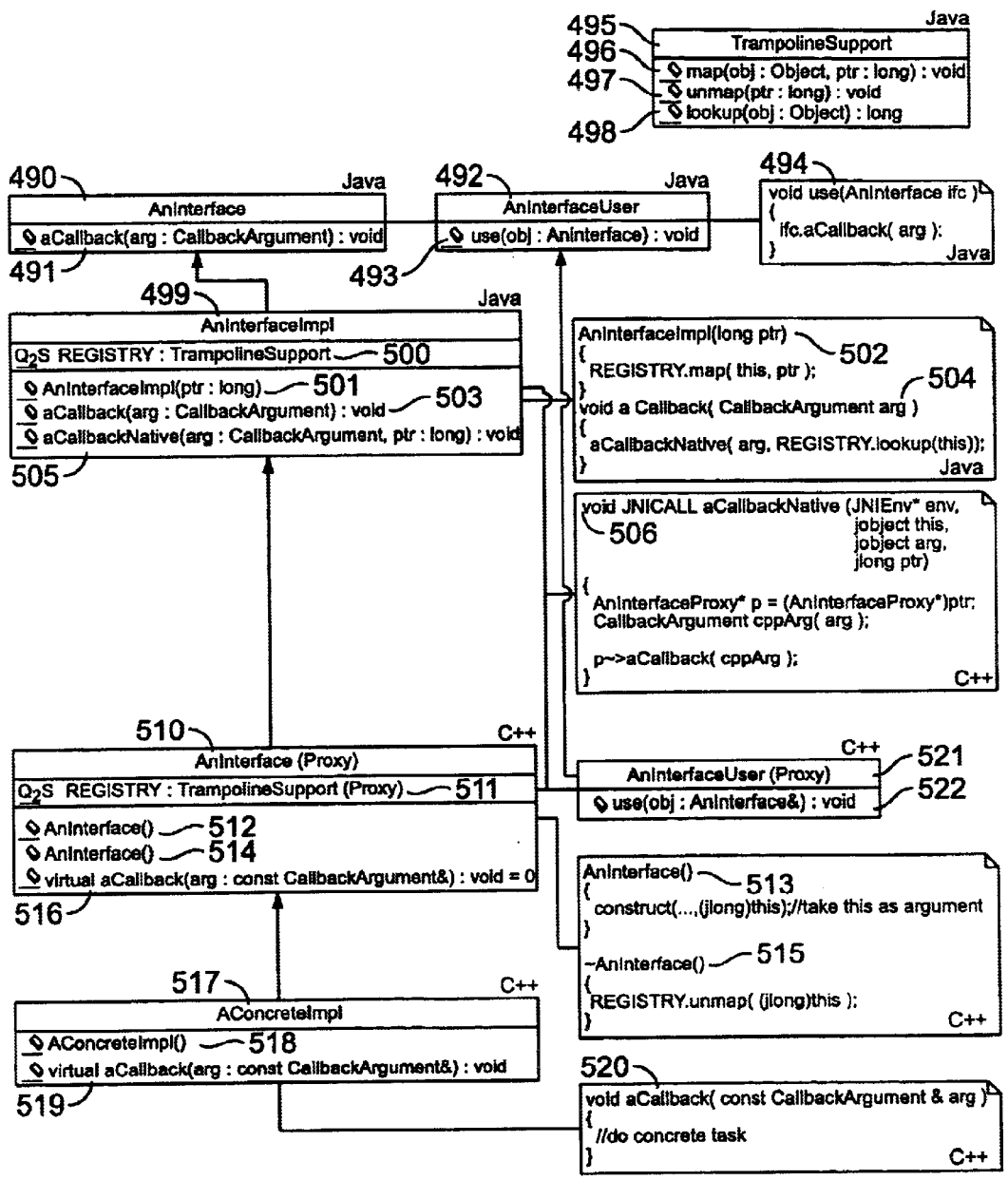
FIG. 17 is a block diagram illustrating an example of a correct C++ proxy implementation of a Java callback pattern.

FIG. 17 illustrates a correctly-functioning example of a cross-domain callback pattern. Java interface 490 containing Java callback method 491 is implemented by Java class 499 that contains a concrete Java callback method 503. Concrete Java callback method 503 includes a call 505 to JNI method 506 to implement the Java callback method. Concrete class 499 is shown in more detail by code fragments 502 and 504. A mapping between Java and C++ instances is maintained by an instance 500 of Java class TrampolineSupport 495. Use of an object registry is only one possible embodiment for maintaining this mapping. In particular, such a mapping may be performed on the C++ side or in a proxy layer rather than on the Java side. Thus the use of the TrampolineSupport REGISTRY instance 500 is merely illustrative. Java class 492 has a Java method 493 that takes an instance of a class implementing Java interface 490 as an argument. Code fragment 494 shows how Java callback method 491 may be invoked by Java method 493.

C++ proxy interface 510, shown in more detail by C++ code fragment 513 and 515, is implemented by C++ concrete class 517 that contains concrete C++ callback method 519. Method 519, shown in more detail by C++ code-fragment 520, is the developer-written implementation of C++ callback method 516.

During execution of the C++ application, an instance of C++ class 517 is constructed using constructor 518. Execution of constructor 518 causes the execution of C++ superclass 510's constructor 512, which, in turn, causes the creation of an instance of Java class 499 as illustrated in C++ code fragment 513. When the Java instance is constructed an entry is made in the Java REGISTRY 500, mapping the newly constructed Java instance to a pointer to the C++ instance. Given that Java has no notion of pointer types, the C++ pointer may be maintained in an integral type of sufficient size.

This C++ instance may then be passed to C++ method 522 of C++ class 521 which, being a C++ proxy, passes the reference on to method 493 of Java class 492. As illustrated in Java code fragment 494, the execution of method 493 causes the virtual invocation of Java callback method 491 of C++ interface 490 resulting in the invocation of Java method 503 of Java class 499.

As illustrated by Java code fragment 504, Java method 503 delegates to native method 506 which is written in C++. Native method 506 is called with the retrieved C++ pointer in addition to any other arguments supplied to Java method 503. An alternative embodiment may provide a native implementation for method 503, which may be more convenient, for example, if the object registry is situated on the C++ side.

Native method 506 casts the C++ pointer to a pointer to C++ proxy interface 510 and calls the C++ callback method 516 which, being virtual, executes C++ method 519, thus completing the cross-domain callback.

Implementing a cross-domain callback pattern is more difficult if a Java class (as opposed to an interface) includes default implementations of its callback methods, and we want to extend this Java class in C++. The complication stems from the fact that the Java callback method should be executed unless the C++ extending class overrides it.

In an aspect of providing cross-domain callback, a Java class including default implementations is extended by a Java proxy class that provides a trampoline implementation, such as described above, for every Java callback method. Accordingly, the callback method of each Java proxy class may delegate execution to a C++ instance as described above in the interface case. The major difference lies in the implementation of the C++ proxy class (which is the equivalent of the C++ interface proxy 510).

Because the Java class (as opposed to a Java interface) is instantiable, the C++ proxy class for this Java class may provide a default implementation for every callback method defined by the Java class (with Java interfaces, this "direct" implementing by the C++ proxy class was not possible because the Java interface had to be implemented by Java subclasses, and, in turn, these Java subclasses had to delegate execution to C++ subclasses of the C++ proxy class). Each C++ callback implementation may be defined such that, upon being called by a Java object, it calls right back into Java by invoking the original Java class' implementation of the callback method. In this way, the correct Java method is invoked after a short detour into the C++ domain.

If, however, a concrete C++ class overrides the C++ class' callback into Java, the concrete C++ class's version of the callback method gets called as described above in connection to FIG. 16, thereby overriding the Java class's implementation.

Exceptions and Error Handling

Both Java and C++ allow the use of exceptions to signal unexpected conditions or error conditions. The exception models of the two languages, while similar, differ in some crucial aspects:

Java methods can only throw instances of java.lang.Throwable or instances of classes derived from java.lang.Throwable. C++ methods, on the other hand, can literally throw any type, including primitives, references and pointers.

Java has two basic types of exceptions, checked and unchecked. Checked exceptions need to be declared in the throws clause of a Java method if the execution of the method could cause the exception to be thrown and the exception is not caught within the method. This requirement is enforced by the Java compiler. Unchecked exceptions (i.e. exceptions derived from the class java.lang.RuntimeException or java.lang.Error) do not need to be declared in the throws clause of the Java method. The absence of a throws clause in a Java method declaration is interpreted by the compiler as a promise that this method will only throw unchecked exceptions or no exceptions at all.

C++, on the other hand, makes no distinction between checked and unchecked exceptions. Effectively, all exceptions in C++ are unchecked because the compiler cannot enforce checked exceptions. Thus, the throws clause is optional, but has an unexpected side-effect if used. Specifically, if a method is declared with a throws clause and throws an exception of a type that is not included in the throws clause, C++ will convert the exception to an exception of type unexpected. Typically, a C++ handler for exceptions of type unexpected will terminate an application upon detecting an unexpected exception.

The absence of a throws clause in a C++ method declaration is interpreted by the compiler as an unavailability of information regarding whether a method can or cannot throw exceptions, i.e. no promises or guarantees are made about this method and every exception is allowed. The presence of an empty throws clause in a C++ method is interpreted as a promise that a method will not throw any exceptions. Effectively, the presence of a throws clause in a C++ method declaration is interpreted as a switch from the C++ unchecked exception model to a strictly checked-at-runtime model.

If a C++ method is a proxy method for a Java method, Java's semantics regarding declared, checked exceptions and undeclared, unchecked exceptions do not map directly to C++ semantics regarding throwing exceptions. Declaring the checked exceptions in a throws clause of a C++ proxy method would cause the invocation of the unexpected handler for all unchecked exceptions.

Consequently, a Java method declaring a throws clause (i.e., throws an exception) may be mapped to a C++ method that does not declare a corresponding throws clause even though it may throw an exception. Alternatively, a C++ method that wraps a Java method that throws an exception may also be declared with a corresponding throws clause, although for the reasons described above, this may not be desirable.

Any Java exceptions that are thrown during the execution of a C++ proxy component are exposed to C++ through the JNI layer (or its alternative). Because JNI is a low level of abstraction and is an API for C, JNI explicitly requires the developer to query for exceptional conditions rather than signaling them like exceptions.

Accordingly, in an aspect of a C++ proxy method wrapping a Java method that throws exceptions, the C++ proxy method handles JNI-layer errors and exceptions.

As described above, the JNI implementation details of a C++ proxy component may be implemented such that they are transparent to a C++ developer. A C++ developer may see highly-convenient C++ wrappers around a JNI programming interface. Hiding details, however, may cause the C++ developer to not be aware of the fact that a JNI function is called in the course of using a C++ proxy component. For example, a single C++ proxy object may make multiple JNI function calls to the Java domain to implement a concept.

Most JNI functions can theoretically cause an exception or an error to be thrown in a JVM. When an exception or error is thrown in a JVM, subsequent JNI function invocations from the C++ side may cause unpredictable behavior unless the exception or error thrown in the JVM is cleared, i.e., handled.

Accordingly, if exception and error handling implementation details are hidden from a C++ developer, an effective C++ error-handling mechanism may be provided to deal with exceptions and errors that occur in the JNI layer.

Accordingly, in an embodiment of wrapping a Java method that throw exceptions with a C++ proxy method one or more developer preferences may govern the exception behavior of the C++ proxy method. Some developers may wish to maximize semantic usability by having a C++ proxy method throw typed exceptions, while other developers may wish to integrate C++ proxy components with an application that does not perform exception handling.

In an aspect of mapping Java methods that throw exceptions to C++ proxy methods that handle JNI layer errors, one of the following error handling and exception handling strategies may be implemented.

In a first strategy, JNI exceptions and errors may be cleared in a JNI layer, and execution of a shared C++ and Java application may effectively ignore the exception or error. Using this strategy, if a high-level C++ concept translates into a sequence of JNI API invocations, the failure of any one JNI call in the sequence may cause the remainder of the sequence to not be executed. C++ proxy classes may not be provided for Java exceptions because exceptions are not used. Thus, this strategy involves a high level of risk because failures occur silently. Consequently, because most Java methods throw concrete exceptions to signal certain conditions to the calling code, this error-handling strategy may limit semantic usability of C++ proxy components that merely clear JNI exceptions and errors in the JNI level.

In another exception and error handling strategy, any JNI-related exceptions or errors may be mapped to a generic C++ proxy class for exceptions, and this C++ proxy exception class may be thrown as a C++ exception after the underlying JNI error or exception has been cleared. In this strategy, the generic C++ proxy class for exceptions may not correspond with any specific concrete Java exception class and, therefore, may not proxy the unique attributes of each type of Java exception. Use of this strategy will provide a semantic usability of such a generic C++ proxy class closely corresponding to the semantic usability of Java exception classes, while requiring some differences in coding style (for example, multiple catch blocks may map to one catch block with embedded "if-else" blocks). Using this strategy, specific C++ proxy classes for Java exception classes may be provided only for Java exceptions that offer custom functionality for error-handling.

In yet another error-handling strategy, an exception at the JNI level may be mapped to a corresponding C++ proxy component and thrown as a C++ proxy exception. This strategy may be preferred for C++ components that want to provide a programming environment that mirrors as closely as possible the original Java programming environment.

In another error-handling strategy, any exception at the JNI level is treated as a fatal error at the JNI level, and the JNI function FatalError is called in response. This strategy closely mirrors JNI's default strategy for unhandled error conditions.

In one implementation of any of the above exception and error-handling strategies, any exception or error that occurs at the JNI level may be logged through a customizable logging method before an error-handling mechanism is invoked.

Java VM and JNI Environment pointer handling

A C++ application that uses C++ proxy components may use a Java Virtual Machine to execute the underlying Java code.

In an embodiment of making a Java Virtual Machine available to C++ proxy components, the JVM may be loaded and initialized on demand when the use of a C++ proxy component requires the use of the underlying Java component.

Typical implementations of Java Virtual Machines reside in a shared library. In order to load a Java Virtual Machine, the shared library containing the JVM is identified. In an optional aspect of this embodiment, the shared library containing the JVM may be identified through a configuration setting. After the shared library is loaded, the JVM has to be started and initialized. JVM initialization arguments may include settings like the classpath, available RAM and other information that may vary between JVMs. In another optional aspect of this embodiment, initialization arguments may be specified through configuration settings.

As discussed in the JNI section, most JNI functions take a JNIEnv pointer as an argument. Most of the remaining JNI functions require a Java VM pointer as an argument. C++ classes may declare special member functions (e.g., constructors, conversions or a destructor) that have a special meaning in the sense that they affect the way a compiler treats objects of their class, i.e., they affect the semantic usability even when they are not explicitly used. Many of these proxy support elements have distinct and un-modifiable argument lists. For example, a destructor can never take any arguments, which makes it impossible to pass the JNIEnv or JavaVM pointer to these methods. If a C++ class is a C++ proxy class, many of its special member functions (e.g., proxy support elements) may have to invoke JNI functions for which a JNIEnv or JavaVM pointer may be required. Thus, it may be desirable to have an alternate way of making these pointers available.

In an embodiment of generating C++ proxy components having high semantic usability, a C++ method may be provided with a JNIEnv or Java VM pointer through means other than by a function argument. Such pointers may be provided by: thread local storage, a lookup-table that maps threads to JNIEnv pointers, and, in a single-threaded application, by declaring the pointer with a global variable.

In an alternative embodiment of generating C++ proxy components of high semantic usability, an alternative means for loading and initializing a Java VM and providing a JNIEnv or JavaVM pointer is provided that allows a developer to be completely unaware of pointers' presence. For example, a runtime-use of a C++ proxy component may result in the following sequence of actions that are all invisible to the developer:

1) load and initialize a Java VM, producing a JavaVM pointer;
2) attach the C++ application's thread to the started Java VM, producing a JNIEnv pointer; and
3) use the newly acquired JNIEnv pointer to call one or more JNI functions, for example to load a Java class, identify a method of the loaded class and execute it.

Compiling, Linking, and Running

Figure 18:
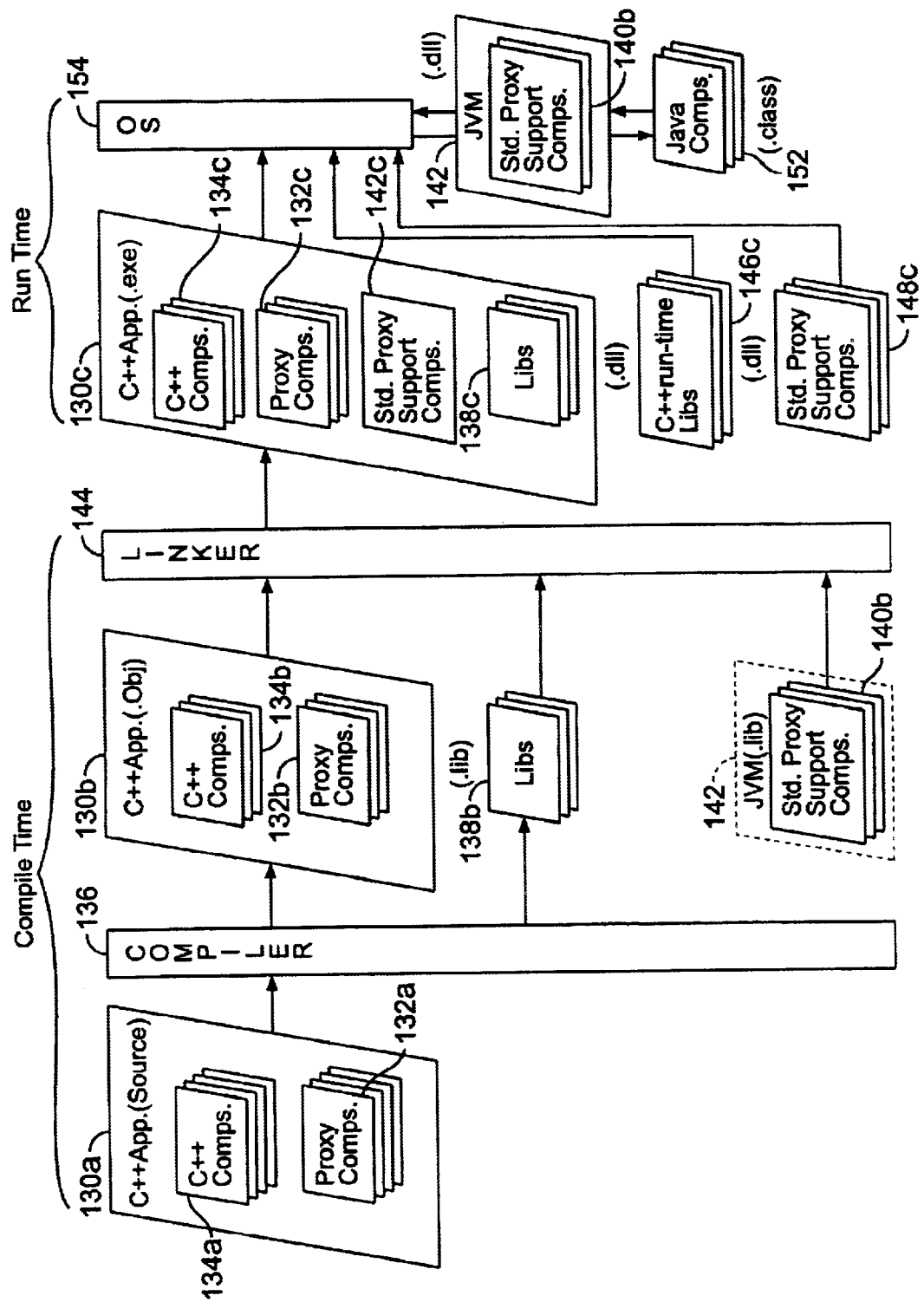
FIG. 18 is a data flow diagram illustrating an example of a system for compiling, linking, and running a C++ application having C++ proxy components.

FIG. 18 is a dataflow diagram illustrating an example embodiment of compiling, linking, and running an application that uses C++ proxy components. A C++ application 130a may include the source code for regular (i.e., non-proxy) C++ components 134a and C++ proxy components 132a. A compiler 136 may receive the source code of C++ application 130a and compile it to form an object code version of C++ application 130b, including an object code version of C++ regular components 134b and an object code version of C++ proxy components 132b.

A linker 144 may receive the object code version of the C++ application 130b, libraries 138b such as, for example, the C++ standard library, and C++ standard proxy support components 140b. Standard proxy support components 140b may include, among other things; classes that act as base classes for C++ proxy classes, predefined C++ proxy classes for primitive types (described above in FIGS. 8–11), and utility classes that can assist user-generated C++ proxy classes in their tasks.

Optionally, each of the standard proxy support components 140b may be included as part of a Java Virtual Machine (JVM) 142 and made available to be linked by the linker 144 to a C++ application such as, for example, C++ application 130b.

Each of the C++ standard proxy support components 140b and the libraries 138b may be either a static link library or a dynamic link library. A static link library may contain object code and may be linked and, effectively, directly integrated with other object code to form an executable application. Linking static link libraries to an application may add significantly to the size of an executable application.

A dynamic link library is dynamically linked to an executable application at runtime. Typically, on Windows systems, a dynamic link library has a .dll extension and is referred to simply as a DLL. On most Unix systems, a similar concept is called "shared object" and typically denoted with a .so extension. In the following discussion, the term "DLL" will be used to refer to the corresponding features of a platform. If a dynamic, rather than a static, library is used, the linker may be provided with a .lib file. In the dynamic case, the .lib file does not directly contain the compiled source code, but may contain so-called "stubs." Stubs may be an index into a file that contains the compiled code. Stubs may be implemented in any number of ways without affecting the general principle of runtime-linking. The .lib with the stubs is linked with the rest of the application, adding only the size of the stubs to the total size. At runtime, the operating system may attempt to locate a DLL corresponding with the .lib file and any index maintained by a stub may be interpreted as a data or function address in the DLL.

The linker 144 links the received components 130b, 138b and 140b to produce an executable version of the C++ application 130c, which may include the linked object code of the C++ regular components 134c, the C++ proxy components 132c, C++ standard proxy support components 142c, and library components 138c. In the case of any of these components residing in a DLL, the executable may only contain stubs for these components.

In an alternative aspect of compiling, linking and running an application that uses C++ proxy components, the result 130c of the linker step may be a static or dynamic library that may be used by other C++ programs or by applications written in other programming languages that can link with libraries.

At runtime, an operating system 154 may receive executable C++ application 130c, and any of a combination of C++ runtime DLL 146c, standard proxy support runtime DLLs 148c, JVM 142 and Java components (i.e., Java class libraries) 152c. Each DLL of the runtime DLLs 146c and 148c may correspond to a .lib of the .libs 138b and 140b, respectively, that contains stubs as opposed to object code.

At runtime, when the C++ executable application 130c is launched by the operating system 154, linked elements 134c, 132c, 142c and 138c and may each be executed in the course of executable 130's execution. For any of the libraries 138c and C++ standard proxy support components 142c that contain stubs, the operating system 154 may attempt to locate a corresponding DLL (i.e., one of the C++ runtime DLL 146c or one of the C++ standard proxy support runtime DLLs 148c), load it into memory, and make the stubs in the executable application 130c refer to the memory locations of the data and functions of the DLLs. Compile-time and runtime options may govern when and how this last step in the DLL loading process is performed.

In an aspect of a running executable C++ application 130c, when either a proxy component 132c or a standard proxy support component 142c are executed and a JNI method is invoked, the operating system 154 may then load and initalize JVM 142 (if not already done for a previous JNI call). With the JVM 142 loaded, a JNI method call through a proxy component 132c or a standard proxy support component 142c may request the loading of a Java class 152 into the JVM. After the Java class is loaded, a method call or field access on a C++ proxy component 132c may be delegated to the corresponding, loaded Java class 152.

FIG. 18 merely illustrates one embodiment for compiling, linking and running a C++ application 130a that includes C++ proxy components and uses any of a combination of C++ standard proxy support components, a JVM, and Java components. Several other implementations are possible. Accordingly, the embodiment of FIG. 18 is provided merely for illustrative purposes and does not limit the scope of any of the inventive concepts disclosed herein.

Component Transformation

In another embodiment of sharing a component of a first domain with other domains, a system for and method of automatically transforming a first component in a first domain to a proxy component of a second domain is provided. Automatic proxy component transformation reduces cost and the inherent difficulties in developing an application that shares a dynamic concept between C++ and Java. For example, such a system or method may automatically transform a Java component describing a dynamic concept into a C++ proxy component that wraps the Java component.

The description provided below, which describes example component transformations from Java to C++, is not intended to limit the scope of automatic component transformation to these functional domains, but is provided merely for illustrative purposes. Component transformation may apply to other digital domains, both functional and non-functional.

Further, automatic component transformation may be applied to transform a component of a first domain to a non-proxy component of a second domain, i.e., a component confined in the second domain that is not implemented in the first domain.

Figure 19:
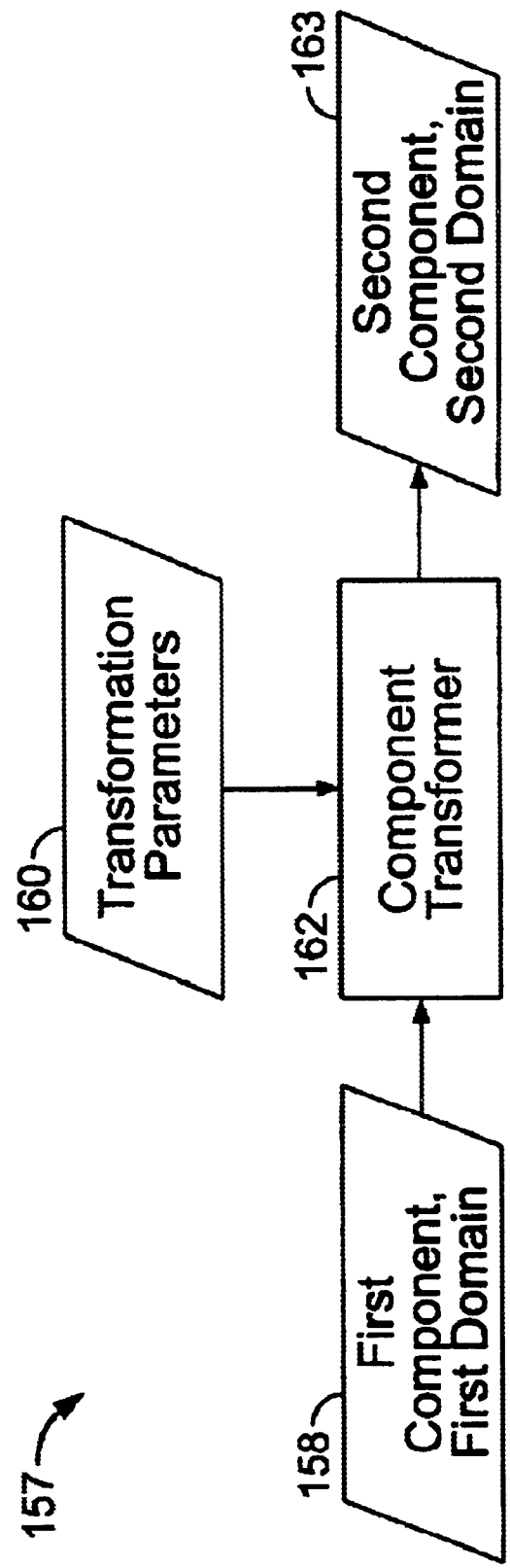
FIG. 19 is a data flow diagram illustrating an example of a system for transforming a component from a first digital domain to a second digital domain.

FIG. 19 is a data flow diagram illustrating an example embodiment of a transformation system 157 for transforming a first component 158 of a first domain to a second component 163 of a second domain. A component transformer 162 may receive the first component 158 of a first domain as input and transform the first component 158 to produce the second component 163 of a second domain as output. In an aspect of transforming a first component 158 of a first domain, the component transformer 162 may generate more than one component in the second domain, which may depend on the component being transformed.

The component transformer 162 may be implemented using software, firmware, hardware, or an combination thereof. For example, component transformer 162 may be implemented in the Java programming language, although other programming languages such as, for example, C++ or Smalltalk, may be used.

Figure 20:
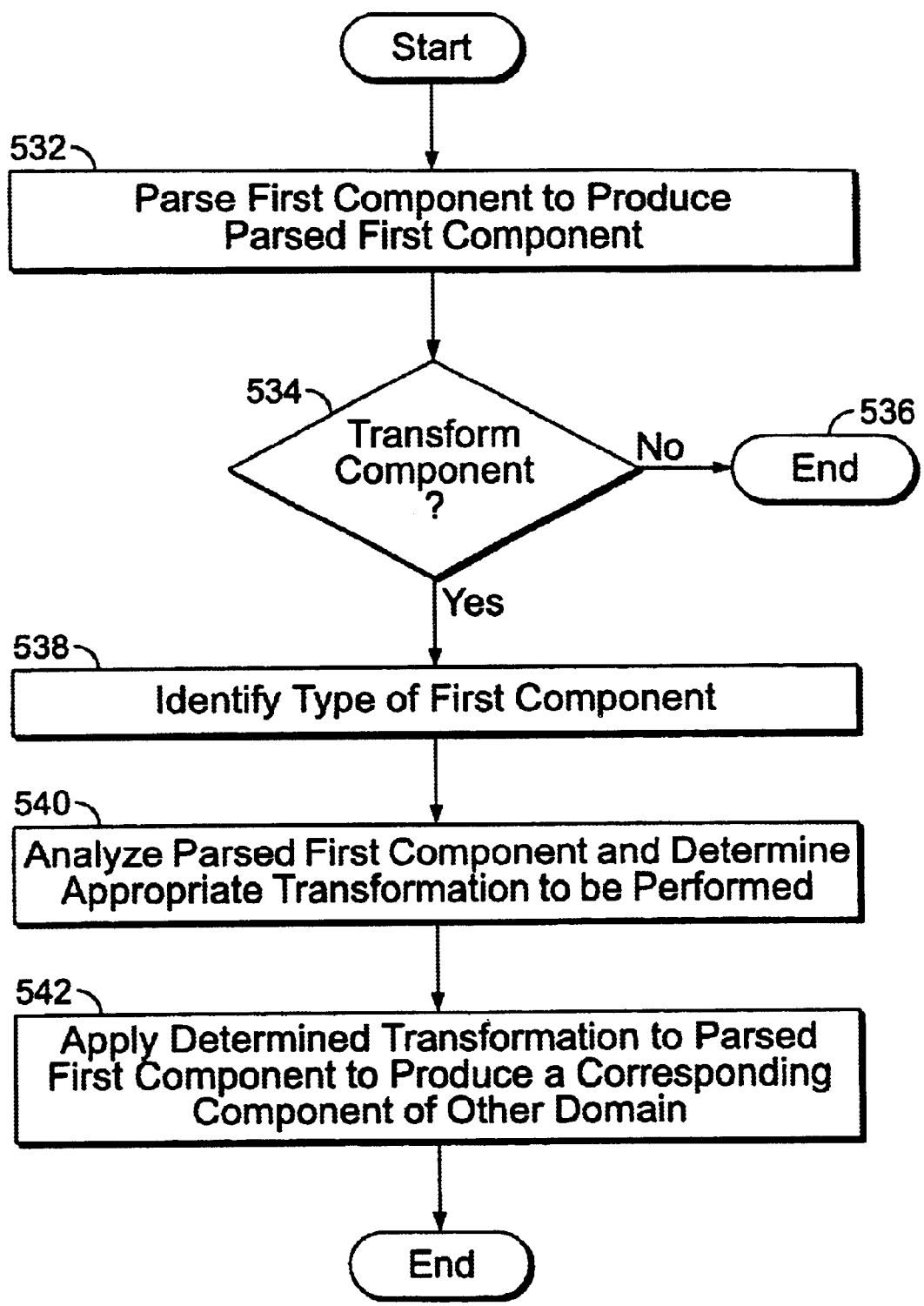
FIG. 20 is a flowchart illustrating an example of a method of transforming a component from a first domain to a second domain.

FIG. 20 is a flow chart illustrating an example embodiment of a method of transforming a first component of a first domain to a second component of a second domain. Such a method may be used by the component transformer 162 of transformation system 157. First, in step 532, a first component may be parsed to produced a parsed first component. Any of a number of known parsing techniques may be used to parse the first component. The parsing technique may depend on the functional domain (e.g., C, C++, Java, Pascal, etc. . . ) of the first component, and possibly the form (e.g., source code or compiled code) of the component For example, the first component may be a compiled Java component (i.e., Java byte code) or a Java source component (i.e., Java source code for a Java class). If the first component is a Java source component, then the parsed first component may be represented as an element of a Java syntax tree that may have child elements and a parent element. If the first component is a compiled Java component, the parsed first component may be represented in the Java class file format, which is well-documented.

Next, in step 534, it may be determined whether to transform the first component. For example, the component transformer 162 may be configured such that all components are transformed. Alternatively, a transformation parameter, discussed in more detail below, may indicate whether the first component is transformed. Further, the first component itself may contain information that determines whether the first component is transformed.

If it is determined in step 534 that the first component is not to be transformed, then the transformation of the first component may end 536.

If it is determined in step 534 that the first component is to be transformed, then next, in step 538, the type of the first component may be identified. For example, if the first domain is the Java programming language, then the first component may be identified as a Java class or a Java interface.

Next, in step 540, the parsed first component may be analyzed, and the appropriate transformation to be performed on the first component may be determined. Such a determination often depends on the type of the component.

Figure 21:
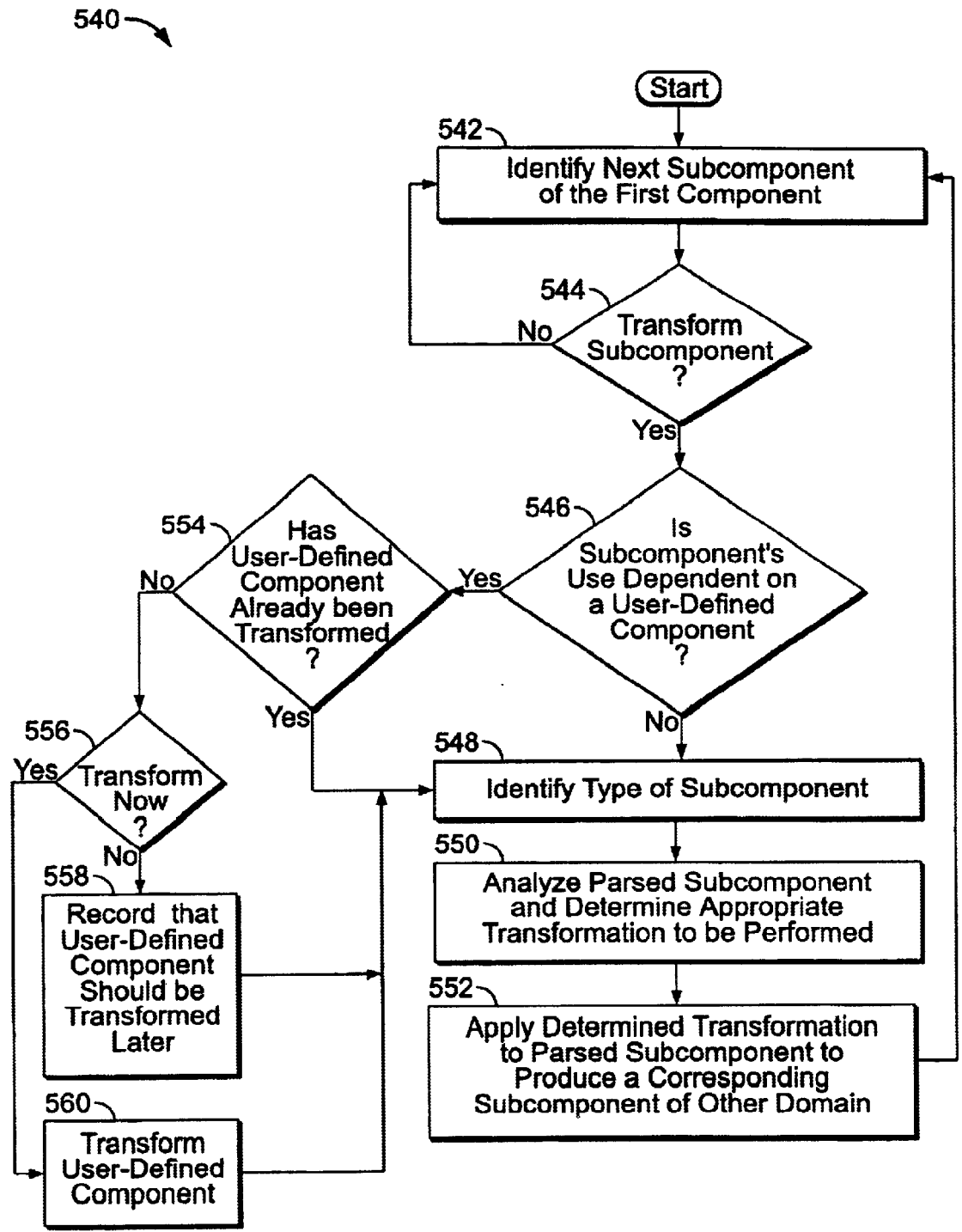
FIG. 21 is a flowchart illustrating an example of a method of analyzing a component being transformed from a first domain to a second domain.

FIG. 21 is a flow chart showing an embodiment of step 540 in more detail. In step 542, a next subcomponent of the first component may be identified. For example, if the first component is a Java class, then the first subcomponent may be a Java method. In another example, the Java component may be a Java interface, and the subcomponent may be a Java abstract method.

Next, in step 544, it may be determined whether to transform the subcomponent. This determination may be made in a similar fashion as described above in connection to step 534. If it is determined in step 544 that a transformation of the subcomponent is not be made, then the next subcomponent of the first component may be identified in step 542.

If it is determined in step 544 that the subcomponent is to be transformed, then next, in step 546, it may be determined whether the subcomponent is defined such that it implements a user-defined component. For example, if the first component is a Java class, and the subcomponent is a field of the Java class, then step 546 may determine that the field is of type class (a user-defined component), as opposed to a Java-defined component such as a Java primitive type. "User-defined component" may be interpreted to include pre-defined Java classes that have not been written by the user of component transformer 162.

If it is determined in step 546 that the subcomponent does not depend on a user-defined component, then in step 548 the type of the subcomponent may be identified.

Next, in step 550, the parsed subcomponent may be analyzed and the appropriate transformation to be performed on the subcomponent may be determined. The transformation may depend on the type of the subcomponent determined in step 548.

Next, in step 552, the determined transformation may be applied to the parsed subcomponent to produce a corresponding subcomponent of another domain. For example, if the first component is a Pascal function, the corresponding subcomponent may be a Fortran function.

If it is determined in step 546 that the subcomponent's use does depend on a user-defined component, then in step 554, it may be determined whether the user-defined component has already been transformed. For example, a lookup table, register, or some other data structure may be used to determine whether a user-defined component has already been transformed. Such a data structure may include one or more entries, where each entry represents a user-defined component, and each entry indicates whether the user-defined component has already been transformed. Alternatively, such a data structure may hold entries only for those user-defined components that have already been transformed, or only user-defined components that have not been transformed.

If it is determined in step 554 that the user-defined component has already been transformed, then steps 548–552 may be performed on the subcomponent.

If it is determined in step 554 that the user-defined component has not already been transformed, then in step 556 it may be determined whether the component is to be transformed now or later. Whether to transform the subcomponent now or later may be determined by a default setting of the component transformer 162 or by a transformation parameter, similar to as discussed above with respect to step 534.

If it is determined in step 556 that the user-defined component is to be transformed now, then in step 560, the user-defined component may be transformed, and then steps 548–552 may be performed on the subcomponent. The user-defined component may be transformed in accordance with steps 532–560 of FIGS. 20 and 21.

If it is determined in step 556 that the user-defined component is not to be transformed now, then in step 558 the fact that the user-defined component should be transformed later may be recorded. This record may be stored in any of a number of data structures, such as a lookup table or a register. Other types of data structures may be used. The stored record may be accessed later, such as, for example, in step 554, to determine whether a component is to be transformed. After step 558, steps 548–552 may be performed on the subcomponent.

Returning to FIG. 20, after step 540, in step 542, the determined transformation for the parsed first component may be applied to the parsed first component to produce a corresponding component of another domain. For example, if the first component is a C procedure, the corresponding component may be a COBOL procedure.

Transforming a first component of a first domain to a second component of a second domain may be performed in any of a number of ways, and such transformation is not intended to be limited to embodiments described in connection to FIGS. 20 and 21. Other methods of transformation may be used.

In an aspect of transformation system 157, the component transformer 162 may also receive transformation parameters 160 to configure the component transformer 162. For example, a transformation parameter may configure the component transformer 162 to generate a proxy component or a non-proxy component. Another transformation parameter may control the digital domain to which the component transformer 162 transforms. For example, the component transformer may be capable of transforming a Java component to one of several digital domains such as, for example, the C programming language, the C++ programming language, the CORBA architecture, and the XML document specification. Thus, the transformation parameters may control the digital domain to which the Java component is converted.

The component transformer 162 may be configured to apply knowledge of the syntax and semantics of the first and second domains to make default transformations of components between the source and target digital domains such as, for example, transformations in accordance with the default mappings, rules, and heuristics discussed above in connection to FIGS. 1–18.

The component transformer 162 may be configured to transform a component of a first domain to a proxy component of a second domain. To generate a proxy component in a second domain that accurately shares a concept, particularly a dynamic concept defined by a first component of a first domain, the component transformer 162 should be configured to generate proxy components that adhere to the syntax of the second domain and that have a semantic usability in the second domain closely corresponding to the semantic usability of the first component in the first domain.

The semantic usability of the proxy component may be defined, depending on the functional domain of the proxy component, by one or more of the following properties of the proxy component: context-usability, inheritability, mutability, accessibility, instantiability, polymorphicability, or any combination thereof, as described above in connection to FIGS. 1–18. Further, each of these properties may be determined, depending on the functional domain of the first component, from one or more of the following properties of the first component: context-usability, inheritability, mutability, accessibility, instantiability, polymorphicability, or any combination thereof, as described above in connection to FIGS. 1–18.

In an embodiment of sharing a component between two domains, the component transformer 162 receives a Java component as input and transforms the Java component to produce a C++ proxy component as output In an optional aspect of this embodiment, JNI is used to code the proxy layer between C++ and Java. In alternative option aspect of this embodiment, other interfaces such as, for example, Microsoft's Raw Native Interface (RNI) and Netscape's Java Runtime Interface (JRI), may be used to implement a proxy layer between C++ and Java.

The component transformer 162 may be configured to transform Java components to C++ proxy components in accordance with the Java-to-C++ component mappings described above, and in accordance with the heuristics and rules described above in connection to such mappings and in connection to FIGS. 1–18.

The component transformer 162 may include a plurality of modules, each module corresponding to a specific Java component to be transformed. For example, the component transformer 162 may include: a Java package transformer, a Java interface transformer, a Java class transformer, a Java array transformer, a Java field transformer, a Java method transformer. Further, these modules may include submodules such as, for example, a method argument transformer and a method return type transformer.

Depending on the Java component being transformed, the component transformer 162, when transforming a Java component to a C++ proxy component, may be configured to generate other components in addition to the C+d+proxy component.

For example, in accordance with the description above regarding cross domain callback patterns in connection to FIG. 17, the component transformer 162 may include a Java class transformer and/or a Java interface transformer configured to transform Java classes and interfaces, respectively, into a C++ proxy class, a Java proxy class and native methods that together implement a cross-domain callback pattern.

The component transformer 162 may be configured to determine that a received Java method is an interface method, an abstract method, or a method that has overloaded versions. If it is determined that the received Java method is one of these types of methods, then the received Java component may be transformed (e.g., by an interface transformer or class transformer) into a C++ proxy class, a Java proxy class and native methods that together implement a cross-domain callback pattern.

Figure 22:
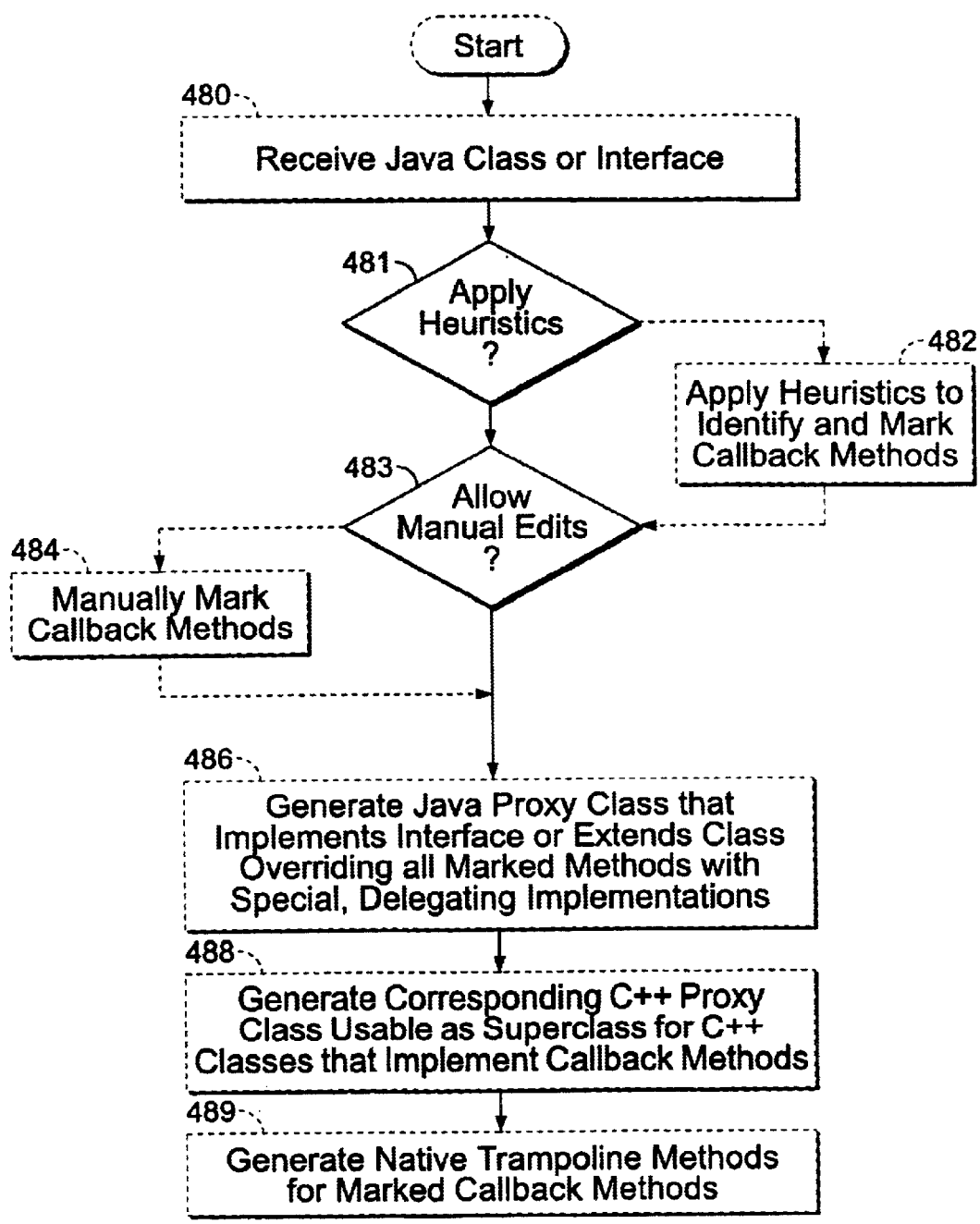
FIG. 22 is a flowchart illustrating an example of a method of generating a C++/Java cross-domain callback pattern from a Java class or interface.

FIG. 22 is a flow chart illustrating an example embodiment of a method for transforming a Java interface or class containing callback methods to a Java class, a C++ proxy class and native methods that together implement a cross-domain callback pattern.

In step 480 a Java class or interface may be received. Potentially, all non-final and non-private instance methods may be regarded as callback method candidates. Optionally, in step 482, heuristics may be used to identify strong candidates for callback methods. These heuristics may include, but are not limited to: heuristics based on the class or interface-name (for example, all methods declared by interfaces whose name ends with "Listener" may be callback methods), heuristics based on method declaration modifiers (for example, final methods never may be candidates, abstract methods may be strong candidates), heuristics based on method name analysis (for example, overloaded method names may identify weak candidates).

Also, optionally, in step 484, the developer may manually identify callback methods. Next, in step 486, a Java class may be generated that implements the Java interface or extends the Java class. This generated Java class may override all marked callback methods. An overriding method of the overriding class may delegate execution of the method to a corresponding C++ instance through a native method. The corresponding C++ instance may be identified in any of several ways. The Java proxy instance may have been constructed with a pointer to the corresponding C++ instance as an argument, thus maintaining the relationship itself. Alternatively, the Java proxy instance may lookup the corresponding C++ instance in an object registry that maintains the relationship external to the instance. An object registry may be supplied on the C++ side, on the Java side or in the connection layer (for example, JNI). Other mapping techniques may be used.

Next, in step 488, a C++ proxy class may be generated for the Java proxy class. This C++ proxy class is intended to be used as a superclass by C++ classes that override callback methods. Finally, in step 489, one or more native methods that delegate the Java method to the C++ method may be generated. Steps 486–489 may be performed serially or in parallel, and the order of these steps is not significant. In particular, the native methods generated in step 489 may be generated as static methods of the C++ proxy class, thus effectively combining steps 488 and 489.

In an optional embodiment, byte code of the compiled Java proxy class may be included in the C++ class and injected (i.e. loaded explicitly) into the JVM, thus obviating distribution of a separate class-file to support the cross-domain callback pattern.

Component Models

In an embodiment of automatically transforming a first component of a first domain to a second component of a second domain, component models may be applied. Optionally, a component model may be a robust component model, which is defined below.

Figure 23:
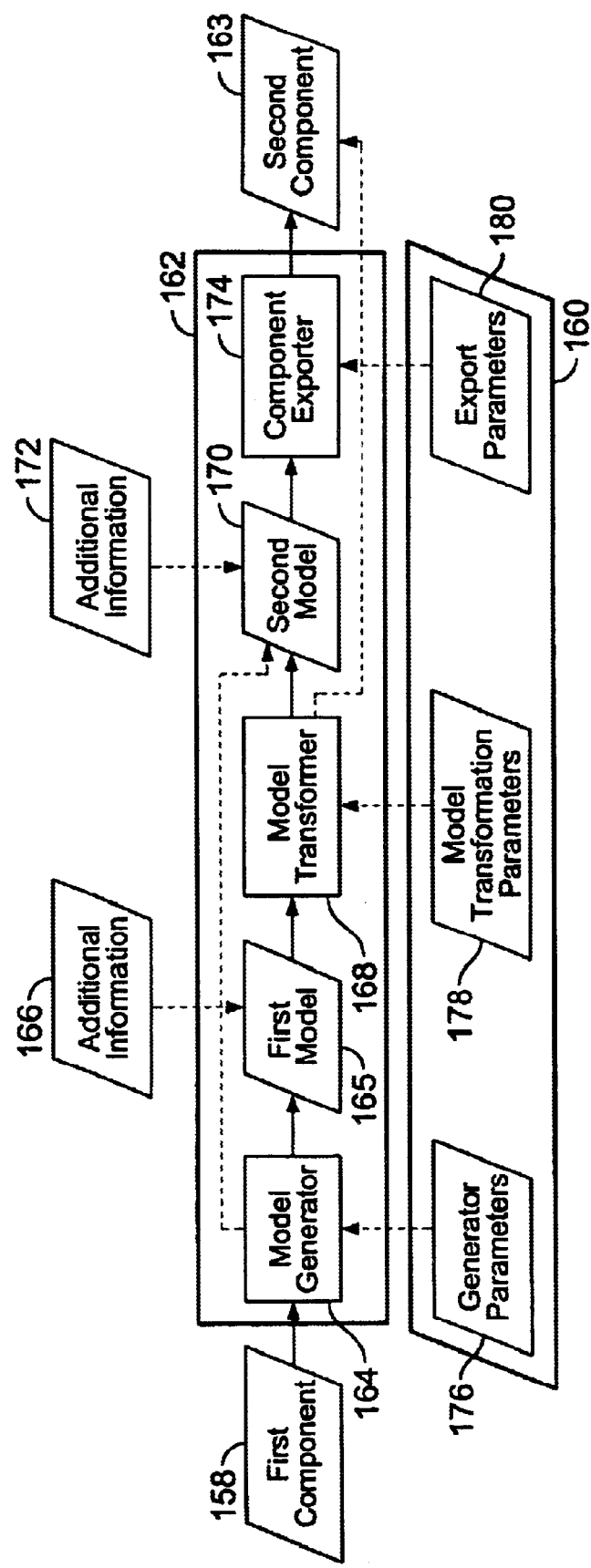
FIG. 23 is a data flow diagram illustrating an exemplary aspect of the system of FIG. 19.

FIG. 23 is a data flow diagram illustrating an example embodiment of transformation system 157 that uses models to transform a component from one domain to another. The component transformer 162 may include model generator 164, a model transformer 168 and component exporter 174.

The model generator 164 may receive the first component 158 and model generator parameters 176 as input and generate a first component model 165 as output. As described above in connection with FIG. 20, first component 158 may be a source component or a compiled component. The model generator 164 may be configured to generate models from both compiled components and source components. Further, model generator 164 may be configured to generate a component 165 in more than one domain, depending on the domain of the first component 158. For example, model generator 164 may be configured to generate a C++, Java or C component model 165 depending on whether first component 158 is a C++ component, Java component or C component, respectively. Model generator 164 may be configured to recognize the domain of the first component 158 or may receive an indication (e.g. one of the model generator parameters 176 of the domain of the first component 158 before receiving it.

Model generator 164 may be configured using model generator parameters 176, which may be included as part of the transformation parameters 160. Model generator 164 may be implemented using software, firmware, hardware, or any combination thereof. For example, model generator 164 may be implemented as a software application written in any of a number of programming languages such as, for example, Java, C++, C, or Smalltalk.

Optionally, a component model 165 may have any of the following properties or combinations thereof: discrete representability (of subcomponents); component relationship awareness; and source reproducability. As used herein, a robust component model is a component model that has all three of these properties.

Discrete representability refers to ability of the first component model 165 to separately and distinctly represent each subcomponent (if any) of the first component 158 as a discrete element of the first model. The ability to represent each subcomponent as a discrete element provides the ability to query or manipulate individually each subcomponent of the first component model 165. For example, if the first component 158 is a Java class including several fields and methods, the first model 165 may model the Java class and represent discretely each field and method. A developer may then be able to query a model for its subcomponents and manipulate these subcomponents individually.

A level of discrete representability may be chosen on a per-model basis. For example, if a Java model is generated from a Java class that includes a method and a field, the level of discrete representation may be chosen such that discrete elements representing the field and method are generated, but discrete elements are not generated to represent any subcomponents of the body of the method. Alternatively, the body of the method may be represented with one or more discrete elements. Such a level of representation may be referred to herein as a "source level" representation because the source code of the method body is represented. The ability to provide such a source level of discrete representation may depend on whether first component is in source form or compiled form. If the first source component is in compiled form, the source code may not be available to be represented and, consequently, a source level of discrete representation may not be an option.

Relationship awareness refers to the ability of a first component model 165 to maintain knowledge of one or more relationships to other components, other component models, discrete elements, attributes, or any combination thereof, such as, for example, relationships: to the first component 158 from which it was generated, to other components of the first domain related to the first component 165, such as, for example, another component that uses the first component 158 or uses subcomponents (represented as discrete elements of first component model 165) of the first component 158, to models of such other components, between one or more elements of the first component model 165, between one or more elements of the first component model 165 and attributes of the first component model 165 being modeled (e.g., name), to file names, and to file locations. Such knowledge may be maintained by a field of the model (not to be confused with a field of an object being represented by the model) and may be maintained by a field of a specific discrete element.

For example, a C++ struct model 165 generated from a C++ struct of a C++ program may include model fields that identify the C++ struct itself, any other C++ components that use the C++ struct 158, any generated models of these other C++ components, any superclasses or subclasses of the of the C++ struct, any generated models of these superclasses or subclasses, the namespace of the C++ struct, fields and methods of the struct, elements of the struct model corresponding to these fields and methods, the name of the struct, and the name and location of source and compiled forms of the struct (if available).

Relationship awareness may permit changes made to an element or an attribute of a first component model 165 to be propagated to other related elements or attributes of the model or other models. For example, consider a first component model 165 of a C++ class. If a developer changes the name of the C++ model, elements included in this model that represent any constructors or destructors should have their names changed accordingly. Upon the name change being made, the component model 165 may be configured to alert the developer that other elements (possibly of other models) need to be changed, automatically change other elements, or mark the other elements to be changed by, for example, setting model field values for the other elements.

Source reproducability refers to the ability of the component model 165 to reproduce the source of first component 158 from which it was generated. For example, the component model 165 may maintain comments, whitespaces, and other formatting aspects of program that may be crucial to human understanding of the code. Source reproducability may be useful for integration with source or version control of a programming application or porting of an application. Thus, the component model 165 may act as both a source and target of a transformation. Source reproducability may only apply to models that include a source level of discrete representation, as described above, such that source code of the first component is represented by the model.

Optionally, a first component model 165 may be capable of being persisted.

These optional properties provide a component model 165, particularly a robust component model, with a general usability and flexibility that distinguishes it from other digital entities that may be referred to as "models". For example, a typical parse tree for a software program may be considered a model. A parse tree typically: does not represent redundant whitespace or comments such that the original software component cannot be reproduced from the parse tree; does not represent subcomponents as relationship-aware elements; and is not capable of being persisted because parsers typically do not expect to save their state because they are assumed to be dealing with a transient form of information.

Thus, a parse tree would not have the general usability and flexibility of a first component model having any of the properties of discrete representability, component relationship awareness, or source reproducability Other examples of models may be the object files and executable images that are created during a traditional transformation from source code to an executable image. The first step of compiling source code produces object code that is used as input for the second step of linking to produce an executable image. The parse tree of the source code is not exposed for querying or manipulation, but is geared for providing information to the compiler backend in a convenient manner. The resulting intermediate object file is a limited model (if it is considered a model at all) because it is generally not understood by humans, cannot be manipulated by humans and is only usable by a linker. The final result of building an executable image, a compiled executable file, may also be considered a limited model (if it is considered a model at all) because it also is generally not understandable, cannot be or manipulated by humans and is typical only usable by the platform or environment on which it is run. Thus, a typical compiling and linking transformation process does not allow manipulation of any intermediate representations and is clearly a one-way process.

Accordingly, object files and executable images do not have the general usability and flexibility of a first component model 165 having any of the properties of discrete representability, component relationship awareness, or source reproducability.

Returning to FIG. 23, the first component model 165 may be modified with additional information 166. Such additional information may include modifications made by a developer, including removal of model elements or parts of a model element (e.g., code). Further, additional information may include other components of the first component's domain. For example, if the domain is a programming language, the additional information may include source code that is inserted into an element of the first component model 165.

Model transformer 168 may receive the first component model 165 and model transformation parameters 178, which may be part of transformation parameters 160. The model transformer 168 may be configured to generate a second component 163 or a second component model 170 of one or more domains. Further, the model transformer 168 may be configured to transform a first component model into either a proxy component or a proxy component model. Model transformer may be programmed with model transformation parameters 178, and may be implemented using software, firmware, hardware, or any combination thereof.

The second component model 170 may be similar to first component model 165, except that the second component model may represent a component of a second domain. For example, if the first component model 165 represents Pascal components, the model transformer 168 may transform the Pascal component model 165 into a Smalltalk component model 170. As described above with respect to first component model 165, second component model 170 may have any of the properties of discrete representability, component relationship awareness, and source reproducability. Further, as described above with respect to first component model 165, second component model 170 may be modified with additional information.

The component exporter 174 may receive the second component model 170 and export parameters 180, and generate the second component 163. The component exporter 174 may be configured to produce a second component of a particular form. For example, if the second component model models a C component, the component exporter may generate a source or compiled C component. The component exporter 174 may be configured with export parameters 180 and may be implemented using software, firmware, hardware, or any combination thereof.

Figure 25:
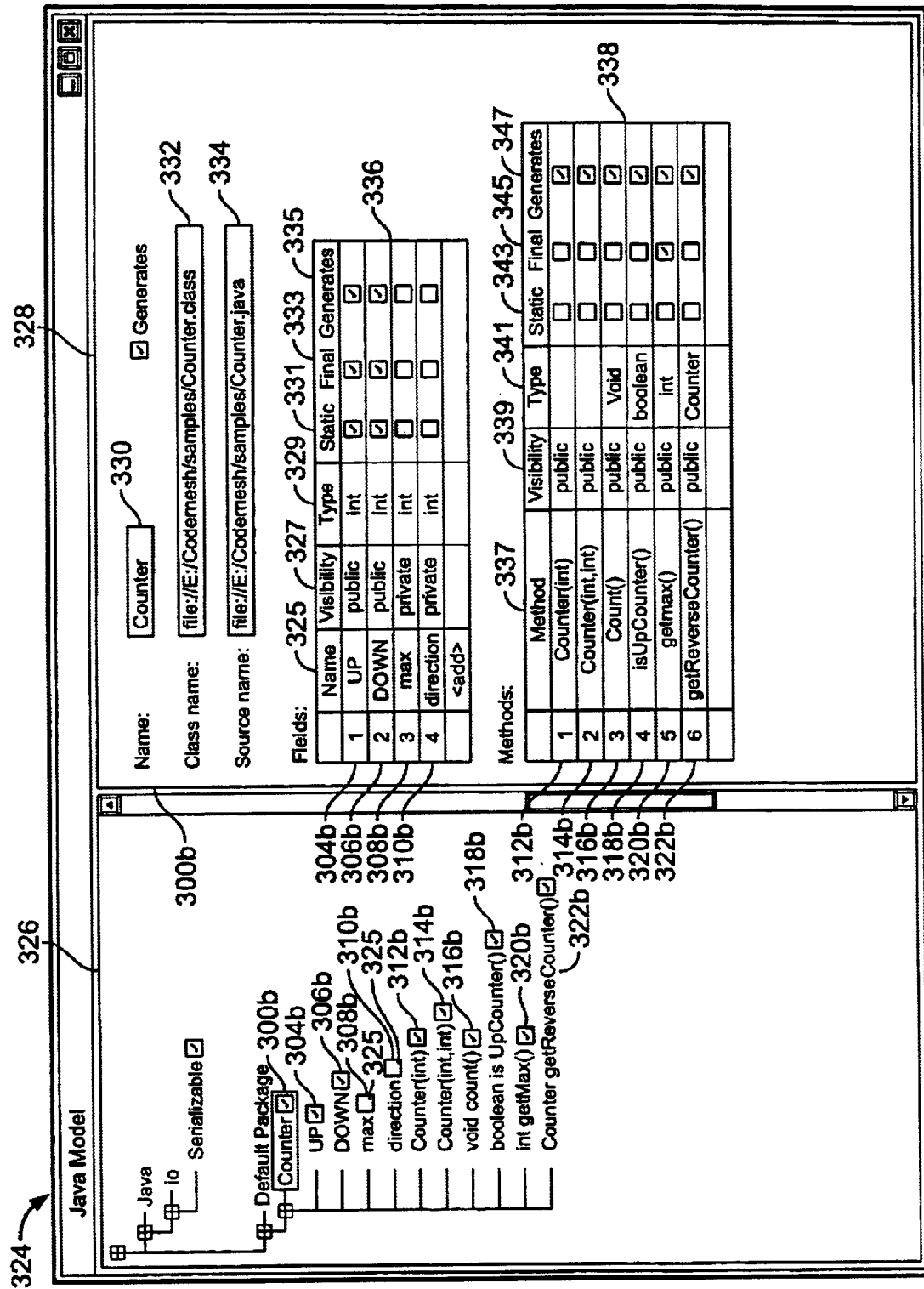
FIG. 25 is a screen shot illustrating an example of a digital representation of a robust Java model.

Component models will now be described in connection to FIGS. 24–26.

FIG. 24 is a Java code fragment illustrating an example embodiment of a Java class 300*a* that includes: Java fields 304*a*–310*a*, Java constructors 312*a* and 314*a*; and Java methods 316*a*–322*a*.

Model generator 164 may receive Java class 300*a* and produce a Java class model 165. FIG. 25 illustrates an example of a GUI for representing and manipulating a Java model. Although Java model representation 324 is merely an incomplete, example GUI representation of a Java model, for illustrative purposes, GUI representation 324 may be referred to herein as a Java model 324. Java model 324 includes a Java model tree panel 326 and a Java model textbox panel 328. Both Java model tree panel 326 and Java model textbox panel 328 represent Java class 300*a* subcomponents 304*a*–322*a* as discrete elements 304*b*–322*b*.

Java model text box panel 330 includes an organized representation of Java class 300a, including a component name box 330, a class file name box 332, a class source name box 334, a fields table 336, and a methods table 338.

The field table 336 may include: a field name column 325 that holds the name of field entry, and an accessibility column 327 that contains the accessibility of each field entry, a type column 329 that contains the type of each field entry, a static column 331 that contains check boxes that represent whether a field entry is static, a final column 333 that contains check boxes that represents whether a field entry is final, and a generate column 335 that contains check boxes that represent whether a field entry is to be transformed. In this example, the field table 336 contains four entries, UP, DOWN, max, and direction, corresponding to the fields 304a–310a of Java class 300a.

The methods table 338 may include a name column 337 that contains the names of the method entries; an accessibility column 339 that contains the accessibility of each method entry; a type column 341 that contains the type of each method entry; a static column 343 that contains check boxes that indicate whether a method entry is static; a final column 345 that includes check boxes where each check box represents whether a method entry is final; and a generates column 347 that represents whether a method entry is to be transformed or exported.

The Java model tree panel 326 provides a hierarchical representation of Java class 300a. Each element of the Java model tree panel 326, including elements 300b–322b, may be followed by a check box corresponding to the generate columns 335 and 347. A check box being checked may indicate that the corresponding element is to be transformed or exported. A check box not being checked may indicate that an element is not to be transformed or exported. For example, the check boxes 325 of elements 308b and 310b (representing the max field and direction field 308a and 310a, respectively, of Java class 300a) are not checked, and therefore, indicate that elements 308b and 310b are not to be transformed to the C++ domain after that transformation is requested by the developer.

Figure 26:
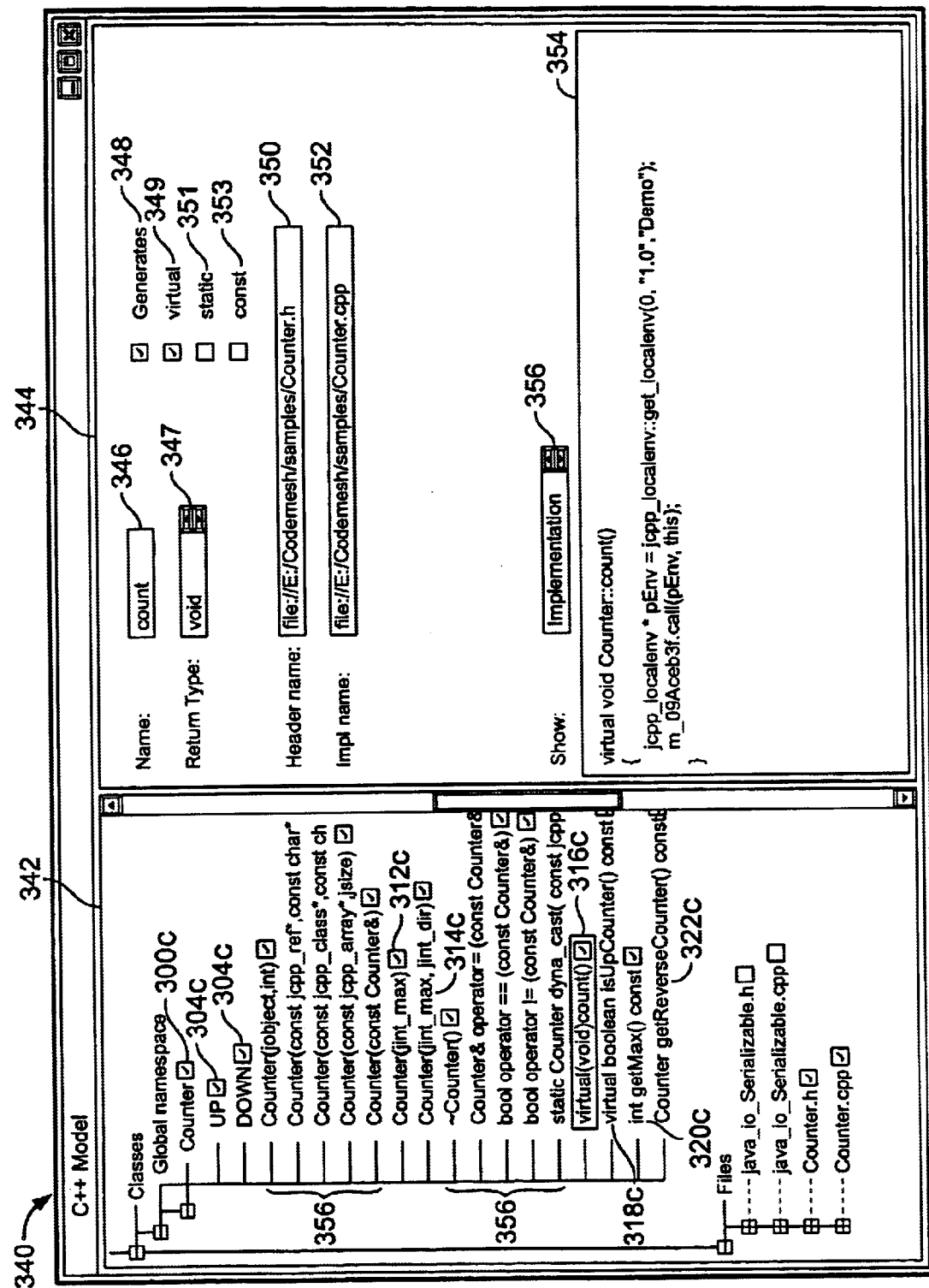
FIG. 26 is a screen shot illustrating an example embodiment of a digital representation of a robust C++ model.

FIG. 26 is an incomplete, example GUI representation 340 of a C++ model that for illustrative purposes may be referred to herein as C++ model 340. C++ model 340 includes a C++ model tree panel 342 and a C++ model textbox panel 344, and maintains similar information as maintained by Java model 324. C++ model 340 represents a C++ proxy class Counter that wraps Java class 300a. As a result of populating the C++ model by means of a proxy transformation from Java model 324, the classes in the resulting C++ model 340 are C++ proxy classes for Java classes. Although C++ model 340 is still capable of representing any valid C++ component, due to its origin, it may now also be referred to as "C++ proxy model" and the classes that it contains may be referred to as "C++ proxy classes."

C++ model tree panel 342 includes a hierarchical representation that includes elements 304c–322c and 356 that represent subcomponents of the C++ proxy class Counter. C++ proxy class Counter includes proxy support elements described above in connection to FIGS. 7 and 8 that are represented by model elements.

C++ model 340 indicates that Java model elements 308b and 310b of Java model 324 were not transformed into corresponding C++ model elements as a result of not having their check boxes 325 selected.

C++ proxy class model 340 indicates that model element 316c has been selected. Accordingly, C++ model text box panel 344 may include information specific to model element 316c, as opposed to information about the entire C++ proxy class Counter. C++ model textbox panel 344 includes a method name textbox 346, a method return selection box 347, check boxes 348–353, C++ header file name text box 350 and C++ implementation file name textbox 352, file selection box 356, and method body window 354.

Return type selection box 347 allows a developer to select the return type of the method indicated by method name textbox 6.

The "generates" check box 348 indicates whether the method indicated in the method name textbox 346 is to generate, i.e. export, a corresponding C++ proxy component. Virtual check box 349 indicates whether the method indicated in method name textbox 346 is to generate a C++ proxy method that is virtual or non-virtual. Static text box 351 indicates whether the C++ method indicated by method name textbox 346 is to generate a C++ proxy method that is static or not. Const textbox 353 indicates Li whether the C++ method indicated by C++ method name textbox 346 is to generate a const or nonconst proxy method.

File selection box 356 allows a developer to choose whether to view the resulting code fragment in the implementation file or the one in the header file of the C++ method indicated by method name textbox 346. In the example of FIG. 26, a developer has chosen to view the implementation file and, correspondingly text window 354 represents the C++ source code that would be exported into the selected implementation file if the developer chose to export the C++ model to source code, C++ class model 340 may be received by the component exporter and exported into a C++ proxy class.

The GUI model representations 324 and 340 may permit a developer to manipulate the Java and C++ models, respectively, that they represent. In both representations, additional information may be added to the underlying model by a developer by, for example, changing the name of an element, inserting or deleting code, checking or unchecking a checkbox, and selecting certain values. Some of the information represented by the GUI model representation 324 and 340 may be used to configure the model transformer 168 (and thus may be considered a model transformer parameter 16). For example, check boxes 329 of GUI model representation 324 may configure the model transformer 168 not to transform model elements 308b and 310b to corresponding C++ model elements.

Robust models offer a far more useful approach to manipulating components that have a useful representation in more than one domain. Consider, for example, a transformation that transforms Java components to C++ proxy components. An alternative to using two models is to skip the representation of one domain entirely, for example, by importing a Java class directly into a C++ model using a combination of the techniques described above in connection to model generator 164 and model transformer 168, or, as described above, by generating a second component 163 directly from a first model 165 using the model transformer 168.

Each model 165 and 170, however, permits a developer the flexibility of manipulation in a particular domain, which may be lost if only a single model is used. Further, both models 165 and 170 may of course be combined into a single model, but such a model may be limited to representing only Java and C++ components and not components from other domains.

Therefore, when transforming a component from a first domain to a second domain, providing a model, particularly a robust model, for each component in its respective domain provides flexibility in the manipulation of such components. Although models and robust models have been described above in connection to C++ and Java, such models may be used to convert components between a variety of domains such as, for example, other programming languages, document mark-up languages, and object-oriented technologies.
Port-by-Proxy Transforming a first component of a first digital domain to a proxy component of a second digital domain may be applied to gradually port a digital entity from the second digital domain to the first digital domain. The gradual transformation of a digital entity from a first domain to a second domain using proxy components may be referred to herein as "port-by-proxy" For example, a C++ application may be ported gradually from C++ to Java using C++ proxy components.

A port-by-proxy of a digital entity of a first domain to a second domain may include: manually writing a second domain component that defines the same concept as a first domain component of the first digital entity; transforming the second domain component into a first domain proxy component that wraps the second domain component; and replacing the first domain component in the digital entity with the first domain proxy component. This process may be repeated to completely port-by-proxy the digital entity from the first domain to the second domain.

The order or strategy by which a digital entity is ported may depend on several factors such as, for example, the structure of the digital entity, the preferences of a developer, and several other factors. For example, a developer may employ a bottom-up or top-down strategy, or for a client/server application, a developer may apply client-first port-by-proxy or a server-first port-by-proxy strategy. Further, a developer may employ an I/O-module-first, or GUI-module-first strategy or several other strategies.

Figure 27A:
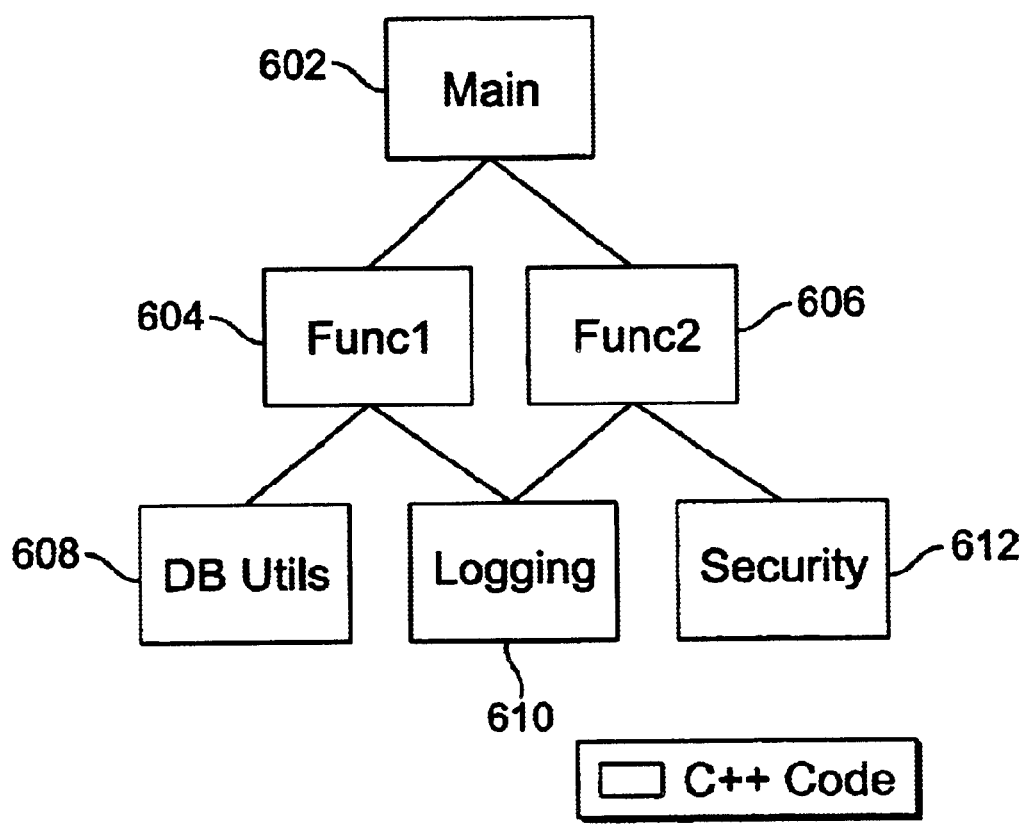
FIGS. 27a–27f are block diagrams illustrating an example of a bottom-up port-by-proxy process.

FIGS. 27a–27f are block diagrams that together illustrate an exemplary port-by-proxy process, in which a pure C++ application gradually is ported to being a Java application using a bottom-up strategy. Referring to FIG. 27a, the original C++ application 600 is a hierarchically organized C++ application, including a main module 602 at a highest level, functional modules 604 and 606 at a next-highest level, and at a lowest level three general purpose modules, DB utils module 608, log-in modules 610 and security module 612. Each of these modules may contain the declarations and implementations of several C++ components such as, for example, classes or structs. In FIGS. 27a–27f, the lines between modules indicate directional "use" relationships from the higher-level modules to the lower-level modules.

Figure 27B:
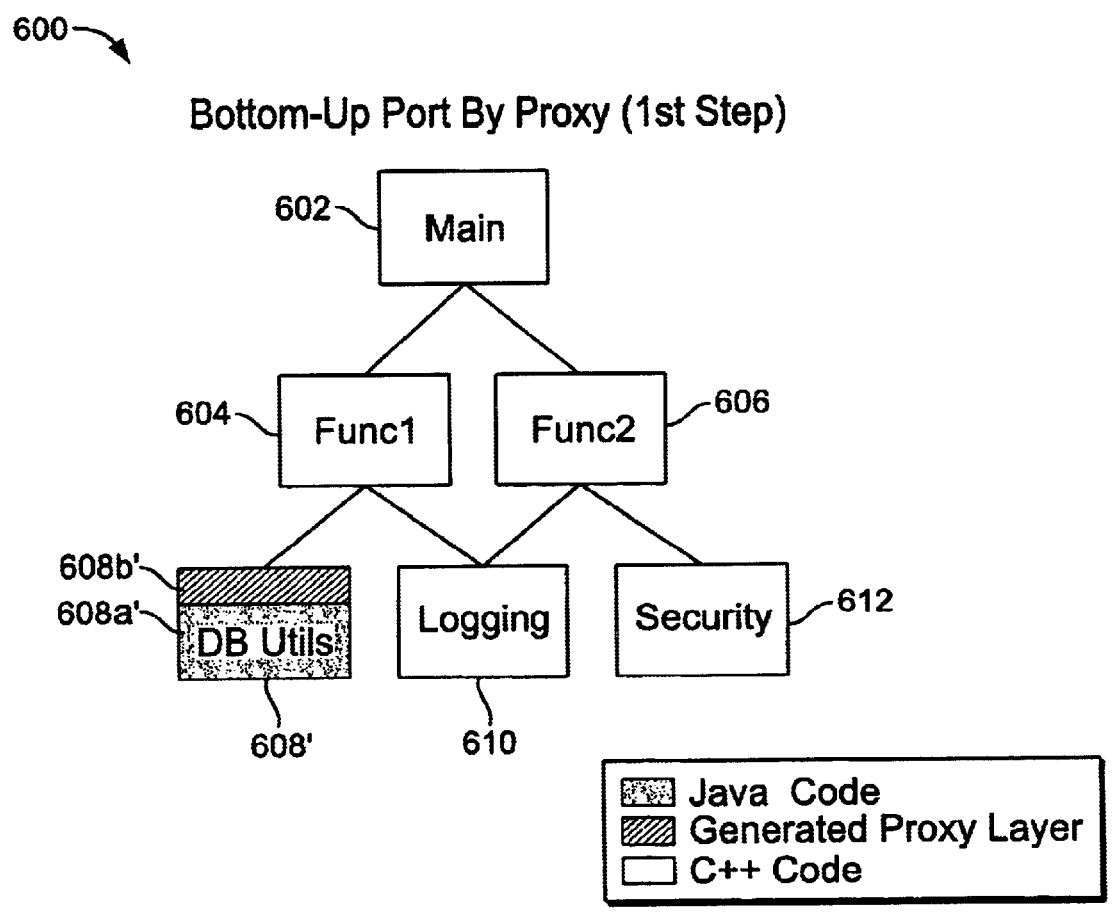

FIG. 27b represents the application 600 after a possible first step of the port-by-proxy process. In the first step, the C++ DB utils module 608 has been ported to Java resulting in Java module 608a'. Java module 608a' may be used to generate C++ proxy components 608b' in accordance with the process described in connection to FIGS. 20–21 above. Together, Java components 608a' and corresponding C++ proxy components 608b' form C++ proxy module 608'. C++ proxy components 608b' represent a same concept as original C++ components module 608 and have a semantic usability that strongly corresponds with the semantic usability of the original C++ components of module 608. Thus, functional module 604 may require minimal or no changes to implement the same concept using module 608' instead of module 608. Consequently, a part (608a') of the original C++ application 600 may now be implemented in Java while the majority of the application remains unchanged in C++.

Figure 27C:
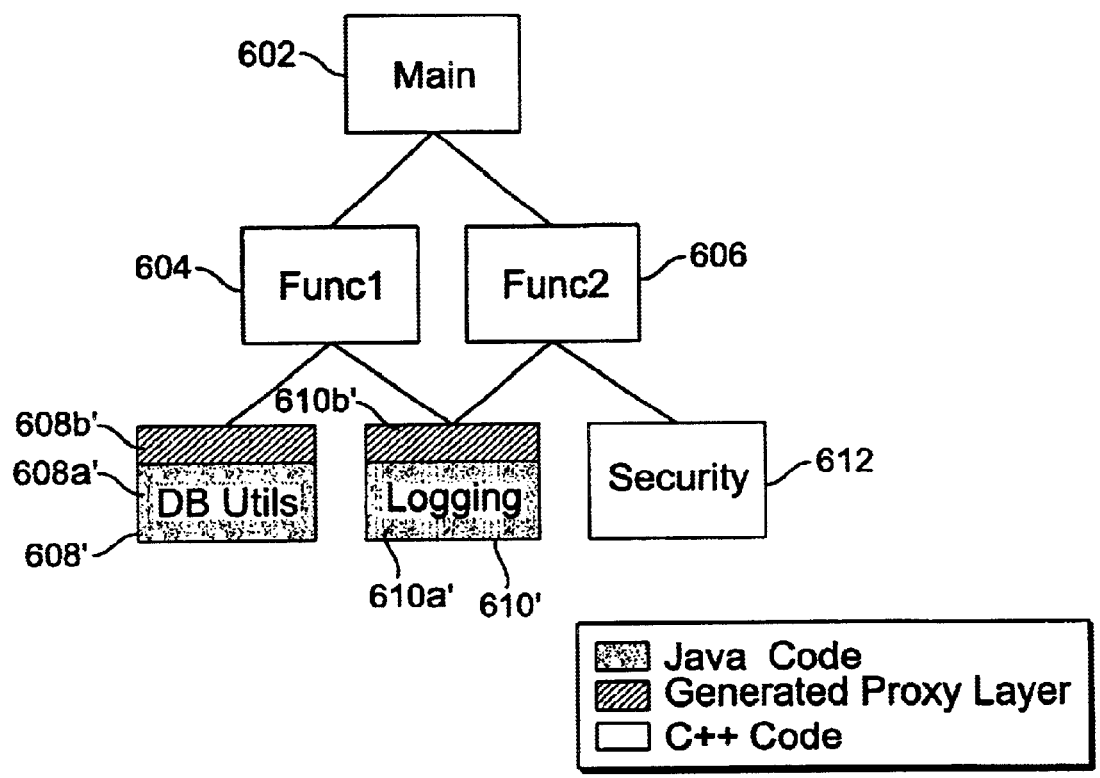

FIG. 27c illustrates a possible second step in the bottom-up port-by-proxy process. In this second step, the C++ logging proxy module 610 has been replaced with C++ proxy logging proxy module 610' which includes Java code 610a' and generated C++ proxy layer 610b'. Generated C++ proxy layer 610b' allows the proxy logging proxy module 610 to be reintegrated seamlessly into the application 600.

Figure 27D:
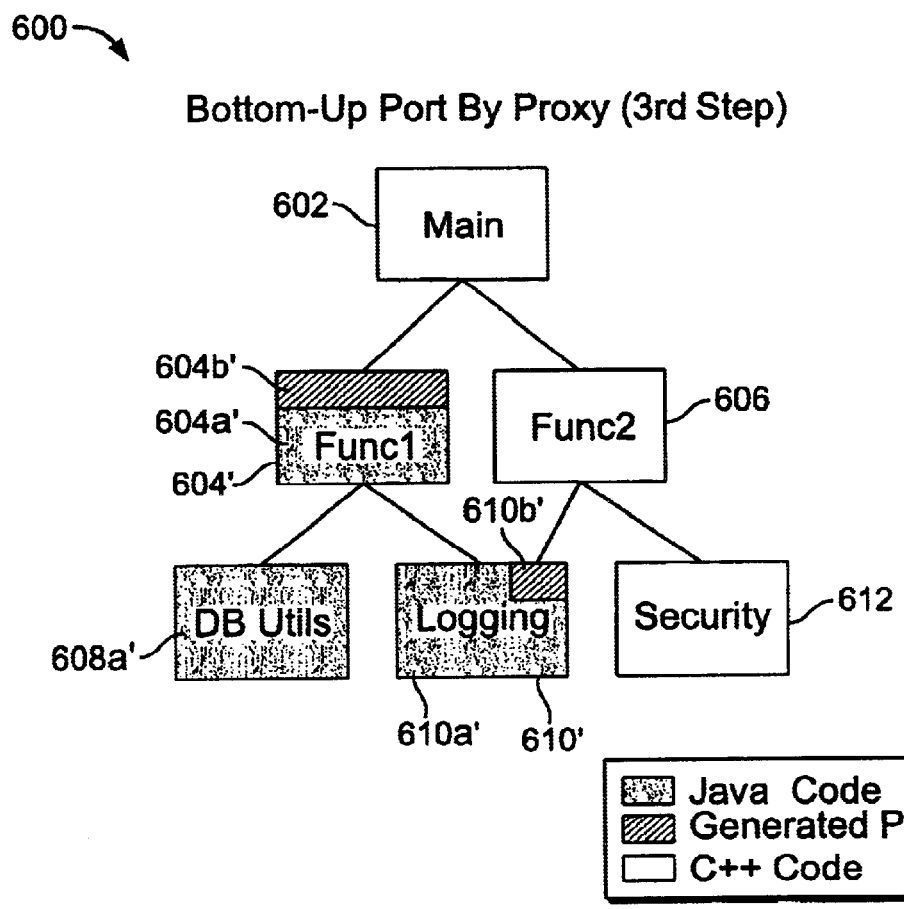

FIG. 27d illustrates a possible third step in the bottom-up port-by-proxy process. In this third step, C++ function module 604 has been replaced by C++ proxy function proxy module 604', which includes Java code 604a' and generated C++ proxy layer 604b'.

Because C++ function module 604 has been replaced with proxy function module 604', and because module 604' is the only user of DB utils module 608', the DB utils proxy layer 608b' may be discarded. As a result, Java code 604a' may interact directly with Java DB utils module 608a' without a C++ proxy layer 608b'.

Figure 27E:
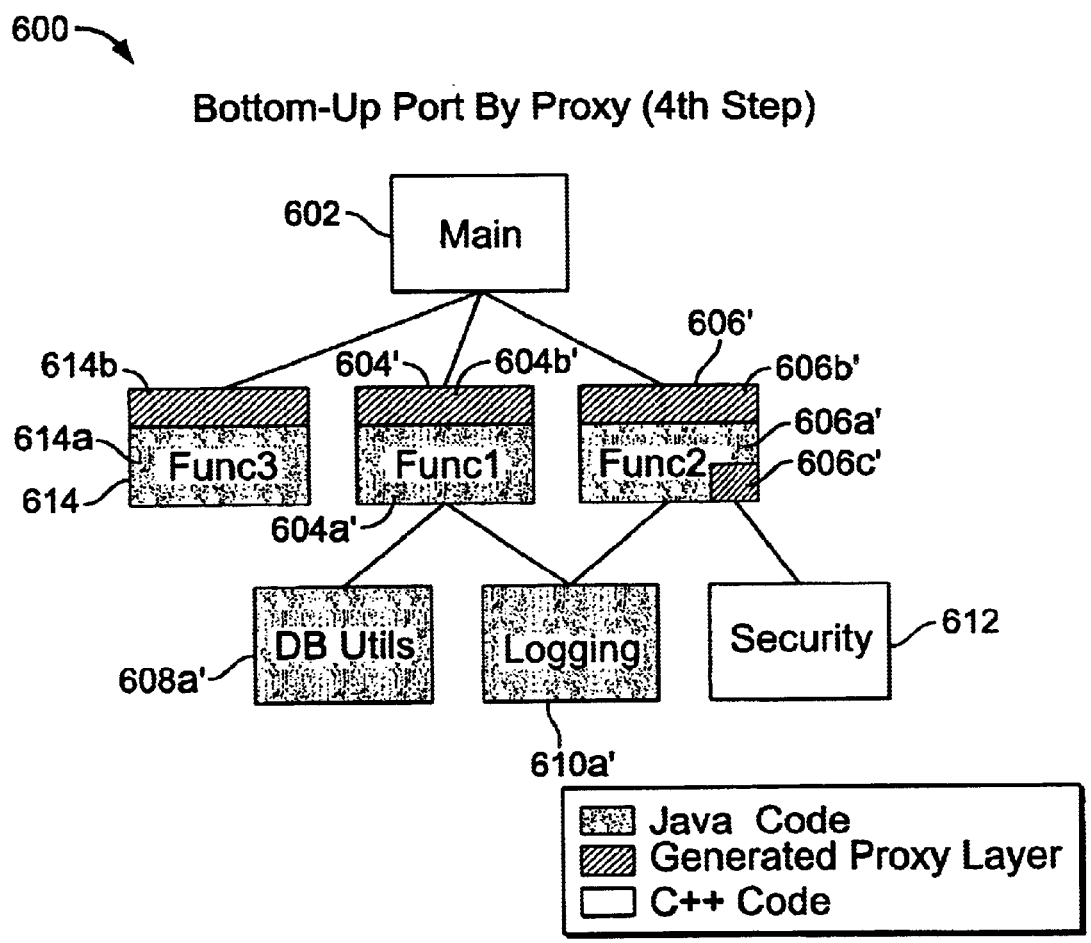

FIG. 27e represents the application 600 after a fourth step of the bottom-up port-1o by-proxy process. In this fourth step, C++ function module 606 has been replaced with C++ proxy module 606', which includes Java code 606a' and generated C++ proxy layers 606b' and 606c'. Accordingly, the C++ proxy logging module 610b' may be discarded.

Generated proxy layer 606c' is necessary to integrate C++ security module 612. Proxy layer 606c' may be a Java proxy layer for C++ security module 612, and may use C++ proxy classes in the native implementations of Java methods as described above in connection to FIG. 17.

Further, in this fourth step, new functionality may be added to the application 600 by directly adding function module 614 to the application. The additional functionality represented by module 614 may be written in C++ or in Java, but if the goal is to port the whole application 600 from C++ to Java, it may be preferable to implement module 614 in Java from the start. Choosing Java as the implementation language, C++ proxy components 614b may then be generated and used to integrate the additional functionality with the application. Proxy function module 614 may be added at any step of the bottom-up port-by-proxy process, and is added in step 4 merely for illustrative purposes.

Figure 27F:
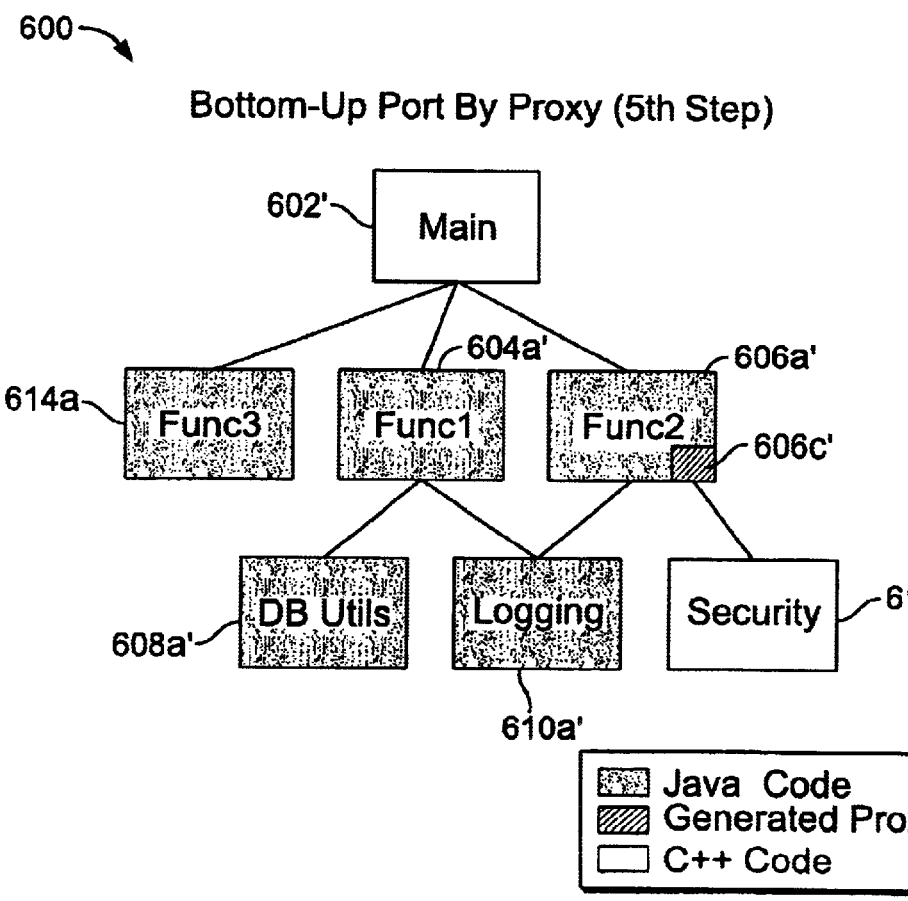

FIG. 27f represents the application 600 after a fifth step. In the fifth step, C++ main module 602 is replaced with Java main module 602". Consequently, all of the proxy function modules 614b, 604b' and 606b' may be discarded. C++ security module 612 illustrates that an application may be ported by proxy in parts as it also may be desirable to leave parts of an application in C++.

Porting an application using a port-by-proxy approach makes the porting process more manageable, less risky and allows the maintenance of the original application while the port is in process. An inexpensive generation of C++ proxy components of high semantic usability as described in detail above enhances even further the benefits of a port-by-proxy process because the proxy layers that are discarded in the process do not represent significant effort or cost.
Use Cases The several embodiments described above for sharing Java and C++ components between Java and C++ domains may have many applications in software engineering. These applications include, but are not limited to, Enterprise JavaBeans (EJB), JavaDatabaseConnectivity (JDBC), Jini, and Swing.

EJB is a new specification for designing and implementing enterprise applications. Enterprise applications typically distinguish themselves from other applications through higher demands in areas such as: scalability, robustness, data integrity, distributability and database connectivity.

EJB is designed with all the above goals in mind. One of EJB's major shortcomings, however, is that it represents a Java-only solution. CORBA can be used at a high level to integrate with software written in other languages and some EJB containers include support for vendor-specific non-Java legacy software. All such non-Java support imposes either vendor-lockin or the use of a heavyweight technology like CORBA.

C++ proxy components may be used with EJB in any of the following manners. First, C++ proxy components may be used to write EJB Beans in C++. These EJB Beans ideally may be used as part of a server-side of an application. The C++ proxy classes may wrap key classes and interfaces of this EJB framework (e.g., EntityBean or SessionBean). A developer may write subclasses for these C++ proxy classes in C++ to create server-side beans that may be used to call C or C++ legacy code by third-party applications. This subclassing of C++ proxy classes and interfaces may incorporate the C++ proxy template method support described above in connection to FIGS. 14–17. Most, if not all, of the methods to be implemented by these subclasses may be called not only by a developer from C++, but by a Java EJB container or another EJBBean.

C++ proxy components may also be used to allow C++ clients access to EJB applications (i.e., on the client side of an application). EJB is designed to be extremely easy to use from a Java client. If the client is written in C++ though, the EJB client-side bindings are typically useless and the developer has to resort to CORBA or another, less appropriate mechanism.

To provide support for non-Java client applications, C++ proxy components may wrap client interfaces and related classes. Consequently, it would not be necessary to rewrite an existing C++ client completely in Java or resort to other technologies. Rather, the C++ client need only have part of its implementation changed to use the C++ proxy classes, as opposed to using whatever mechanism was being used before to communicate with a C++ based server (if the EJB server replaces a legacy C++ server). This client-side solution may not rely so heavily on the template method support described above, but may rely more on general C++ support semantics such as, for example, inheritance, method calls, etc.

C++ proxy components may also be applied to assist an implementor of an EJB container in gaining access to native functionality. EJB container developers often need access to functionality that is not available through Java. For example, in order to provide a transaction service to EJB beans, the EJB container might need to wrap an existing transactionalization service in Java, i.e., Java classes with native methods need to be written. C++ proxy classes may wrap a concrete container class and related classes, thereby simplifying the native implementation of these methods. The use of C++ proxy classes in natively-implemented methods allows programming at a higher level of abstraction within the native methods. For example, rather than calling JNI functions to set a field, a C++ assignment statement may be used.

JDBC is a set of Java classes that standardize database access in Java, similarly to how ODBC has standardized database access in C programs. Advantages of JDBC over ODBC include: availability through the Java environment such that it is not necessary to purchase different third-party connectivity tools for different platforms; JDBC's use of portable, standardized types as opposed to database-specific types, which eliminates the need to perform unsafe type-casts to arrive at native platform types; and JDBC's ability to represent the full UNICODE character set for strings.

A drawback for JDBC is that it is only available for Java applications, which may cause major problems if both a Java and a C++ client need to access the same database. In such a situation, both the Java and C++ client would require different database drivers, which is inherently worrisome. Requiring different database drivers adds an additional burden on application designers and implementors, a quality assurance team, and an application install team. By wrapping JDBC with C++ proxy components and possibly some related classes (i.e., String, Integer, etc. . . . ), a C++ database client may take advantage of the entire, easy-to-use JDBC interface on any platform supported by JDBC. Further, wrapping the JDBC API with C++ proxy components provides consistency in configuration, character-set interpretation, semantics, and database drivers between Java and C++ clients.

Jini™ is a powerful Java technology that assists Java developers in writing distributed applications. Jini is built around the concept of Entrys. An Entry may be copied into a context, removed from a context and looked-up. A typical context in which Entrys are used is called a JavaSpace, which is accessible by distributed systems. An Entry itself is not concerned with traditional distributed development problems like transactionalization and persistence. All distribution-related issues are the duty of the context in which the Entry is used. Jini and JavaSpaces define the semantics of operations that may be performed with Entrys, and enable the construction of complex, distributed systems from simple components.

C++ proxy components may be applied to Jini to enable C++ Jini clients and assist in developing of C++ Jini services. Specifically, C++ proxy components may wrap concrete Entrys and Jini support classes such as, for example, JavaSpace, and Lease, etc. These C++ proxy components may enable a C++ application to be a Jini client that may write Entrys into a JavaSpace, read Entrys from a JavaSpace, and receive JavaSpace notifications. If a C++ Jini client is interested in receiving JavaSpace event notifications, it may rely heavily on the template method support described in detail above. Other Jini use-cases may rely more on general C++ semantics support, such as field access, method calls, etc. Such enablement allows C++ executables to participate in a distributed Jini environment which would otherwise be very hard to achieve.

Further, because many Jini services that address platform issues are eventually implemented in native code, a C++ proxy component may assist in implementing such native Jini services.

Swing constitutes a large part of the Java Foundation Classes that may be used to build portable and relatively platform-independent Graphical User Interfaces (GUIs). Developers of C++ applications have consistently struggled with providing an elegant GUI in a platform-independent manner. Although third-party vendors have developed portable libraries, acceptance of these libraries has been minimal because typically these libraries: are expensive; have a small user base (and therefore few experienced developers); require a great deal of experience to use well; lag behind platform-specific GUI's in functionality; and often have a non-native "look-and-feel".

Swing is a relatively new GUI standard for Java applications that has pluggable look-and-feels, i.e., swing enables an application's GUI to look and feel like Windows, Macintosh, Motif, and several other GUIs. C++ proxy classes may wrap Swing classes or user-written Swing-based classes, thereby providing such portable GUI functionality to C++ programs. This functionality may be used in several different ways such as, for example, subclassing concrete JComponents in C++, and providing a portable GUI for C++ applications.

JComponent is the base class of all graphical components in Swing. JComponents may be specialized by several different concrete classes to provide buttons, text edit fields, menus, etc. By wrapping such concrete components with C++ proxy components, these concrete components may be further specialized in C++ to provide more native functionality or be tailored to the requirements of a particular C++ application.

Wrapping Swing classes with C++ proxy classes may provide a portable GUI for a C++ application. For example, consider a C++ server application. C++ server applications typically only contain little platform specific code. Most of the platform-specific code is typically in the areas of networking or file I/O. It may often be desirable to provide an administrative GUI for such a server. GUIs, however, are highly platform-specific. C++ proxy classes that wrap Swing classes may provide a standardized, portable, well-documented and freely available GUI as an alternative to native platform GUI's such as, for example, Motif for UNIX or MFC for Windows. An application developer may choose to use such C++ proxy classes in any of a variety of ways. For example, concrete, application-specific dialogs and windows may be written in Java and then wrapped with C++ proxy classes for use in C++. Alternatively, C++ proxy classes may wrap lower-level Swing classes, and be used by a C++ developer to program virtually exclusively in C++, by using the low-level proxy classes to assemble a dialog or window in C++.

By design, Swing relies heavily on Listener interfaces (described in detail above) for event processing. Thus, use of C++ proxy classes for Swing classes or for Java classes built using Swing classes may rely heavily on the template method support described above.

Having now described some embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer program product for representing and implementing a concept from a first functional domain within a second functional domain, wherein the first functional domain includes a first component representing the concept in the first functional domain, the first component having a type and a first semantic usability in the first functional domain, and wherein the computer program product comprises:
    a computer-readable medium having computer-readable signals stored thereon,
        wherein the signals define a proxy component representing the concept in the second functional domain, the proxy component defined to cause execution of the first component in the first functional domain, and
        wherein the proxy component has a second semantic usability in the second functional domain and the second semantic usability closely corresponds to the first semantic usability,
            the proxy having been generated by analyzing the first component to determine its type.

2. The computer program product of claim 1, wherein the proxy component was generated by a transformation performed on the first component.

3. The computer program product of claim 1, wherein the first semantic usability of the first component is defined at least by a first mutability, and
    wherein the second semantic usability of the proxy component is defined at least by a second mutability of the proxy component determined from at least the first mutability of the first component.

4. The computer program product of claim 1, wherein the first semantic usability of the first component is defined at least by a first accessibility, and
    wherein the second semantic usability of the proxy component is defined at least by a second accessibility of the proxy component determined from at least the first accessibility of the first component.

5. The computer program product of claim 1, wherein the first semantic usability of the first component is defined at least by a first instantiability, and
    wherein the second semantic usability of the proxy component is defined at least by a second instantiability of the proxy component determined from at least the first instantiability of the first component.

6. The computer program product of claim 1, wherein the first semantic usability of the first component is defined at least by a first inheritability, and
    wherein the second semantic usability of the proxy component is defined at least by a second inheritability of the proxy component determined from at least the first inheritability of the first component.

7. The computer program product of claim 1, wherein the first semantic usability of the first component is defined at least by a first context usability, and
    wherein the second semantic usability of the proxy component is defined at least by a context usability of the proxy component determined from at least the first context usability of the first component.

8. The computer program product of claim 1, wherein the first semantic usability of the first component is defined at least by a first polymorphicability, and
    wherein the second semantic usability of the proxy component is defined at least by a polymorphicability of the proxy component determined from at least the first polymorphicability of the first component.

9. The computer program product of claim 1, wherein the first functional domain is the Java programming language and the second functional domain is the C++ programming language.

10. The computer program product of claim 9, wherein the first component is a first Java component and the proxy component is a C++ proxy component, and
    wherein the C++ proxy component is aware of a context in which it is defined.

11. The computer program product of claim 9, wherein the first component is a first Java component and the proxy component is a C++ proxy component, and
    wherein the C++ proxy component includes one or more proxy support elements.

12. The computer program product of claim 11, wherein the C++ proxy component is a C++ proxy class.

13. The computer program product of claim 12, wherein one or more proxy support elements of the C++ proxy class allow an instance of the C++ proxy class to be context-aware.

14. The computer program product of claim 13, wherein one or more of the proxy support elements that allow an instance of the C++ proxy class to be context-aware are context constructors.

15. The computer program product of claim 13, wherein one of the proxy support elements allows an instance of the C++ proxy class to be aware of being a C++ proxy instance field.

16. The computer program product of claim 13, wherein one of the proxy support elements allows an instance of the C++ proxy class to be aware of being a C++ proxy static field.

17. The computer program product of claim 13, wherein one of the proxy support elements allows an instance of the C++ proxy class to be aware of being a C++ proxy array element.

18. The computer program product of claim 13, wherein one of the proxy support elements allows an instance of the C++ proxy class to be aware of being a C++ proxy stand-alone object.

19. The computer program product of claim 13, wherein the C++ proxy class includes a proxy layer, and awareness of the contexts is required by the proxy layer.

20. The computer program product of claim 19, wherein the proxy layer is coded using the Java Native Interface.

21. The computer program product of claim 12, wherein at least one of the proxy support elements of the C++ proxy class allows usage of null in C++ corresponding to usage of a null Java object reference in Java.

22. The computer program product of claim 21, wherein the C++ proxy class includes a conversion constructor to create a stand-alone proxy instance of the C++ proxy class initialized to not refer to any Java instance.

23. The computer program product of claim 12, wherein at least one of the proxy support elements provides a semantic usability to the C++ proxy class that closely corresponds to the semantic usability of a Java cast expression corresponding to the Java component.

24. The computer program product of claim 23, wherein the C++ proxy class includes a static class method that provides the semantic usability to the C++ proxy class that closely corresponds to the semantic usability of a Java cast expression corresponding to the Java component.

25. The computer program product of claim 12, wherein at least one of the proxy support elements provides an ability to map an instance of the C++ proxy class to an object that represents the Java component.

26. The computer program product of claim 25, wherein the C++ proxy class includes a framework support method that provides the ability to map an instance of the C++ proxy class to an object that represents the Java component.

27. The computer program product of claim 9, wherein the first component is a Java package and the proxy component is a C++ namespace.

28. The computer program product of claim 9, wherein the first component is a Java class and the proxy component is either a C++ proxy class or a C++ proxy struct.

29. The computer program product of claim 28, wherein the proxy component includes one or more proxy support elements.

30. The computer program product of claim 29, wherein one or more of the proxy support elements allow an instance of the C++ proxy class to be context-aware.

31. The computer program product of claim 28, wherein the Java class is declared abstract, and the C++ proxy component is instantiable.

32. The computer program product of claim 9, wherein the first component is a Java array type and the proxy component is either a C++ proxy class or a C++ proxy struct.

33. The computer program product of claim 32, wherein the proxy component includes one or more proxy support elements.

34. The computer program product of claim 33, wherein one or more of the proxy support elements allow an instance of the proxy component to be context-aware.

35. The computer program product of claim 32, wherein the proxy component includes a length field corresponding to a length attribute of the Java array.

36. The computer program product of claim 32, wherein the Java array has an element type and the proxy component has an element type corresponding to the Java array's element type, and wherein the proxy component includes one or more array subscript operators that return a context-aware instance of the proxy component's type.

37. The computer program product of claim 32, wherein the Java array has a primitive element type, and the proxy component has a primitive element type corresponding to the lava array's element type and includes one or more array subscript operators that return a primitive value.

38. The computer program product of claim 9, wherein the first component is a Java interface and the proxy component is either a C++ proxy class or a C++ proxy struct.

39. The computer program product of claim 38, wherein the first component includes one or more proxy support elements.

40. The computer program product of claim 39, wherein one or more of the proxy support elements allow an instance of the proxy component to be context-aware.

41. The computer program product of claim 38, wherein the proxy component is instantiable.

42. The computer program product of claim 9, wherein the first component is a Java method and the proxy component is a C++ proxy method.

43. The computer program product of claim 42, wherein the C++ proxy method has a constness determined from a mutability of the Java method.

44. The computer program product of claim 42, wherein the C++ proxy method declares a return type that has a mutability determined from a mutability of a return type declared by the Java method.

45. The computer program product of claim 42, wherein the C++ proxy method passes one or more arguments, each argument having a mutability determined from a mutability of a corresponding argument passed by the Java method.

46. The computer program product of claim 42, wherein the C++ proxy method is defined to throw an exception based on the Java method being defined to throw an exception.

47. The computer program product of claim 42, wherein the C++ proxy method is defined not to throw an exception based on the Java method being defined to throw an exception.

48. The computer program product of claim 42, wherein whether the C++ proxy method is declared virtual or not declared virtual is determined from one or more of the following aspects of the Java method: polymorphicability, mutability, and instantiability.

49. The computer program product of claim 9, wherein the first component is a Java field and the proxy component is a C++ proxy field.

50. The computer program product of claim 49, wherein the C++ proxy field is declared to be of type C++ proxy class, the C++ proxy class including one or more proxy support elements that allow an instance of the C++ proxy class to be context-aware, such that an instance of the C++ proxy field is context-aware.

51. The computer program product of claim 49, wherein the Java field is of primitive type and the C++ proxy field is declared to be of type C++ primitive proxy class.

52. The computer program product of claim 51, wherein the C++ primitive proxy class includes one or more proxy support elements that allow an instance of the C++primitive proxy class to be context-aware, such that an instance of the C++ proxy field is context-aware.

53. The computer program product of claim 45, wherein one or more proxy support elements of the C++ primitive proxy class is an overloaded operator that permits instances the C++ primitive proxy class 52 to be used on the left-hand side of one or more syntactical productions.

54. The computer program product of claim 43, wherein the C++ proxy field has a mutability determined from a mutability of the Java field.

55. A system including instructions stored on a computer readable medium for modeling a first component of a first functional domain, wherein the first component defines a first concept and includes one or more subcomponents, the system comprising:
 means for receiving the first component; and
 means for generating a first model of the first component, including:
  means for generating, for each subcomponent of the first component, a discrete element of the first model to represent the subcomponent; and
  means for providing the first model with a property of relationship awareness such that, if a first discrete element or attribute of the first model is changed, the first model is operative to:
   determine if the first discrete element or attribute has one or more elements and attributes related to the first discrete element or attribute,
   if the first discrete element or attribute has one or more related elements and attributes, determine whether to change the one or more related elements, and
   if it is determined to change one or more related elements and attributes, change such one or more elements and attributes in accordance with the changed first discrete element or attribute.

56. A system for modeling including instructions stored on a computer readable medium a first component of a first functional domain, wherein the first component defines a first concept and includes one or more subcomponents, the system comprising:
 a model generator to receive the first component, to generate a first model including:
  for each subcomponent of the first component, a discrete element of the first model representing the subcomponent; and
 one or more model concepts that provide the first model with a property of relationship awareness such that, if a first discrete element or attribute of the first model is changed, the first model is operative to:
  determine if the first discrete element or attribute has one or more elements and
  attributes related to the first discrete element or attribute,
  if the first discrete element or attribute has one or more related elements and
  attributes, determine whether to change the one or more related elements, and
  if it is determined to change one or more related elements and attributes, change such one or more elements and attributes in accordance with the changed first discrete element or attribute.

57. A computer program product for modeling a first component of a first functional domain, wherein the first component defines a first concept and includes one or more subcomponents, the system comprising:
 a computer-readable medium having computer-readable signals stored thereon,
  wherein the signals define a model generator to receive the first component, to generate a first model including:
   for each subcomponent of the first component, a discrete element of the first model representing the subcomponent; and
  one or more model concepts that provide the first model with a property of relationship awareness such that, if a first discrete element or attribute of the first model is changed, the first model is operative to:
   determine if the first discrete element or attribute has one or more elements and attributes related to the first discrete element or attribute,
   if the first discrete element or attribute has one or more related elements and attributes, determine whether to change the one or more related elements, and
   if it is determined to change one or more related elements and attributes, change such one or more elements and attributes in accordance with the changed first discrete element or attribute.

58. A method executed from instructions stored on a computer readable medium of transforming a first component of a first domain to a proxy component of a second domain, wherein the first component has a type and defines a first concept, the method comprising acts of:
 (a) analyzing the first component to determine its type; and
 (b) transforming the first component into the proxy component in accordance with the determined type, wherein the proxy component defines at least the concept defined by the first component.

59. The method of claim 58, wherein the first component is in parsed form.

60. The method of claim 58, wherein the first component is a source component.

61. The method of claim 58, wherein the first component is a compiled component.

62. The method of claim 58, wherein act (b) includes:
 (i) generating a model from the first component; and
 (ii) generating the proxy component from the model.

63. The method of claim 58, wherein the proxy component has a semantic usability in the second domain closely corresponding to the semantic usability of the first component in the first domain.

64. The method of claim 63, wherein the proxy component includes one or more proxy support elements to allow an instance of the proxy component to be context-aware.

65. The method of claim 58, wherein the first domain is a first programming language.

66. The method of claim 65, wherein the first programming language is a high-level programming language.

67. The method of claim 66, wherein the first programming language is Java.

68. The method of claim 67, wherein the second domain is C++.

69. The method of claim 68, wherein:
 act (a) includes determining that the type of the first component is a Java class, and
 act (b) includes transforming the Java class into a C++ proxy class.

70. The method of claim 69, wherein act (b) includes: generating, within the C++ proxy class, one or more proxy support elements.

71. The method of claim 70, wherein one or more of the proxy support elements allow an instance of the C++ proxy class to be context-aware.

72. The method of claim 69, wherein the Java class is declared abstract, and act (b) includes:
defining the C++ proxy component to be instantiable.

73. The method of claim 68, wherein:
act (a) includes determining that the type of the first component is a Java array, and
act (b) includes transforming the Java array into a C++ proxy class.

74. The method of claim 73, wherein act (b) includes:
generating, within the C++ proxy class, one or more proxy support elements.

75. The method of claim 74, wherein one or more of the proxy support elements allow an instance of the proxy component to be context-aware.

76. The method of claim 73, wherein the Java array has a length attribute, and act (b) includes:
defining the proxy class to include a length field corresponding to the length attribute of the Java array.

77. The method of claim 73, wherein the Java array has an element type, and act (b) includes:
defining the C++ proxy class to have an element type corresponding to the element type of the Java array; and
generating, within the C++ proxy class, one or more array subscript operators that return a context-aware instance of the proxy class's type.

78. The method of claim 73, wherein the Java array has a primitive element type, and act (b) includes:
defining the C++ proxy class to have a primitive element type corresponding to the Java array primitive element type; and
generating one or more array subscript operators that return a primitive value.

79. The method of claim 68, wherein:
act (a) includes determining that the type of the first component is a Java method, and
act (b) includes transforming the Java method into a C++ proxy method.

80. The method of claim 74, wherein act (b) includes:
defining the C++ proxy method to have a constness based on a mutability of the Java method.

81. The method of claim 79, wherein act (b) includes:
defining the C++ proxy method to declare a return type that has a mutability based on a mutability of a return type declared by the Java method.

82. The method of claim 79, wherein act (b) includes:
defining the C++ proxy method to pass one or more arguments; and
defining each argument to have a mutability based on a mutability of a corresponding argument passed by the Java method.

83. The method of claim 79, wherein act (b) includes:
defining the C++ proxy method to throw an exception based on the Java method being defined to throw an exception.

84. The method of claim 79, wherein act (b) includes:
defining the C++ proxy method not to throw an exception based on the Java method being defined to throw an exception.

85. The method of claim 79, wherein act (b) includes:
determining whether the C++ proxy method is declared virtual or not declared virtual from one or more of the following aspects of the Java method: polymorphicability, mutability, and instantiability; and
defining the C++ proxy method to be declared virtual or not declared virtual based on the determination.

86. The method of claim 68, wherein:
act (a) includes determining that the type of the first component is a Java field, and
act (b) includes transforming the Java field into a C++ proxy field.

87. The method of claim 86, wherein act (b) includes:
declaring the C++ proxy field to be of type C++ proxy class; and
generating, within the C++ proxy class, one or more proxy support elements that allow an instance of the C++ proxy class to be context-aware, such that an instance of the C++ proxy field is context-aware.

88. The method of claim 86, wherein the Java field is of primitive type, act (b) including:
defining the C++ proxy field to be declared of type C++ primitive proxy class.

89. The method of claim 88, wherein act (b) further includes:
declaring the C++ proxy field to be of type C++ proxy class; and
generating, within the C++ proxy class, one or more proxy support elements that allow an instance of the C++ proxy class to be context-aware, such that an instance of the C++ proxy field is context-aware.

90. The method of claim 88, wherein one or more of the proxy support elements of the C++ primitive proxy class is an overloaded operator that permits instances the C++ primitive proxy class 52 to be used on the left-hand side of one or more syntactical productions.

91. The method of claim 86, wherein act (b) includes:
determining a mutability of the Java field; and
defining the C++ proxy field to have a mutability determined from the mutability of the Java field.

92. The method of claim 68, wherein act (b) includes:
(i) transforming the Java component into a C++ proxy class that includes one or more proxy support elements.

93. The method of claim 92, wherein one or more proxy support elements of the C++ proxy class allow an instance of the C++ proxy class to be context-aware.

94. The method of claim 93, wherein one of the proxy support elements allows an instance of the C++ proxy class to be aware of being a C++ proxy instance field.

95. The method of claim 93, wherein one of the proxy support elements allows an instance of the C++ proxy class to be aware of being a C++ proxy static field.

96. The method of claim 93, wherein one of the proxy support elements allows an instance of the C++ proxy class to be aware of being a C++ proxy array element.

97. The method of claim 93, wherein one of the proxy support elements allows an instance of the C++ proxy class to be aware of being a C++ proxy stand-alone object.

98. The method of claim 93, wherein act (b)(i) includes:
generating a proxy layer, and wherein awareness of the contexts is required by the proxy layer.

99. The method claim 98, wherein act (b)(i) includes:
coding the proxy layer using the Java Native Interface.

100. The method of claim 92, wherein at least one of the proxy support elements of the C++proxy class allows usage of null in C++ corresponding to usage of a null Java object reference in Java.

101. The method of claim 100, wherein act (b)(i) includes:

generating a conversion constructor within the C++ proxy class, the conversion constructor for creating a stand-alone proxy instance of the C++ proxy class initialized to not refer to any Java instance.

102. The method of claim 92, wherein at least one of the proxy support elements provides a semantic usability to the C++ proxy class that closely corresponds to the semantic usability of a Java cast expression corresponding to the Java component.

103. The method of claim 102, wherein act (b)(i) includes:

generating a static class method within the C++ proxy class, the static class method providing the semantic usability to the C++ proxy class that closely corresponds to the semantic usability of a Java cast expression corresponding to the Java component.

104. The method of claim 92, wherein at least one of the proxy support elements provides an ability to map an instance of the C++ proxy class to an object that represents the Java component.

105. The method of claim 104, wherein act (b)(i) includes:

generating a framework support method within the C++ proxy class, the framework support method providing the ability to map an instance of the C++ proxy class to an object that represents the Java component.

106. The method of claim 69, wherein:

act (a) includes determining that the type of the first component is a Java interface, and act (b) includes transforming the Java interface into a C++ proxy class.

107. The method of claim 106, wherein act (b) includes:

generating, within the C++ proxy class, one or more proxy support elements.

108. The method of claim 107, wherein one or more of the proxy support elements allow an instance of the C++ proxy class to be context-aware.

109. The method of claim 106, wherein act (b) includes:

defining the C++ proxy class to be instantiable.

110. The method of claim 58, wherein the first semantic usability of the first component is defined at least by a first mutability, and act (b) includes:

(i) determining a second mutability of the proxy component from at least the first mutability of the first component, wherein the second semantic usability of the proxy component is defined at least by the second mutability.

111. The method of claim 58, wherein the first semantic usability of the first component is defined at least by a first accessibility, and act (b) includes:

(i) determining a second accessibility of the proxy component from at least the first accessibility of the first component, wherein the second semantic usability of the proxy component is defined at least by the second accessibility.

112. The method of claim 58, wherein the first semantic usability of the first component is defined at least by a first instantiability, and act (b) includes:

(i) determining a second instantiability of the proxy component from at least the first instantiability of the first component, wherein the second semantic usability of the proxy component is defined at least by the second instantiability.

113. The method of claim 58, wherein the first semantic usability of the first component is defined at least by a first inheritability, and act (b) includes:

(i) determining a second inheritability of the proxy component from at least the first inheritability of the first component, wherein the second semantic usability of the proxy component is defined at least by the second instantiability.

114. The method of claim 58, wherein the first semantic usability of the first component is defined at least by a first context usability, and act (b) includes:

(i) determining a second context usability of the proxy component from at least the first context usability of the first component, wherein the second semantic usability of the proxy component is defined at least by the second context usability.

115. The method of claim 58, wherein the first semantic usability of the first component is defined at least by a first polymorphicability, and act (b) includes:

(i) determining a second polymorphicability of the proxy component from at least the first polymorphicability of the first component, wherein the second semantic usability of the proxy component is defined at least by the second polymorphicability.

116. A system including instructions stored on a computer readable medium for transforming a first component of a first domain to a proxy component of a second domain, wherein the first component has a type and defines a first concept, the system comprising:

means for analyzing the first component to determine its type; and means for transforming the first component into the proxy component in accordance with the determined type, wherein the proxy component defines at least the concept defined by the first component.

117. A system including instructions stored on a computer readable medium for transforming a first component of a first domain to a proxy component of a second domain, wherein the first component has a type and defines a first concept, the system comprising:

a component transformer to receive as input the first component, to analyze the first component to determine its type, to transform the first component into the proxy component in accordance with the determined type, and to output the proxy component, wherein the proxy component defines at least the concept defined by the first component.

118. A computer program product for transforming a first component of a first domain to a proxy component of a second domain, wherein the first component has a type and defines a first concept, the computer program product comprising:

a computer-readable medium having computer-readable signals thereon, wherein the signals define a component transformer to receive as input the first component, to analyze the first component to determine its type, and to transform the first component into the proxy component in accordance with the determined type, wherein the proxy component defines at least the concept defined by the first component.

119. A method executing on a computer comprising, for a program component expressed in a first domain, the component being of any arbitrary type belonging to a set of different types of program components expressed in the first domain, the type having first relationships to other types in the set, using a predefined mapping of relationships between types in the set to relationships between types in a second domain to transform the first component to a second component in the second domain, the second component being of a type belonging to a set of different types of program components in the second domain, the type having relationships to components of other types in the second domain that closely correspond to the first relationships.

* * * * *

UNITED STATES PATENT AND TRADEMARK OFFICE
CERTIFICATE OF CORRECTION

| | |
|---|---|
| PATENT NO. | : 6,901,588 B1 |
| APPLICATION NO. | : 09/551246 |
| DATED | : May 31, 2005 |
| INVENTOR(S) | : Alexander R. Krapf and Neil Galarneau |

It is certified that error appears in the above-identified patent and that said Letters Patent is hereby corrected as shown below:

Title page

Under Other Publications, col. 2, "Topley" references, line 1, delete "Java" and insert --JAVA--.

In the specification

Col. 2, line 38, delete "a" before "C++ proxy components,".

Col. 2, line 48, insert --is-- after Fig. 9.

Col. 2, line 48, delete "a" after "an example of".

Col. 2, line 55, delete "a" before "C++ proxy components,".

Col. 2, line 60, insert --is-- after Fig. 11.

Col. 2, line 60, insert --an-- after "illustrating".

Col. 2, line 60, insert --of-- after "example".

Col. 3, line 67, replace "things" with --thing--.

Col. 4, line 45, after "(e.g.," delete ""tes")" and insert --test--.

Col. 4, line 63, delete "L" before "component".

Col. 8, line 24, insert --an-- after "illustrating".

Col. 8, line 24, insert --of-- after "example".

Col. 10, line 33, delete "Fieldi" before "function" and insert --Field--.

Col. 12, line 13, delete "class's" and insert --class'--.

Col. 13, lines 23 and 24, after "default" delete "to a".

Col. 14, line 22, after "default" delete "to a".

Col. 14, line 45, delete "that's" and insert --that--.

UNITED STATES PATENT AND TRADEMARK OFFICE
CERTIFICATE OF CORRECTION

PATENT NO. : 6,901,588 B1
APPLICATION NO. : 09/551246
DATED : May 31, 2005
INVENTOR(S) : Alexander R. Krapf and Neil Galarneau It is certified that error appears in the above-identified patent and that said Letters Patent is hereby corrected as shown below:

In the specification cont'd.

Col. 15, line 2, after "default" delete "to a".

Col. 16, line 25, after "the first argument," delete "ref 38" and insert --(_ ref 38),--.

Col. 16, line 52, after "virtual" delete "get class" and insert --(get_class ())--.

Col. 16, line 53, delete "0" before "method" and insert --()--.

Col. 17, line 17, delete second occurrence of "in the declaration".

Col. 20, line 58, delete "object__y", and insert --object__array--.

Col. 20, line 67, delete "10" and insert --110--.

Col. 21, line 15, delete "typedef d" and insert --typedef'd--.

Col. 21, line 23, delete "ajcpp" and insert --a jcpp--.

Col. 21, line 27 delete "a" before "possible".

Col. 21, line 41, delete second occurrence of "to a".

Col. 25, line 12, delete "frame work" and insert --framework--.

Col. 25, line 43, delete "namne.x+=4" and insert --name.x+=4--.

Col. 27, line 13, delete "am" and insert --an--.

Col. 27, line 31, delete "the" after "each".

Col. 27, line 51, delete first occurrence of "to a".

Col. 28, line 10, after "declared" delete "c:".

Col. 30, line 66, after "objects" delete "to".

Col. 35, line 58, delete "having" and insert --have--.

Col. 37. line 49, delete "hashcode( ) and equals( )" and insert --hashCode() and equals()--.

UNITED STATES PATENT AND TRADEMARK OFFICE
CERTIFICATE OF CORRECTION

PATENT NO. : 6,901,588 B1
APPLICATION NO. : 09/551246
DATED : May 31, 2005
INVENTOR(S) : Alexander R. Krapf and Neil Galarneau It is certified that error appears in the above-identified patent and that said Letters Patent is hereby corrected as shown below:

<u>In the specifications cont'd.</u>

Col. 37, line 55, delete "hashcode( )" and insert --hashCode()--.

Col. 38, line 5, after "C++" delete "lo".

Col. 38, line 32, before "that" delete "method" and insert --methods--.

Col. 39, lines 34-35, after "method" delete "Updateo 406" and insert --Update()406--.

Col. 39, line 36, delete "Attach( )" and insert --Attach()--.

Col. 39, line 43, delete "Attach( )" and insert --Attach()--.

Col. 39, line 62, delete "DoRead( )" and insert --DoRead()--.

Col. 39, line 64, delete "Method Open( )" and insert --Method Open()--.

Col. 40, line 15, delete "aCallback( )" and insert --aCallback()--.

Col. 40, line 17, delete "aCallback( )" and insert --aCallback()--.

Col. 40, line 31, delete "use( )" and insert --use()--.

Col. 47, line 27, before "combination" delete "an" and insert --a--.

Col. 48, line 16, after "not" insert --to--.

Col. 50, line 12, before "alternative" insert --an--.

Col. 50, line 28, before "a Java method" insert --and--.

Col. 50, line 35, delete "C+d+proxy" and insert --C++proxy--.

Col. 55, line 1, delete "text box" and insert --textbox--.

Col. 55, line 1, delete "330" and insert --328--.

Col. 55, line 67, delete "text box" and insert --textbox--.

Col. 56, line 5, delete "text box" and insert --textbox--.

UNITED STATES PATENT AND TRADEMARK OFFICE
CERTIFICATE OF CORRECTION

PATENT NO. : 6,901,588 B1
APPLICATION NO. : 09/551246
DATED : May 31, 2005
INVENTOR(S) : Alexander R. Krapf and Neil Galarneau It is certified that error appears in the above-identified patent and that said Letters Patent is hereby corrected as shown below:

In the Specification cont'd.

Col. 56, line 16, delete "text box" and insert --textbox--.

Col. 56, line 19, delete "Li".

Col. 58, line 18, after delete "port-lo" and insert --port--.

Col. 58, lines 24 – 28, paragraph beginning with "Generated" should continue previous paragraph and not start with new paragraph.

Col. 64, Claim 37, line 16, delete "lava" and insert --Java--.

Col. 65, Claim 53, line 6, delete "45" and insert --51--.

Col. 65, Claim 54, line 11, delete "43" and insert --49--.

Col. 67, Claim 77, line 30, delete "class's" and insert --class'--.

Col. 67, Claim 80, line 43, delete "74" and insert --79--.

Col. 69, Claim 106, line 27, delete "69" and insert --68--.

Signed and Sealed this

Twentieth Day of February, 2007

JON W. DUDAS
*Director of the United States Patent and Trademark Office*